US008613026B2

(12) United States Patent
Malhotra et al.

(10) Patent No.: US 8,613,026 B2
(45) Date of Patent: Dec. 17, 2013

(54) METHODS AND SYSTEMS FOR VIEWER INTERACTIVITY AND SOCIAL NETWORKING IN A MOBILE TV BROADCAST NETWORK

(75) Inventors: Vikram Y. Malhotra, Carlsbad, CA (US); James D. Coyer, Encinitas, CA (US)

(73) Assignee: QUALCOMM Incorporated, San Diego, CA (US)

( * ) Notice: Subject to any disclaimer, the term of this patent is extended or adjusted under 35 U.S.C. 154(b) by 715 days.

(21) Appl. No.: 12/556,473

(22) Filed: Sep. 9, 2009

(65) Prior Publication Data

US 2010/0064307 A1    Mar. 11, 2010

Related U.S. Application Data

(60) Provisional application No. 61/095,931, filed on Sep. 10, 2008.

(51) Int. Cl.
| H04N 7/16 | (2011.01) |
| G06F 15/16 | (2006.01) |
| H04M 3/42 | (2006.01) |
| H04L 9/32 | (2006.01) |
| G06F 3/00 | (2006.01) |

(52) U.S. Cl.
USPC ............. 725/62; 709/204; 709/206; 709/227; 455/416; 713/171; 715/758

(58) Field of Classification Search
USPC ............. 725/62; 709/204, 206, 227; 455/416; 713/171; 715/758
See application file for complete search history.

(56) References Cited

U.S. PATENT DOCUMENTS

| 5,758,257 | A | 5/1998 | Herz et al. | |
| 7,131,003 | B2* | 10/2006 | Lord et al. | .................... 713/168 |
| 7,162,433 | B1 | 1/2007 | Foroutan | |
| 7,958,010 | B2 | 6/2011 | Huang | |

(Continued)

FOREIGN PATENT DOCUMENTS

| CN | 101138242 A | 3/2008 |
| EP | 0776132 | 5/1997 |

(Continued)

OTHER PUBLICATIONS

International Preliminary Report on Patentability—PCT/US2009/056453, The International Bureau of WIPO—Geneva, Switzerland, Jan. 11, 2011 (080993).

(Continued)

*Primary Examiner* — Hoang-Vu A Nguyen-Ba
(74) *Attorney, Agent, or Firm* — The Marbury Law Group, PLLC

(57) ABSTRACT

Methods and systems enable viewers of mobile TV to interact and communicate with one another in real time regarding programs being viewed. Viewers may search other viewers on the mobile TV system. Viewers may invite other viewers to join them in viewing a program or to chat. Viewers may write programs with rating since the broadcast network provider for tallying and broadcast to others. Viewers may set reminders for programs and share those reminders with other viewers. Programs may be hosted by individuals who may control the broadcast stream and communicate with viewers of the program. Viewers may also create ad hoc channels in which they can share their favorite programs with other viewers.

52 Claims, 40 Drawing Sheets

(56) References Cited

U.S. PATENT DOCUMENTS

| | | | |
|---|---|---|---|
| 8,014,763 B2* | 9/2011 | Hymes | 455/414.2 |
| 2002/0026496 A1 | 2/2002 | Boyer | |
| 2002/0194607 A1 | 12/2002 | Connelly | |
| 2003/0078972 A1 | 4/2003 | Tapissier | |
| 2003/0122966 A1 | 7/2003 | Markman et al. | |
| 2003/0135605 A1 | 7/2003 | Pendakur | |
| 2004/0163127 A1 | 8/2004 | Karaoguz et al. | |
| 2005/0054286 A1 | 3/2005 | Kanjilal et al. | |
| 2005/0108770 A1 | 5/2005 | Karaoguz et al. | |
| 2006/0015908 A1* | 1/2006 | Vermola et al. | 725/63 |
| 2006/0101492 A1* | 5/2006 | Lowcock | 725/58 |
| 2006/0156330 A1 | 7/2006 | Chiu | |
| 2006/0174277 A1 | 8/2006 | Sezan et al. | |
| 2006/0259469 A1 | 11/2006 | Chiu | |
| 2007/0050820 A1* | 3/2007 | Saarikivi et al. | 725/62 |
| 2007/0186230 A1 | 8/2007 | Foroutan | |
| 2007/0213004 A1 | 9/2007 | Dacosta | |
| 2007/0276917 A1 | 11/2007 | Sandegard et al. | |
| 2007/0288970 A1 | 12/2007 | Tedenvall | |
| 2008/0002021 A1* | 1/2008 | Guo et al. | 348/21 |
| 2008/0061142 A1 | 3/2008 | Howcroft et al. | |
| 2008/0092203 A1 | 4/2008 | Bouazizi et al. | |
| 2008/0104624 A1 | 5/2008 | Narasimhan et al. | |
| 2008/0115178 A1 | 5/2008 | Godin | |
| 2008/0168506 A1 | 7/2008 | Pickelsimer | |
| 2009/0015660 A1* | 1/2009 | Vedantham et al. | 348/14.09 |
| 2009/0158337 A1 | 6/2009 | Stiers et al. | |
| 2009/0172723 A1 | 7/2009 | Shkedi et al. | |
| 2009/0228911 A1 | 9/2009 | Vrijsen | |
| 2009/0328101 A1 | 12/2009 | Suomela et al. | |
| 2010/0029302 A1* | 2/2010 | Lee et al. | 455/456.6 |
| 2010/0064306 A1 | 3/2010 | Tiongson et al. | |
| 2010/0146559 A1 | 6/2010 | Lee et al. | |
| 2010/0192179 A1 | 7/2010 | Ellis et al. | |
| 2010/0199340 A1* | 8/2010 | Jonas et al. | 726/8 |
| 2011/0214148 A1* | 9/2011 | Gossweiler et al. | 725/46 |

FOREIGN PATENT DOCUMENTS

| | | | |
|---|---|---|---|
| EP | 1443765 | | 8/2004 |
| EP | 1936986 | | 6/2008 |
| EP | 1954051 | | 8/2008 |
| GB | 506692 | | 5/2005 |
| KR | 10-2005-0016 | * | 2/2005 |
| KR | 20050016685 A | | 2/2005 |
| KR | 20050059355 A | | 6/2005 |
| KR | 20050087997 A | | 9/2005 |
| KR | 20080049868 A | | 6/2008 |
| TW | 200640249 | | 11/2006 |
| WO | 02069636 | | 9/2002 |
| WO | 03088666 | | 10/2003 |
| WO | 2004004383 | | 1/2004 |
| WO | 2004036912 | | 4/2004 |
| WO | 03034735 | | 4/2006 |
| WO | 2006072117 | | 7/2006 |
| WO | 2007131525 | | 11/2007 |
| WO | 2008030298 | | 3/2008 |

OTHER PUBLICATIONS

"Tispan, NGN; NGN generic capabilities and their use to develop services; Draft ETSI TR 1XX XXX", ETSI Standards, Lis, Sophia Antiplois, Cedex, France, No. VO.2.0, Oct. 1, 2005, XP014031601, paragraph [7.4,1.5,4.2.].

Abreu J. et al: "2BeOn: Interactive television supporting interpersonal communication", Proceedings of the Eurographics Workshop on Multimedia, XX, XX, Jan. 1, 2002, pp. 199-208, XP002278091, the whole document.

International Search Report, PCT/US2009/056453, International Searching Authority, European Patent Office, Dec. 23, 2009.

Written Opinion, PCT/US2009/056453, International Searching Authority, European Patent Office, Dec. 23, 2009.

* cited by examiner

METHODS AND SYSTEMS FOR VIEWER INTERACTIVITY AND SOCIAL NETWORKING IN A MOBILE TV BROADCAST NETWORK

CLAIM OF PRIORITY

This application claims the benefit of priority to Provisional Patent Application No. 61/095,931 which was filed on Sep. 10, 2008, the entire contents of which are hereby incorporated by reference.

BACKGROUND

Wireless communication technologies have seen explosive growth over the past few years. This growth has been fueled by wireless services providing freedom of movement to the mobile public, and cutting the tether to a hard-drive communication system. Moreover, increasing quality and speed of voice and data communications over the wireless medium has attracted additional users. As a result of these service enhancements, the popularity of wireless services is expected to continue to grow rapidly.

A recent addition to wireless communication technologies has been the growth of mobile television (TV) broadcast systems. These broadcast systems have seen significant increase in usage and availability worldwide. Currently, electronic devices such as mobile telephone handsets and other terminals may be configured to receive a variety of multimedia content items, such as sports, entertainment, information and programs, or other multimedia content items. Based on their experiences with traditional broadcast networks in particular services provided by cable TV and satellite TV companies consumers have come to expect a high level of services from broadcasters. Mobile TV broadcasters, in turn, are interested in developing new revenue streams and providing engaging user experiences that build upon the strength of the mobile TV broadcast technology.

SUMMARY

The various embodiment methods and systems enable mobile TV broadcast viewers to interact and engage with programming as well as other viewers in a variety of ways. In an embodiment, mobile device users may be enabled to search for the presence and status of other mobile TV viewers. In a further embodiment, mobile device users may be enabled to invite other viewers to watch the same program simultaneously. In another embodiment, mobile device users may be enabled to chat with other viewers who are watching the same program. In a further embodiment, mobile TV viewers may be enabled to rate programs that are broadcasted. In a further embodiment, mobile TV viewers may set reminders on their mobile devices to alert them about their favorite programs and share those reminders with other viewers. In a further embodiment, mobile TV viewers may be enabled to access celebrity hosted channels and communicate with the celebrity during broadcast programming. In a further embodiment, mobile TV viewers may create ad hoc channels, custom channels or collections of viewer-preferred broadcast programming that may be shared with others and enable others to comment on the programs or chat with other viewers.

BRIEF DESCRIPTION OF THE DRAWINGS

The accompanying drawings, which are incorporated herein and constitute part of this specification, illustrate exemplary embodiments of the invention, and together with the general description given above and the detailed description given below, serve to explain the features of the invention.

DETAILED DESCRIPTION

Figure 1:
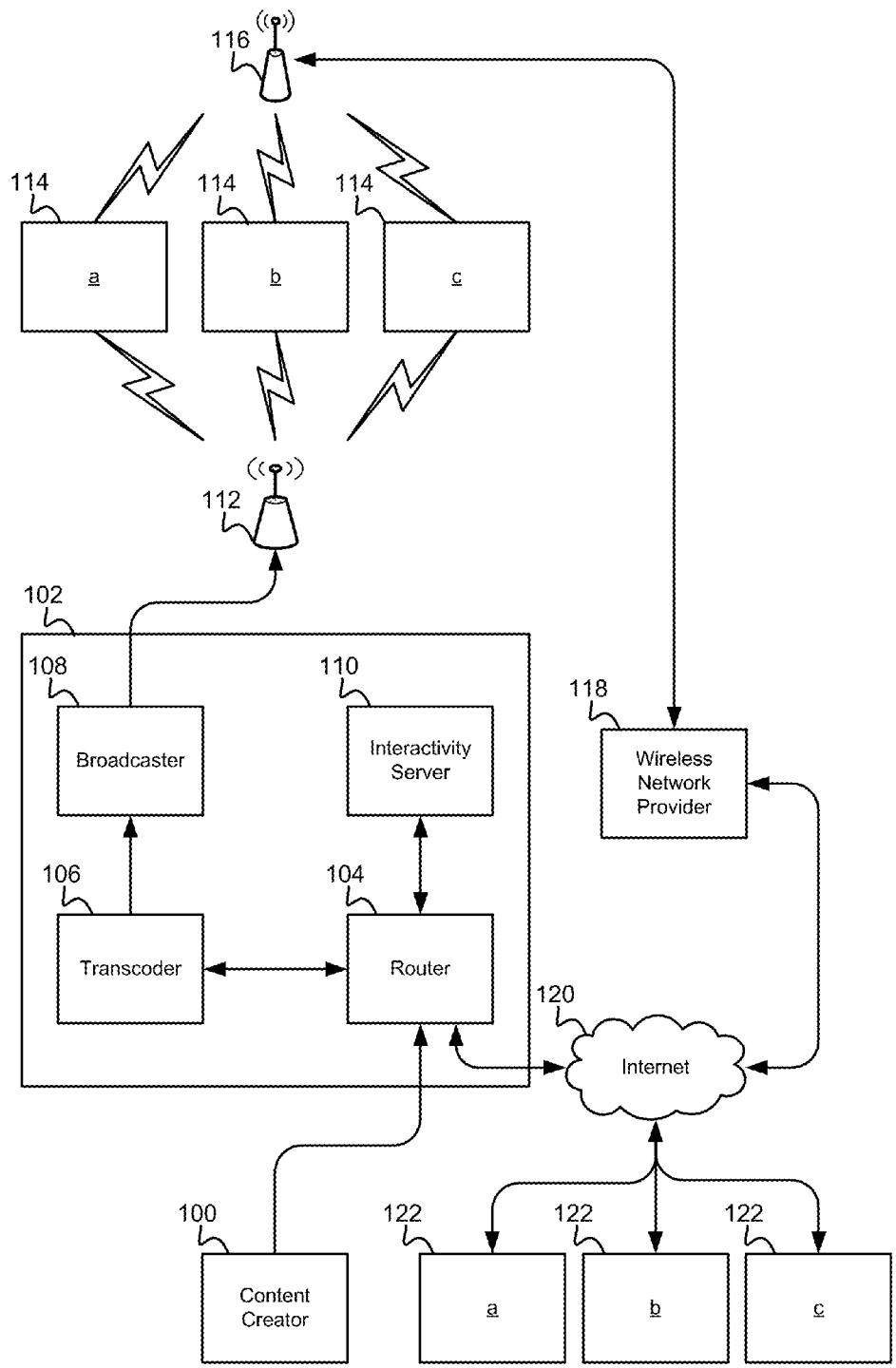
FIG. 1 is a communication network component diagram illustrating different components of a mobile TV broadcast system according to the various embodiments.

The various embodiments will be described in detail with reference to the accompanying drawings. Wherever possible, the same reference numbers will be used throughout the drawings to refer to the same or like parts. References made to particular examples and implementations are for illustrative purposes, and are not intended to limit the scope of the invention or the claims.

The word "exemplary" is used herein to mean "serving as an example, instance, or illustration." Any implementation described herein as "exemplary" is not necessarily to be construed as preferred or advantageous over other implementations.

As used herein, the terms "mobile device" and "handheld device" refer to any one or all of cellular telephones, personal data assistants (PDA's), personal televisions (PTV's), personal media players (PMP's), palm-top computers, wireless electronic mail receivers (e.g., the Blackberry® and Treo® devices), multimedia Internet enabled cellular telephones (e.g., the Blackberry Storm®), Global Positioning System (GPS) receivers, wireless gaming controllers, and similar personal electronic devices which include a programmable processor and memory and receiver circuitry for receiving and processing mobile broadcast television services.

The word "unicast" is used herein to mean the transmission of data (information packets) to a single destination. Examples of unicast transmissions include SMS, MMS, electronic mail messages and Internet Protocol (IP) datagrams. The word "broadcast" is used herein to mean the transmission of data (information packets) so that it can be received by a large number of receiving devices. Examples of a broadcast message are mobile television (TV) broadcast service transmissions.

Mobile TV services are growing in popularity in part because mobile devices provide a unique platform for receiving TV programs and because the bandwidth available in mobile TV broadcast networks can deliver a large amount of content to mobile devices in an efficient manner. One unique aspect of a mobile device is that each user typically owns his/her device and does not have to share it with others. Thus, mobile device owners can watch mobile TV programs of their choosing without having to compete for the TV remote control or negotiate for TV programs they prefer to watch. However, while there is autonomy in viewing mobile TV programs, viewers may lose the sense of community and camaraderie and interactivity that accompanies watching regular TV with friends or family. Currently, if viewers desire to view mobile TV programs together, they must physically be present at the same location.

The various embodiment methods and systems enable mobile TV broadcast viewers to interact and engage with other viewers in a variety of ways. Such interactivity may include enabling mobile TV broadcast viewers to determine presence of other viewers on the mobile TV network, determine whether other viewers are watching mobile TV, invite those who are watching mobile TV to simultaneously watch a program, chat with other viewers, rate programs, set reminders and share those reminders with other viewers, watch hosted programs and create ad hoc channels.

By enabling viewers to interact, broadcast network providers capitalize on the inherent capabilities of mobile devices and allow customers to become active participants in an immersive, highly personalized viewing experience. Applications that drive user involvement not only create the link of stickiness and loyalty that mobile TV service providers need to stay competitive, but provide revenue opportunities in mobile advertising, on-line commerce, and SMS and IP datagram traffic.

The broadcast network provider may communicate with the viewers by using interactivity data. Interactivity data (i.e., viewer data, invitation requests, rating data, etc.) and information regarding program contents may be generated by the mobile TV broadcast provider and broadcasted over a mobile TV broadcast network, such as in an overhead channel or overhead data flow within the mobile TV broadcast transmissions. Mobile devices may receive the overhead content information and generate a display based on the data received in the overhead content, along with a user interface to enable viewers to view the content. Viewers may communicate with the broadcast network provider by sending messages or IP datagrams via a unicast network, such as a cellular data communication network. A client application may be provided in mobile devices to receive the overhead content and process and display the data.

A number of different mobile TV broadcast services and broadcast standards are available or contemplated in the future, all of which may implement and benefit from the various embodiments. Such services and standards include Open Mobile Alliance Mobile Broadcast Services Enabler Suite (OMA BCAST), MediaFLO, Digital Video Broadcast IP Datacasting (DVB-IPDC), and China Multimedia Mobile Broadcasting (CMMB). Typically, mobile broadcast program transmissions are encrypted so that the access to programming can be sold on a subscription or pay-per-view basis, while a service guide is broadcasted unencrypted to enable receiver devices to present users with a listing of available programs.

In a system in which multiple entities contribute to providing mobile TV service to customers, a mobile TV broadcast network provider may receive program and content from one or more content creators, and convert the received content to a format compatible with the mobile TV broadcast network. A mobile TV broadcast network provider may also need to contract with a unicast wireless network provider to obtain the services of a unicast network through which mobile device users can communicate their preference indications or votes to the mobile TV broadcast network provider. For example, mobile device users may order mobile TV services via a cellular data communication network.

The unicast wireless network may be a bi-directional wireless communications link. In the various embodiments the unicast wireless network is configured to communicate voice traffic and/or data traffic among and between various mobile devices, as well as communicate IP datagrams, electronic mail and other digital messaging between mobile devices and remote servers. The unicast wireless network, used by the various embodiments described herein is not limited to a particular bi-directional wireless telecommunications link, or even any particular telecommunication technology and may comprise one or more wired and/or wireless links, including one or more of the ethernet, telephone, cable, power line, and fiber optics systems, and/or a wireless system comprising one or more of the code division multiple access (CDMA or CDMA2000) coming occasion system, frequency division multiple access (FDMA) system, a Time division multiple access (TDMA) system such as GSM/GPRS (General Packet Radio Service)/EDGE (enhanced data GSM environment), a TETRA (Terrestrial Trunked Radio) mobile telephone system, and wideband code division multiple access (WCDMA) system, a higher data rate (1xEV-DO or 1xEV-DO Gold Multicast) system, an IEEE 802.11 (WiFi) system, or an orthogonal frequency division multiple access (OFDM) based system. Examples of wireless network providers may include, Verizon®, Sprint® and Cingular®.

FIG. 1 illustrates network components in a mobile TV broadcast system enabling mobile TV viewers to interact with other viewers. As shown in FIG. 1, content or programs may be provided to a mobile TV broadcast network provider 102 from one or more content creators 100. The content creator 100 may use different methods to send content to the mobile TV broadcast network provider, such as via the Internet or a satellite communication links (not shown).

The mobile TV broadcast network provider 102 may include a variety of components by which it can receive, process and broadcast content from a content creator 100. Real time content and non-real-time content video feeds may be sent to a transcoder 106 for transcoding. The transcoder 106 may extract the core video from the decrypted feed, prepare the video for transcoding, perform functions such as de-interlacing, downsize each video channel to an appropriate format, such as QVGA format, and recompressing the content using, for example, the AVC/H-264 standard. Such transcoding enables high quality video to be produced at low bit rates. The resulting video stream may then be encrypted and sent to a broadcaster 108 for multiplexing into broadcast transmissions that are broadcast by broadcast sites 112.

The broadcaster 108 may also combine multiple video channels and overhead data, such as the programming guide information, into the broadcast transmission signals that are forwarded to transmitter sites 112 for broadcast, such as via cables, satellite data links, microwave data links, or optical fiber data networks. The multiplexed content is broadcasted to mobile devices 114 from the transmitter sites 112.

In the various embodiments, the mobile TV broadcast network provider 102 may include an interactivity server 110 configured with software to process and manage viewer-to-viewer interactions. The interactivity server 110 may communicate with mobile TV viewers by receiving and processing viewer preferences or requests for data and, in response, generating overhead contents including interactivity data. Interactivity data overhead contents generated by the interactivity server 110 may be broadcasted to mobile devices 114 via broadcast transmissions generated by the broadcaster 108.

In the various embodiments, the mobile TV broadcast network provider 102 may include a router 104 configured to receive data arriving at the broadcast network 102 and route that data to the appropriate destination within the broadcast network 102. For example, the router server 112 may be programmed by software instructions to determine whether an incoming message relates to interactivity and route such messages to the interactivity server 110. Contents transmitted from the content creator 100 may first be received by the router 104 before they are transmitted to the transcoder 106. Additionally, messages received from the wireless network may be routed, for example, to the interactivity server 110 depending on the messages. The router 104 may also direct data that is leaving the broadcast network provider 102. For example, data from the interactivity server 110 that may be sent to a mobile device 114 via a unicast message may be sent to the router 104 which routes the message to the wireless network provider 118 for transmission to the mobile device 114. Alternatively, the interactivity server 110 may be configured with software instructions to function as a router, or the interactivity server functionality may be implemented within a server that also functions as a router. Routers and their functionality are well known and their use is routine in the industry.

Information within the interactivity overhead contents generated by the interactivity server 110 may be received and processed by a client application operating within the mobile devices 114 to generate displays and a user interface that allows viewers to interact with the broadcast programs and/or other mobile TV viewers. Thus, mobile devices 114 configured with such a client application may receive, process and display the information contained in the interactivity overhead content. The user interface client application may further accept and interpret viewer inputs, which may be received in the form of button presses or touches on a touch-sensitive display, and communicate their interaction activities to the mobile TV broadcast network provider 102 via a unicast wireless data communication network 118, such as a cellular telephone network or a IEEE 802.11 WiFi network.

The interactivity server 110 may be configured by software instructions to enable mobile TV viewers to determine whether other viewers are present on the mobile TV network, determine whether other viewers are watching mobile TV, invite those who are watching mobile TV to simultaneously watch a program, chat with other viewers, rate programs, set reminders and share those reminders with other viewers, watch hosted broadcast program and create ad hoc channels.

An interactivity server 110 may also be configured with software instructions to transmit interactivity data to a commercial social network website, such as Facebook®. For example, viewer status, such as information about whether the viewer is current watching a program on the mobile TV network, may be transmitted from the interactivity server 110 via the Internet to the social network website profile 122 of the viewer where the profile may be updated to show the viewer's mobile TV status.

According to the various embodiments, viewers may be enabled to search for other viewers' data on the mobile TV broadcast network. Viewer data may include information about the presence and the viewing status of mobile TV viewers. A mobile TV viewer may be present on a mobile TV broadcast network if the viewer has registered or subscribed to the mobile TV broadcast provider. Presence data may include information such as subscription level, mobile device specifications, user personal data (e.g., date of birth and address), etc. Upon signing up with a mobile TV broadcast provider, mobile TV viewers may allow other viewers to receive information about their mobile TV viewing status. Viewing status may include viewing preferences, viewing history, community memberships and current viewing state (i.e., whether the mobile TV viewer is currently viewing a program).

Searches for viewer data may be done manually or automatically. The mobile device 114 of a mobile TV viewer may be configured with software instructions to allow a first viewer to manually input information about a second viewer (e.g., viewers' name, network identifier or handle) which may be used to ascertain the second viewer's viewer data. Alternatively or in addition, the mobile device 114 may also be configured with software instructions to automatically search for a second viewer's viewer data. To conduct the search automatically, the mobile device 114 may access contact databases that may be either available on the mobile device (e.g., contact list) or other databases (e.g., remote email contact database) to retrieve second viewer information. The information may then be used to search the mobile TV network for presence or viewer status of the second viewer.

Once viewer data is received by a mobile device, it may be displayed in different ways. For example, presence of a viewer may be displayed by displaying an avatar next to the contact name in the contact database. In another example, a mobile device may use a graphical user interface to show a status indicator such as a green or red graphical indicator next to the contact's avatar to indicate that the contact is watching mobile TV (e.g., green indicator) or is currently off-line (e.g., red indicator). Other methods are well known and contemplated.

Figure 2:
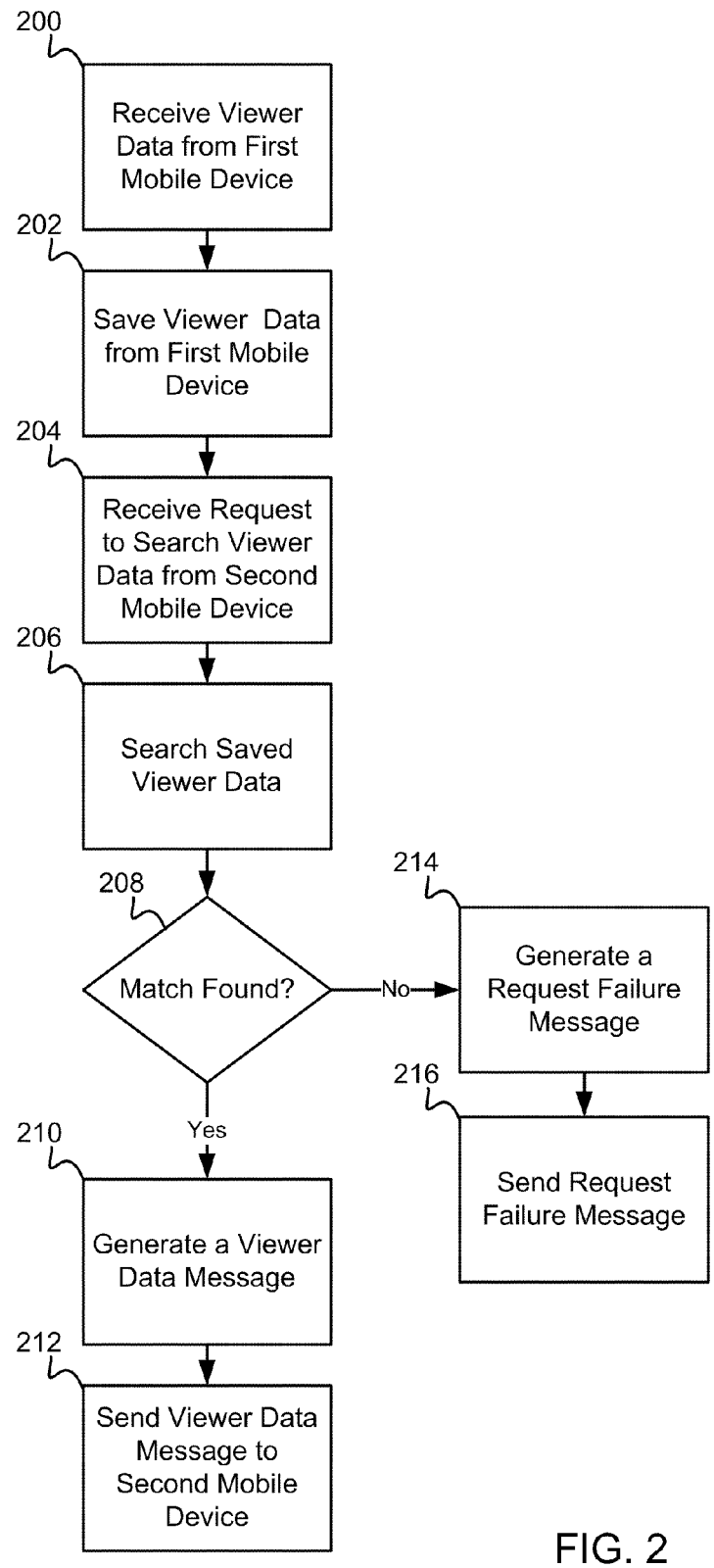
FIG. 2 is a process flow diagram of an embodiment method for searching for a viewer's data according to the various embodiments.

FIG. 2 illustrates an overview embodiment method for enabling a viewer to search for a mobile TV viewer's data. The interactivity server 110 of a broadcast network provider 102 may be configured by software instructions to receive viewer data from a first mobile device 114, step 200, and store the viewer data in memory, step 204. The interactivity server 110 may also be configured by software instructions to receive requests for viewer data from a second mobile device 114, step 204. Once the request for viewer data is received, the interactivity server 110 may search the stored data, step 206, to determine whether the requested viewer data is available, determination 208. If a match is found between the requested data and stored data (i.e., determination 208="Yes"), the interactivity server 110 may generate a viewer data message, including viewer data about the first mobile device 114, step 210, and transmit the message to the requesting second mobile device 114, step 212. If, based on the request received from the second mobile device 114, a match is not found (i.e., determination 208="No"), the interactivity server 110 may be configured with software to generate a request failure message, step 214, and send that message to the second mobile device 114, step 216. Communication between the mobile devices 114 and the interactivity server 110 may be accomplished using the unicast or broadcast networks.

Figure 3:
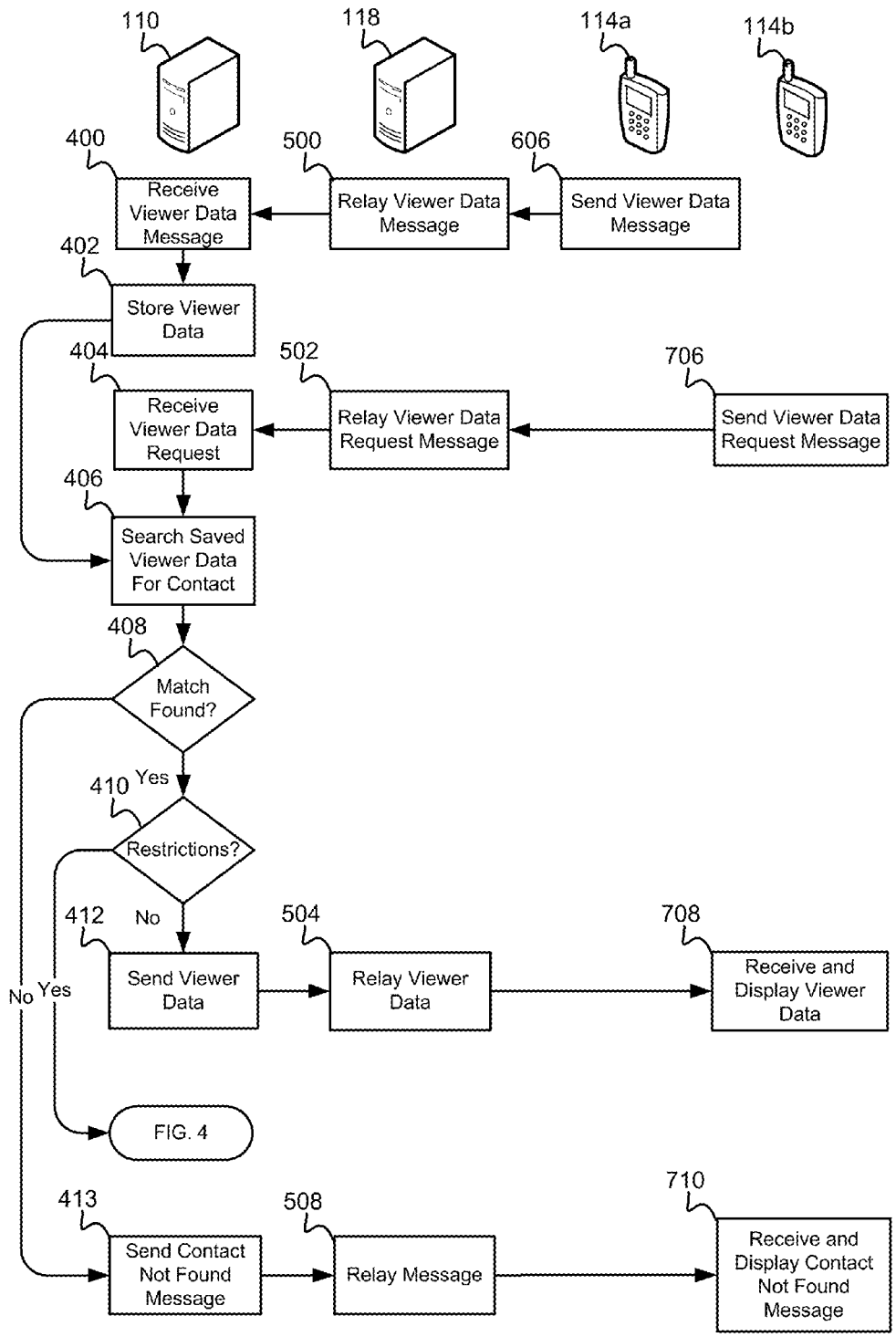
FIGS. 3 and 4 are process flow diagrams of an embodiment method for enabling a mobile TV viewer to search for viewer data and receive search results via the unicast network.
Figure 4:
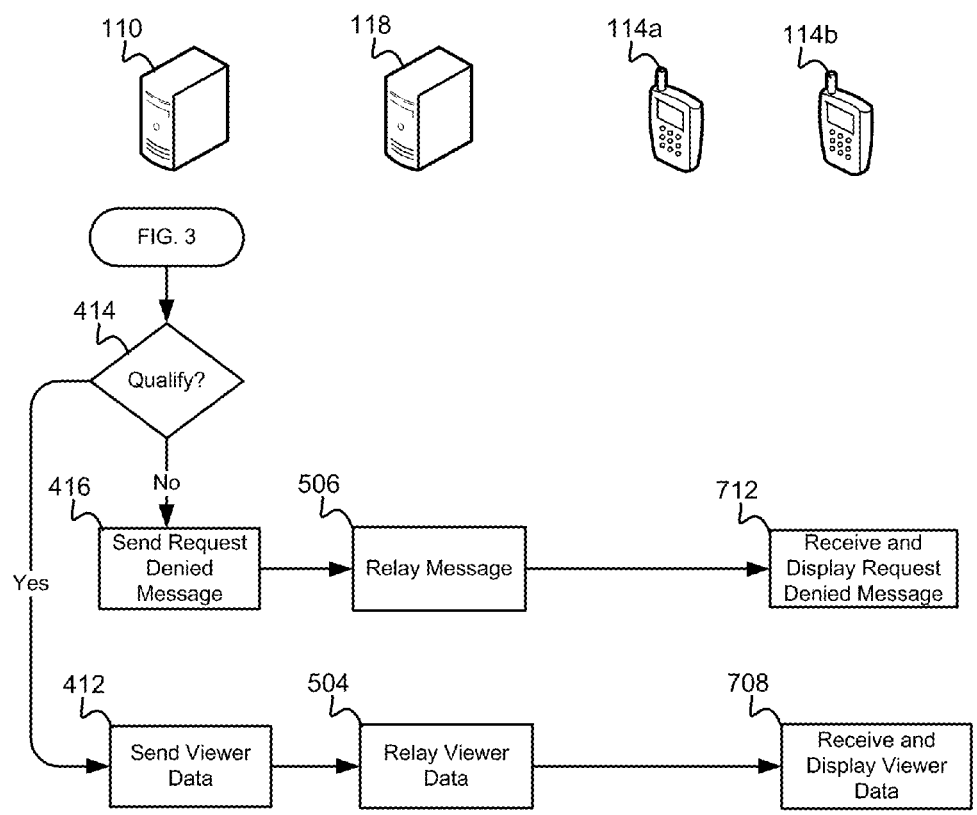

FIGS. 3 and 4 illustrate an embodiment method for enabling a mobile TV viewer to search for viewer data and receive search results via a unicast network. When a first viewer uses a first mobile device 114a to watch mobile TV programs, the mobile device 114a may be configured with software instructions to collect viewer data, and create and send a viewer data message to the broadcast network provider 102 using the unicast network, step 606. The first mobile device 114a may be configured with software instructions to enable the user to set sharing restrictions on the viewer data that may be transmitted to the broadcast network provider 102. For example, the user may be enabled to restrict sharing of his/her viewer data to only those other mobile TV viewers who are part of the first viewer's network of friends. One way a mobile TV viewer may become a member of the first viewer's network of friends may be by sending a friend request message to the first viewer's mobile device 114a and receiving an accept response message from the first viewer mobile device 114a. The viewer data message transmitted from the first mobile device 114a, may be relayed by a wireless data communication network 118, such as in the form of an SMS message, or other device-to-device message relay protocol, step 500, to the broadcast network provider 102. At the broadcast network provider 102, the interactivity server 110 may receive the viewer data message, step 400, extract viewer data from the message and store the data in memory or a viewer data database, step 402.

A second mobile device 114b may receive inputs from a second mobile TV viewer requesting a search for the first viewer data. The second mobile device 114b may be configured with software instructions to receive the search request, generate a viewer data request message and send the message to the broadcast network provider 102 using the unicast network, step 706. The viewer data request message may be relayed by the wireless data communication network 118 to the broadcast network provider 102, step 502. The interactivity server 110 may receive the viewer data request message, step 404, and conduct a search of the stored viewer data, step 406, to determine whether the requested viewer data is present in the stored database, determination 408. If a match is found between the viewer data requested by the second mobile device 114b and viewer data stored in memory (i.e., determination 408="Yes"), the interactivity server 110 may determine whether there are any restrictions that may limit the sharing of the data with the requesting party, determination 410. If no restrictions exist (i.e., determination 410="No"), the interactivity server 110 may retrieve the first viewer data and send the data to the requesting second mobile device 114b via the unicast network, step 412. The first viewer data may be relayed by the wireless communication data network 118 to the second mobile device 114b, step 504. The mobile device 114b may receive and display the viewer data using graphical user interface, step 708.

If a match is not found between the viewer data requested and the viewer data stored in the interactivity server 110 (i.e., determination 408="No"), the interactivity server 110 may generate and send a 'contact not found' message to the mobile device 114b using the unicast network, step 413. The contact not found message may be relayed by the wireless communication data network to the mobile device 114b, step 508. The mobile device 114b may then receive and display the contact not found message, step 710.

As illustrated in FIG. 4, if the first viewer data includes restrictions for disseminating the data (i.e., determination 410="Yes"), the interactivity server 110 may determine whether the second mobile device 114b qualifies or is authorized to receive information about the first viewer, determination 414. If the second mobile device 114b users is not qualified or authorized to receive information about the first viewer (i.e., determination 414="No"), the interactivity server 110 may generate and send a 'request denied' message to the second mobile device 114b using the unicast network, step 416. The request denied message may be relayed by the wireless communication data network 118, step 506, and received and displayed by the second mobile device 114b, step 712. If the second mobile device 114b users is qualified or authorized to receive information about the first viewer (i.e., determination 414="Yes"), the interactivity server 110 may generate and send the first viewer's data to the unicast network, step 412. The viewer data may be relayed by the wireless communication data network 118, step 508, and received and displayed by the second mobile device 114b, step 708.

Figure 5:
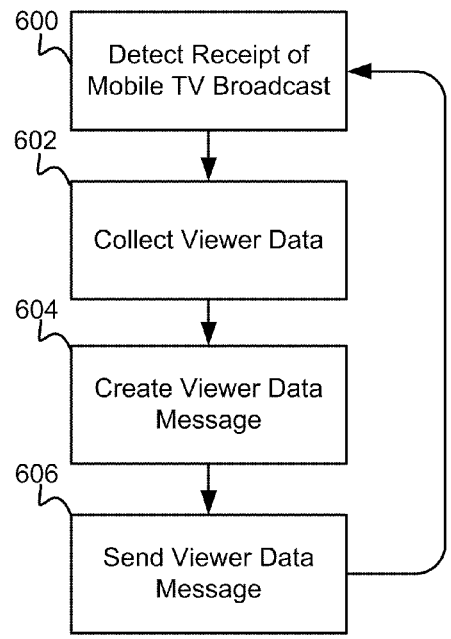
FIG. 5 is a process flow diagram of an embodiment method for collecting and sending viewer data to the broadcast network provider using a mobile device.

FIG. 5 illustrates an embodiment method for collecting and sending viewer data to the broadcast network provider 102 using a mobile device. When mobile TV viewers use their mobile devices 114 to view mobile TV programs, the mobile devices 114 may be configured with software instructions to detect that the device is receiving and displaying a particular mobile TV broadcast, step 600. Upon detecting reception of the mobile TV broadcast, the mobile devices 114 may be configured with software instructions to collect viewer data, step 602, create a viewer data message, step 604 and send the viewer data message to the broadcast network provider 102 using the unicast network, step 606. Viewer data that may be collected may include viewer's mobile TV watching status, the mobile TV program which the user is watching, the viewer's mobile TV watching history, recent advertisement interactions, and any restrictions that the mobile device 114 user has set for sharing viewer data with other mobile TV viewers.

In the foregoing embodiments, the viewer data need not be limited to information regarding a user's viewing status, channel being received or viewing history, and may include user-defined information or messages. Also, the sharing of viewer data need not be limited to acquaintances, and may include affinity groups in which strangers assemble and share a view experience based upon some common interest or personal affinity. In an embodiment, users may enter into their mobile device information about themselves or their interests that they wish to be shared with other people via the embodiments. Thus, users may store descriptive phrases or fill out an electronic survey that stores their affinities, political parties, hobbies, interests, marital status, ethnic or cultural group, and just about any aspect that they are comfortable sharing and being associated with. Such sharing of user interests and information may be implemented in a number of ways, including listings of explicit interests, accessing a catalog maintained on the interactivity (or third party) server to discovery or subscribe to available topics of interest, and implementing Twitter-like tags. For example, a user may enter or indicate a love for cats, interest in gourmet cooking, and or that the user is an enduring fan of William Shatner. As a further example, users may access a catalog of available topics and subscribe to topics like cats, gourmet cooking, and the William Shatner fan club. As a further example, affinity groups may be assigned tags that users can enter to join an affinity group (e.g., "#William_Shatner"). When available for discovery by others, such information may be used to enable affinity groups to form through their common viewing and commenting on mobile TV content broadcasts.

In an embodiment, user defined and shared interests, characteristics and affinities may be received by the interactivity server from user mobile devices in a manner similar to that described above with reference to FIG. 5. The interactivity server may store such information in a database in a format that enables other users to find others who share the same interests. Such user interest data will typically be stored in a format that protects users' identities and preserves user privacy, such as with a pseudonym or random identifier that is only useable by the interactivity server for enabling those with similar interests to interact via their mobile receiver devices as described herein. In this manner strangers with a common interest can find each other to enable the formation of an affinity group based on that interest.

In an embodiment the interactivity server 110 may be configured to enable users to log in to manage their interests and control access permissions. For example, the interactivity server 110 may be configured so that users have accounts in which their interest data is stored, which password controlled access provisions. Using such an interactive database, users may change there interest information frequently. Also, the database may include user-defined parameters or rules that the interactivity server 110 can use to determine whether a user wishes to be contacted or permits sharing of the user's interest information (e.g., for determination 410 in FIG. 3).

In an alternative embodiment, the user's interests and control access permission settings are maintained only on the user's mobile device 114, and are discovered by the interactivity server 110 each time the mobile device 114 is activated. In this embodiment, the user can revise the user's interest settings and set sharing permissions and contact restrictions on the user's mobile device at any time, which then transmits such information to the interactivity server 110 in the manner described above with reference to FIG. 5. In this embodiment the interactivity server 110 does not need to maintain a database of user settings, so users can modify their user information and their permission settings at will and without having to log onto a user database.

In practice, the aspects of defining personal affinities, discovering users with particular affinities, providing presence data (e.g., the user's current viewing status) and respecting individual privacy will all be interrelated. The manner in which these aspects and concerns are balanced may be application-specific and will vary in granularity among different applications or uses. For instance, users may not care who can view chats in a chat session provided user comments are identified only be a user's "handle." However, when sharing presence information, such as the identity of the program being viewed, the same user may wish to limit such information only to friends and family. Similarly, chat messages regarding a program being viewed may be reserved for friends and family. Thus, the embodiments may enable several layered and intertwined access permissions and restrictions, including, for example: restrictions or access permissions defined by entries in the mobile device's address book; an explicit list of friend/family (or other access groups) stored in the interactivity server; and databases maintained by third parties that map a user's "social graph," such as Facebook or Twitter.

Figure 6:
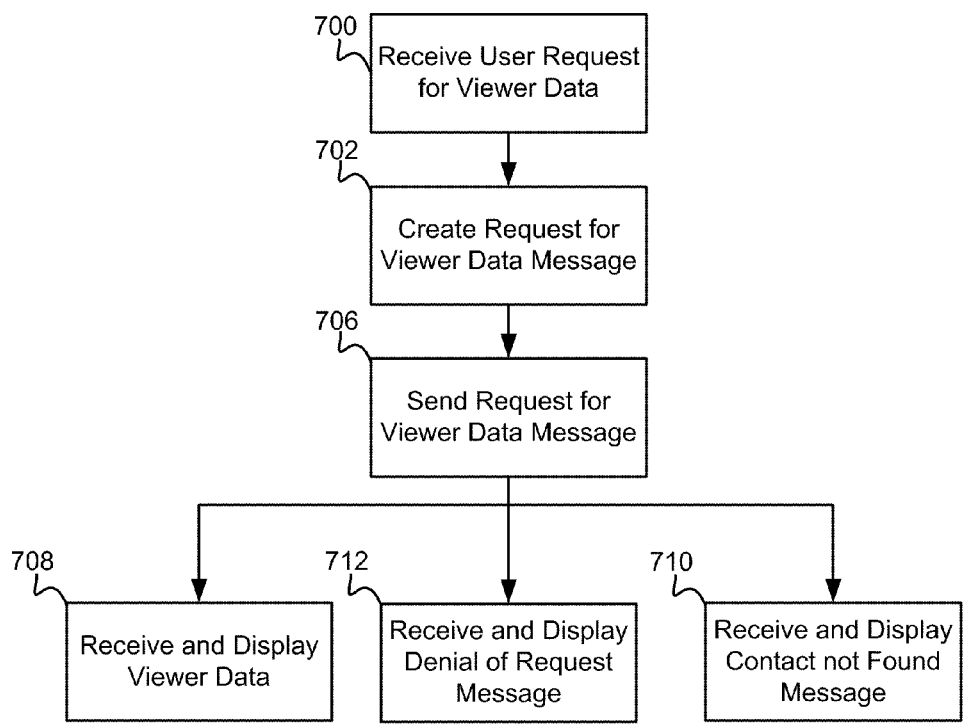
FIG. 6 is a process flow diagram of an exemplary embodiment method for receiving and transmitting a viewer's request to search for viewer data.

FIG. 6 illustrates an exemplary embodiment method for receiving and transmitting a viewer's search request for viewer data. Mobile devices 114 capable of receiving mobile TV contents may be configured with software instructions to enable their users to search for other viewer's viewer data. The mobile device 114 may receive the user's input request for other viewer data, step 700. The data inputted by a user may include the name, ID (e.g., mobile telephone number) or handle of another mobile TV viewer. Based on the inputted data, the mobile device 114 may create a request for viewer data message, step 702, and send that request to the broadcast network provider 102 using the unicast network, step 706. Depending on the availability of and/or restrictions placed on the viewer data, the mobile device 114 may receive different responses from the broadcast network provider 102 via the unicast network provider. The mobile device 114 may receive and display the requested viewer data, step 708. This message may be received when the viewer data is available at the broadcast network provider 102 and sharing of the data is allowed. As noted above, users may identify specific information for sharing and set permissions for sharing by entering such information into their mobile device, by updating a database that may be hosted by the interactivity server 110 (or another server). The mobile device may receive and display a denial of request message, step 712. This message may be received when viewer data is available at the broadcast network provider but certain pre-set restrictions prevent the broadcast network provider 102 from transmitting that data to the mobile device 114. The mobile device may receive and display a contact not found message, step 710. This message may be received when the requested viewer data is not available at the broadcast network provider 102 or the broadcast network provider is unable to find the requested data.

FIGS. 7-10 illustrate an exemplary embodiment method for enabling mobile TV viewer to search for viewer data and receive search results via broadcast transmissions instead of via a unicast message as described above with reference to FIGS. 3-4. In this embodiment, messages forwarding viewer data to particular recipients may be encrypted or tagged (e.g., with an intended recipient ID within packet headers) so only those mobile devices 114 possessing the decryption key or looking for the packet tag will extract the messages from the broadcast overhead content. Communicating with particular mobile devices or groups of mobile devices reduces the use of unicast networks which may charge users for the data messages.

Figure 7:
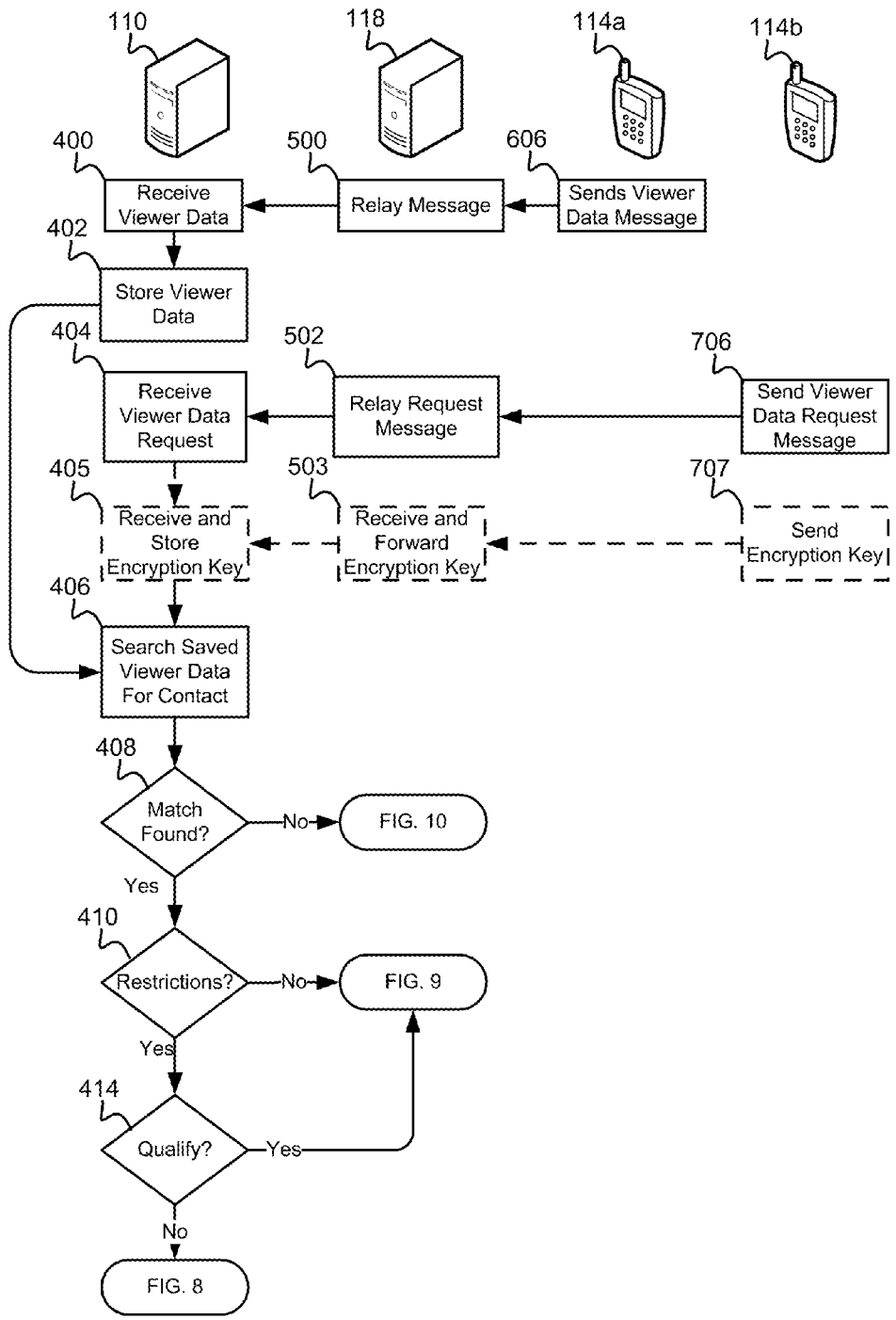
FIGS. 7-10 are process flow diagrams of an exemplary embodiment method for enabling mobile TV viewer to search for viewer data and receive search results via the broadcast network.
Figure 8:
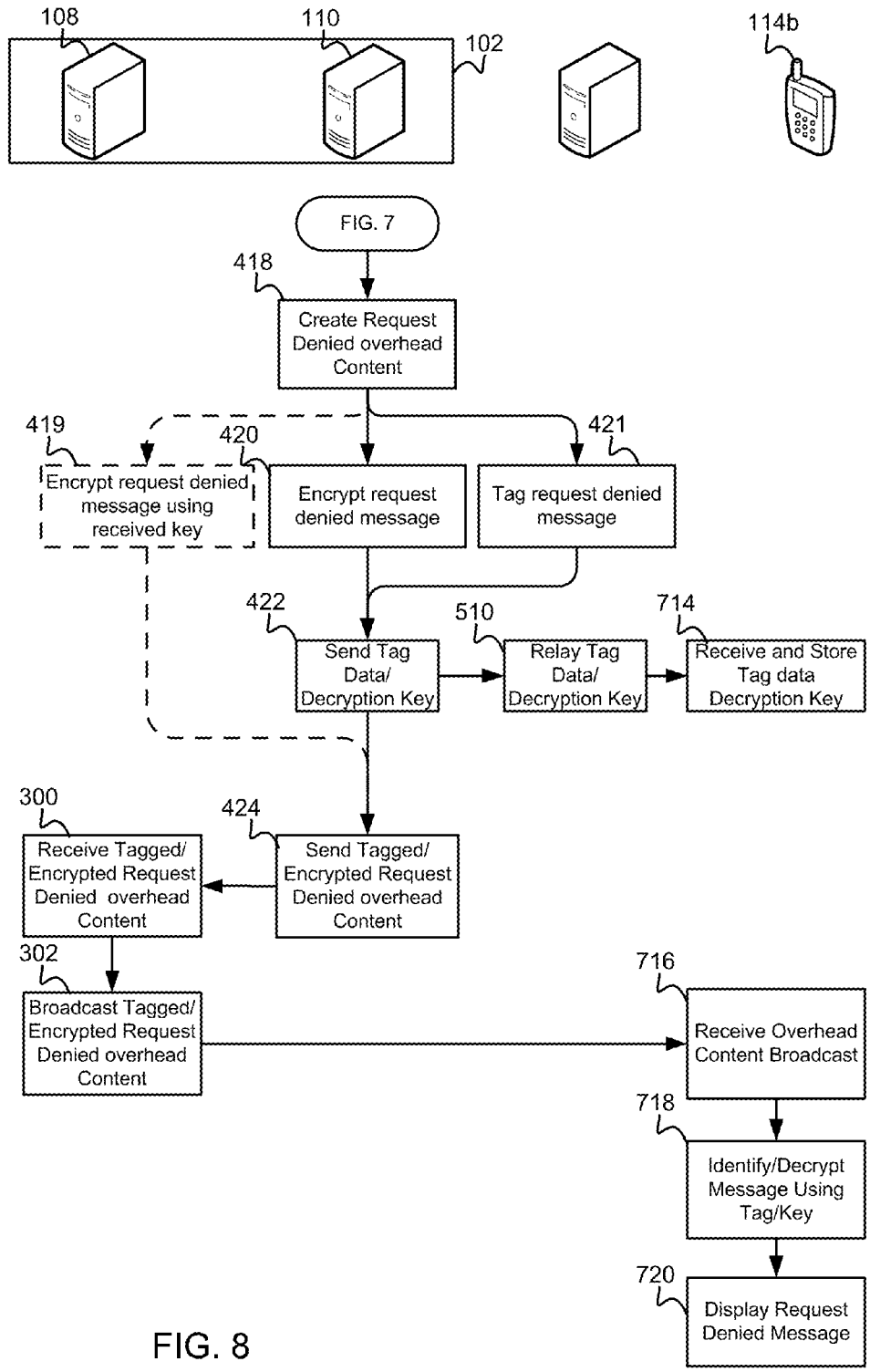

Referring to FIG. 7, when a first viewer uses a first mobile device 114a to watch mobile TV programs, the mobile device 114a may be configured with software instructions to collect viewer data and create and send a viewer data message to the broadcast network provider 102 via the unicast network, step 606. In an embodiment, the first mobile device 114a may be configured with software instructions to enable the user to set sharing restrictions on the viewer data that may be transmitted to the broadcast network provider 102. The viewer data message transmitted from the first mobile device 114a may be relayed by a wireless data communication network 118 to the broadcast network provider 102, step 500. At the broadcast network provider 102, the interactivity server 110 may receive the viewer data message, step 400, extract viewer data from the message and store the data in memory, step 402.

A second mobile device 114b may receive an input from a second mobile TV viewer requesting a search for the first viewer data. The second mobile device 114b may be configured with software instructions to receive the search request, generate a viewer data request message and send the message to the broadcast network provider 102 via the unicast network, step 706. The viewer data request message may be relayed by the wireless data communication network 118 to the broadcast network provider 102, step 502. The interactivity server 110 may receive the viewer data request message, step 404, and conduct a search of the stored viewer data, step 406, to determine whether the requested viewer data is present in the stored database, determination 408.

In an optional embodiment that enables responses to be transmitted from the broadcast network provider 102 via a broadcast channel or flow, the second mobile device 114b may be configured by software to generate an encryption key and send it to the broadcast network provider 102 via the unicast network, alternative step 707. The encryption key may be relayed by the wireless communication data network 118 to the broadcast network provider 102, step 503. The interactivity server 110 at the broadcast network provider 102 may receive the encryption key and store it, step 405. This encryption key may be a low security key, such as a password or PIN number, that the interactivity server 110 or broadcaster 108 can use to encrypt data messages so that they can be broadcast in the overhead content flow for reception only by the second mobile device 114b or other devices that have the key.

If a match is found between the viewer data requested by the second mobile device 114b and viewer data stored in memory (i.e., determination 408="Yes"), the interactivity server 110 may determine whether there are any restrictions that may limit the sharing of the data with the requesting party, determination 410. If the first viewer data includes restrictions for disseminating the data (i.e., determination 410="Yes"), the interactivity server 110 may determine whether the second mobile device 114b qualifies or is authorized to receive information about the first viewer, determination 414. If the second mobile device 114b user is not qualified or authorized to receive information about the first viewer (i.e., determination 414="No"), the interactivity server 110 may create a request denied message for broadcast in the overhead content to the mobile device 114b, step 418, illustrated in FIG. 8.

The interactivity server 110 may encrypt the request denied overhead content using an encryption key, step 420. If the requesting mobile device 114b did not provide the encryption key (optional step 707), a decryption key may be sent to the mobile device 110 via the unicast network, step 422. The decryption key may be relayed by the wireless communication data network 118 to the second mobile device 114b, step 510. The second mobile device 114b may receive and store the decryption key, step 714, which may be used to decrypt broadcast overhead content that may be received from the broadcast content provider 102.

Optionally, the interactivity server 110 may encrypt the request denied overhead content using the encryption key that was received from the mobile device 114b, step 419. Accordingly, the interactivity server 110 may not have to send a decryption key to the mobile device 114b because the encryption key was generated by and received from the mobile device 114b.

Instead of encrypting response messages, the interactivity server 110 may tag the request denied message so that it may be broadcasted in the overhead content flow and received only be the mobile device 114b looking for message packets including the tag, step 421. The tag may be a number specific and known to the targeted mobile device 114, such as a mobile device 114 ID or mobile telephone number. Alternatively, the interactivity server 110 may send the tag information to the mobile device 114b via the unicast network, step 422, so that the mobile device 114b can use the tag to identify and extract messages broadcasted in the overhead content intended for its reception. The tag information may be relayed by the wireless communication data network 118, step 510, and received and stored by the mobile device 114b, step 714. Receipt of tag data or a decryption key is optional because the tag or decryption key information may already be known to the first mobile device 114 from an earlier communication with the interactivity server 110, such as in a previous message received from the interactivity server 110 or as information received and stored in memory as part of a registration process. When the mobile device 114b knows the tag that will be used to identify messages intended for its reception (whether provided by the device to the server, known to the device, or received via a unicast message), the mobile device 114b can use it look for and receive tagged messages, such as a tagged request denied message, that are broadcast in the overhead content of the mobile TV broadcast transmissions.

Once the request denied message is tagged or encrypted, the interactivity server 110 may send the tagged/encrypted message to the broadcaster to be broadcasted to mobile TV viewers in the overhead content portion of broadcast transmissions, step 424. The broadcaster 108 may receive the tagged/encrypted message, step 300, and broadcast it to mobile TV viewers, step 302. The mobile device 114b may receive the tagged/encrypted overhead content, step 716, and receive the request denied message by selecting the message for processing based upon identifying the tag in a packet header, or being able to decrypt the message payload using the decryption key that is known or provided to it, step 718. The mobile device 114b may then display the request denied message to the viewer using the graphical user interface of the device, step 720.

Figure 9:
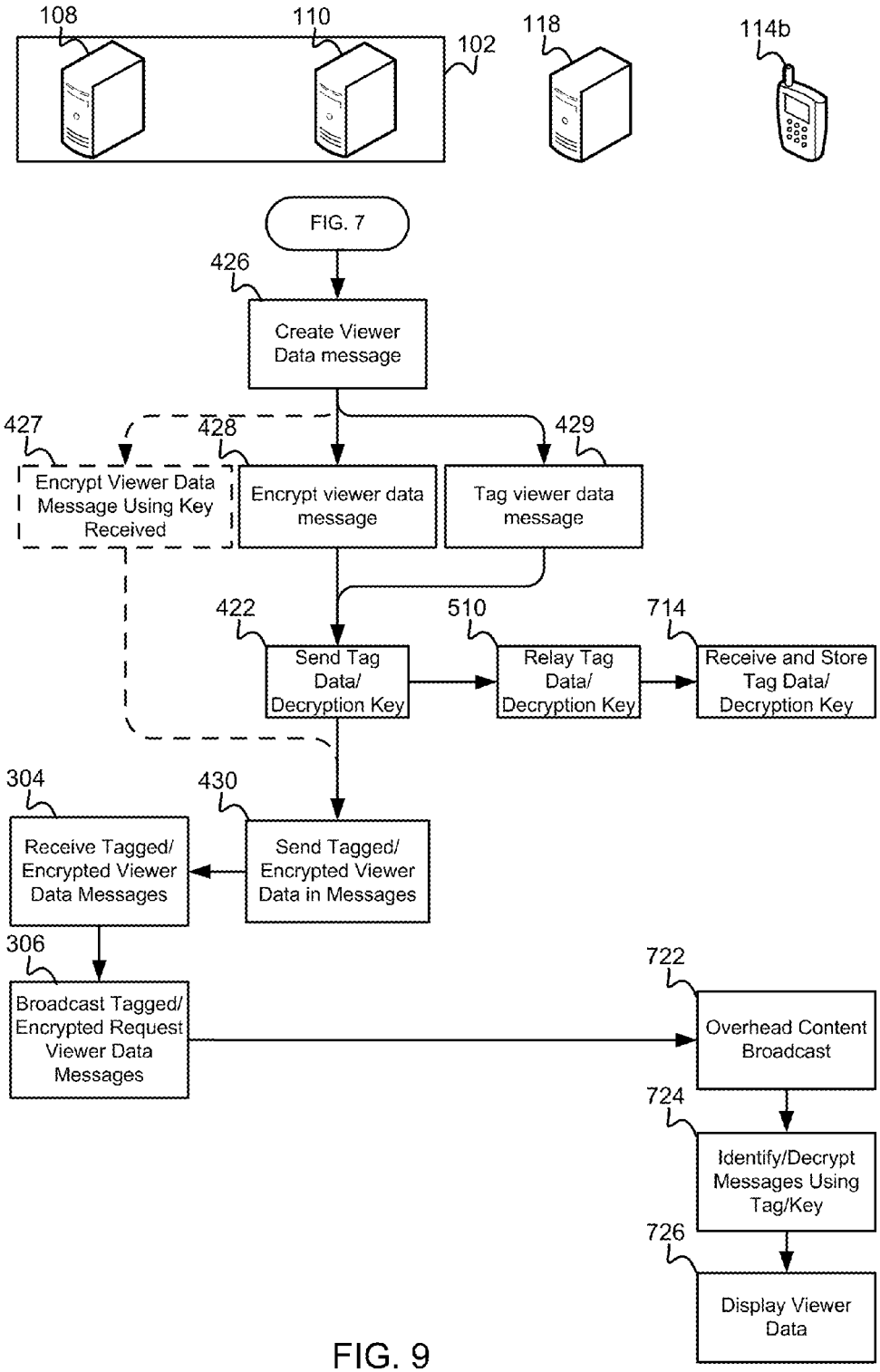

If the second mobile device 114b users is qualified to receive information about the first viewer (i.e., FIG. 7 determination 414="Yes"), the interactivity server 110 may generate one or more viewer data messages to send the first viewer's data to the requesting mobile device 114b via the unicast network, step 426, illustrated in FIG. 9. The interactivity server 110 may encrypt the viewer data overhead content using an encryption key, step 428. If a decryption key was not provided by the requesting mobile device 114b, a decryption key may be generated and sent to the mobile device 110 via the unicast network, step 422. The decryption key may be relayed by the wireless communication data network 118 to the second mobile device 114b, step 510. The second mobile device 114b may receive and store the decryption key, step 714, which may be used to decrypt the viewer data message broadcast in the overhead content by the broadcast content provider 102.

Optionally, the interactivity server 110 may encrypt the viewer data overhead content using the encryption key that was received from the mobile device 114b, step 427. In this case, the interactivity server 110 need not send the decryption key to the mobile device 114b because the encryption key was generated by and received from the mobile device 114b.

Instead of encrypting the viewer data messages, the interactivity server 110 may tag the viewer data messages so they may be broadcasted in the overhead content flow and received only be the mobile device 114b looking for message packets including the tag, step 429. As described above, the tag may be a number specific and known to the targeted mobile device 114, such as a mobile device 114 ID or mobile telephone number. Alternatively, the interactivity server 110 may send the tag information to the mobile device 114b via the unicast network, step 422, so that the mobile device 114b can use the tag to identify and extract messages broadcasted in the overhead content intended for its reception. The tag information may be relayed by the wireless communication data network 118, step 510, and received and stored by the mobile device 114b, step 714. When the mobile device 114b knows the tag that will be used to identify messages intended for its reception, the mobile device 114b can use it look for and receive tagged messages, such as a tagged viewer data messages, that are broadcast in the overhead content of the mobile TV broadcast transmissions.

Once the viewer data messages are encrypted or tagged, the interactivity server 110 may send the encrypted/tagged messages to the broadcaster 108 to be broadcasted to mobile TV viewers in the overhead content, step 430. The broadcaster 108 may receive the tagged/encrypted viewer data messages, step 304, and broadcast them to mobile TV viewers in the overhead content, step 306. The mobile device 114b may receive the overhead content broadcast, step 722, and select for reception or decrypt the viewer data messages intended for the mobile device 114b tag data using the tag or decryption key known to the device, step 724. Once the viewer data message has been extracted from the overhead content, the mobile device 114b may display the viewer data message to the viewer using the graphical user interface of the device, step 726.

If no restrictions on sharing of the viewer data exist (i.e., determination 410="No"), the interactivity server 110 may retrieve the first viewer data and send the viewer data to the requesting second mobile device 114b following the steps described above with reference to FIG. 9.

Figure 10:
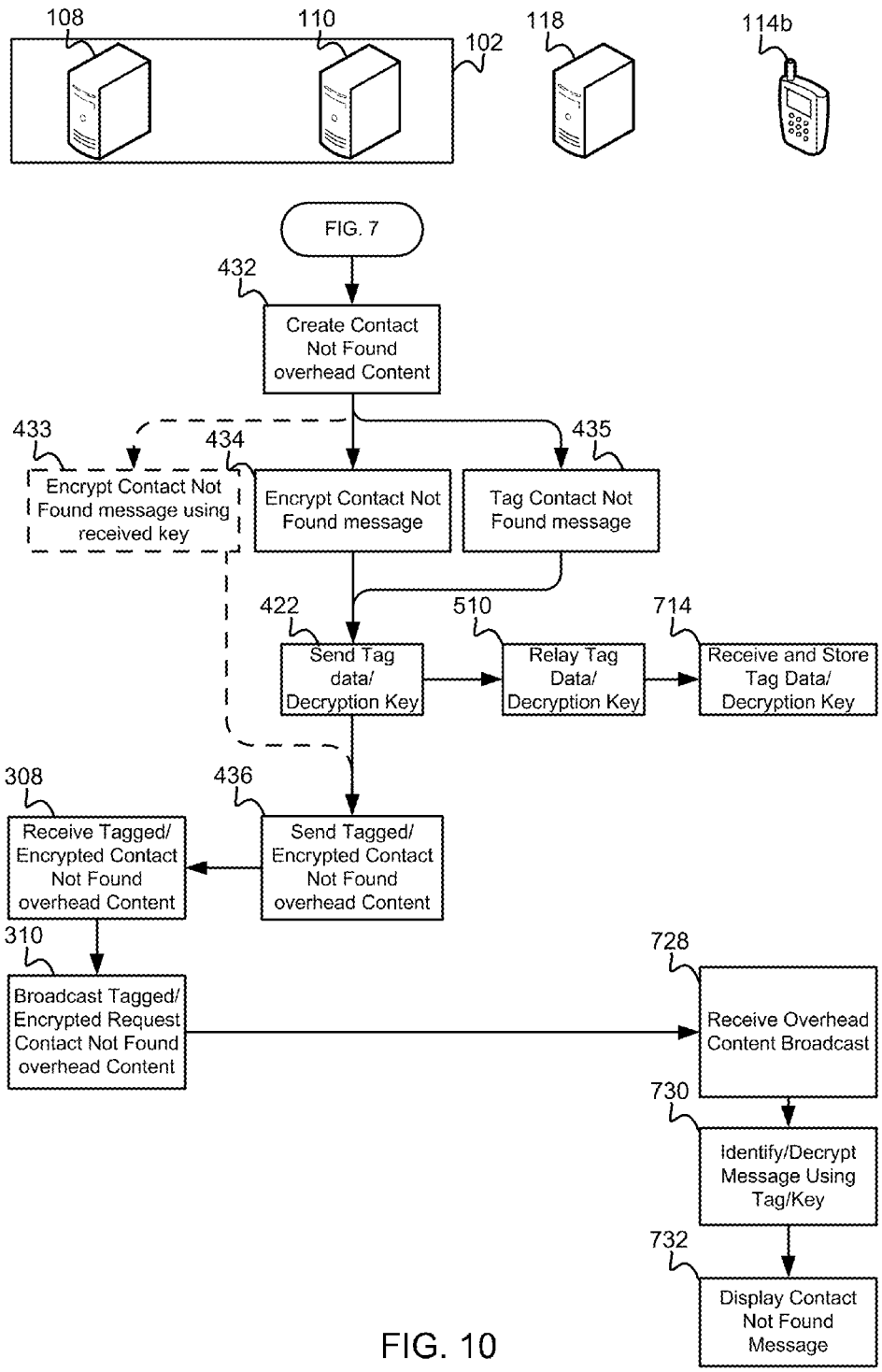

If the interactivity server 110 is unable to find data matching the search request (i.e., determination 408="No"), the broadcast network provider 102 may create a contact not found message to be sent to the requesting mobile device 114b, step 432 illustrated in FIG. 10. Similar to the methods for broadcasting the request denied message and the viewer data messages described above with reference to FIGS. 8 and 9, respectively, the interactivity server 110 may create a contact not found message, step 432, that may be prepared for transmission to the requesting mobile device 114b via broadcast transmissions by encrypting the message using a provided encryption key, step 433, encrypting the message using a server-generated encryption key, step 434, or in a tagged message, step 435.

Once the content not found message is tagged or encrypted, the interactivity server 110 may send the tagged/encrypted message to the broadcaster 108 to be broadcasted to mobile TV viewers in the overhead content flow, step 436. The broadcaster 108 may receive the tagged/encrypted message, step 308, and broadcast it to mobile TV viewers in the overhead content, step 310. The mobile device 114b may receive the overhead content, step 728, and select for reception or decrypt the viewer data messages intended for the mobile device 114b using the tag or decryption key known to the device, step 730. Once the contact not found message is identified or decrypted, the mobile device 114b may display the contact not found message to the viewer using the graphical user interface of the device, step 732.

Figure 11:
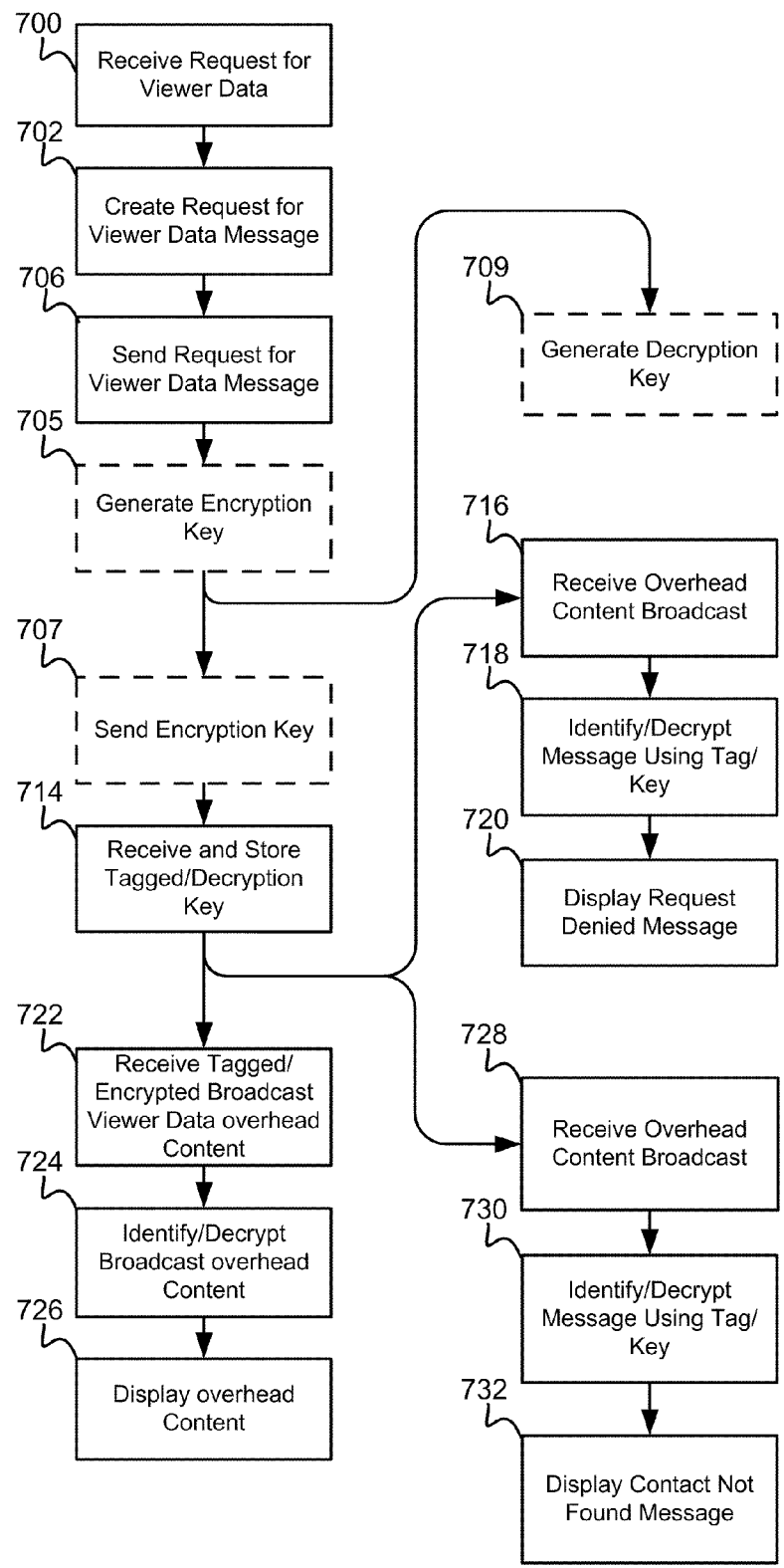
FIG. 11 is a process flow diagram of an exemplary embodiment method for using a mobile device for searching for viewer data and receiving search results via the broadcast network.

FIG. 11 illustrates an exemplary embodiment method for using a mobile device for searching for viewer data and receiving search results via the broadcast network. Mobile devices 114 capable of receiving mobile TV contents may be configured with software instructions to enable their users to submit search requests for other viewer's viewer data. Accordingly, the mobile devices 114 may be configured with software instructions to receive the user's input requesting viewer data, step 700. The data inputted by a user may include the name, ID or handle of another mobile device user. Based on the inputted data, the mobile device 114 may create a request for viewer data message, step 702, and send that message to the broadcast network provider 102 via the unicast network, step 706. The mobile device 114 may receive tag data or a decryption key from the broadcast network provider 102 via the unicast network, step 714. Receipt of tag data or a decryption key is optional because the tag or decryption key information may already be known to the first mobile device 114 from an earlier communication with the interactivity server 110, such as in a previous message received from the interactivity server 110 or as information received and stored in memory as part of a registration process. The mobile device 114 may use the tag data to identify or the decryption key to decrypt encrypted messages broadcast in the overhead content intended for the mobile device 114.

Optionally, mobile devices 114 may be configured with software instructions to also generate an encryption key, step 705, and send the encryption key to the broadcast network provider 102, step 707. This capability allows the requesting mobile device 114 to propose the encryption that will be used by the interactivity server 110 to encrypt messages sent in the overhead content broadcasts that are intended for reception only by the mobile device 114. Based on the type of encryption key generated, the mobile device 114 may also generate a decryption key, step 709, which may be used to decrypt broadcast messages received from the broadcast network provider 102 and encrypted using the encryption key sent by the mobile device 114.

Depending on the availability of and/or restrictions placed on the viewer data, the mobile device 114 may receive different responses from the broadcast network provider 102 via the unicast network provider. If there are restrictions placed on the viewer data requested and the requesting mobile device 114 does not qualify for receiving the viewer data based on the required qualifications, the mobile device 114 may receive a tagged or encrypted request denied message broadcast in the overhead content, step 716. If the message is tagged, the mobile device may identify the message within the overhead content flow using the tag data received from the broadcast network provider 102 or a tag stored in memory, step 718. If the message is encrypted, the mobile device 114 may decrypt the message in the overhead content using the decryption key receive from the broadcast network provider 102, step 718. If the message was encrypted using an encryption key generated and sent from the mobile device 114, the mobile device 114 may use a decryption key associated with transmitted encryption key to decrypt the broadcasted overhead content in step 718. The mobile device 114 may then display the decrypted request denied message, step 720.

If the interactivity server 110 is unable to find matching viewing data based on the search request sent by the mobile device 114, the mobile device 114 may receive a tagged or encrypted contact not found message via the overhead content broadcast, step 728. If the data received is tagged, the mobile device 114 may use tag data stored in memory to select the message from the broadcasted overhead content, step 730. If the message is encrypted, the mobile device 114 may decrypt it using the decryption key received from the broadcast network provider 102 or a decryption key associated with a transmitted encryption key, step 730. The mobile device 114 may then display the contact not found message, step 732.

If the interactivity server 110 has received and stored the requested viewer data and there are no restrictions placed on sharing the viewer data or the mobile device 114 qualifies or is authorized to receive the viewer data, the mobile device 114 may receive the requested viewer data in messages contained in the broadcast overhead content, step 722. The mobile device 114 may identify viewer data messages based upon detecting a tag in message headers in the overhead content flow, or decrypt viewer data messages in the overhead content using a decryption key received from the broadcast network provider 102 or a decryption key associated with transmitted encryption key, step 724. The mobile device 114 may then display the decrypted viewer data, step 726.

Figure 12:
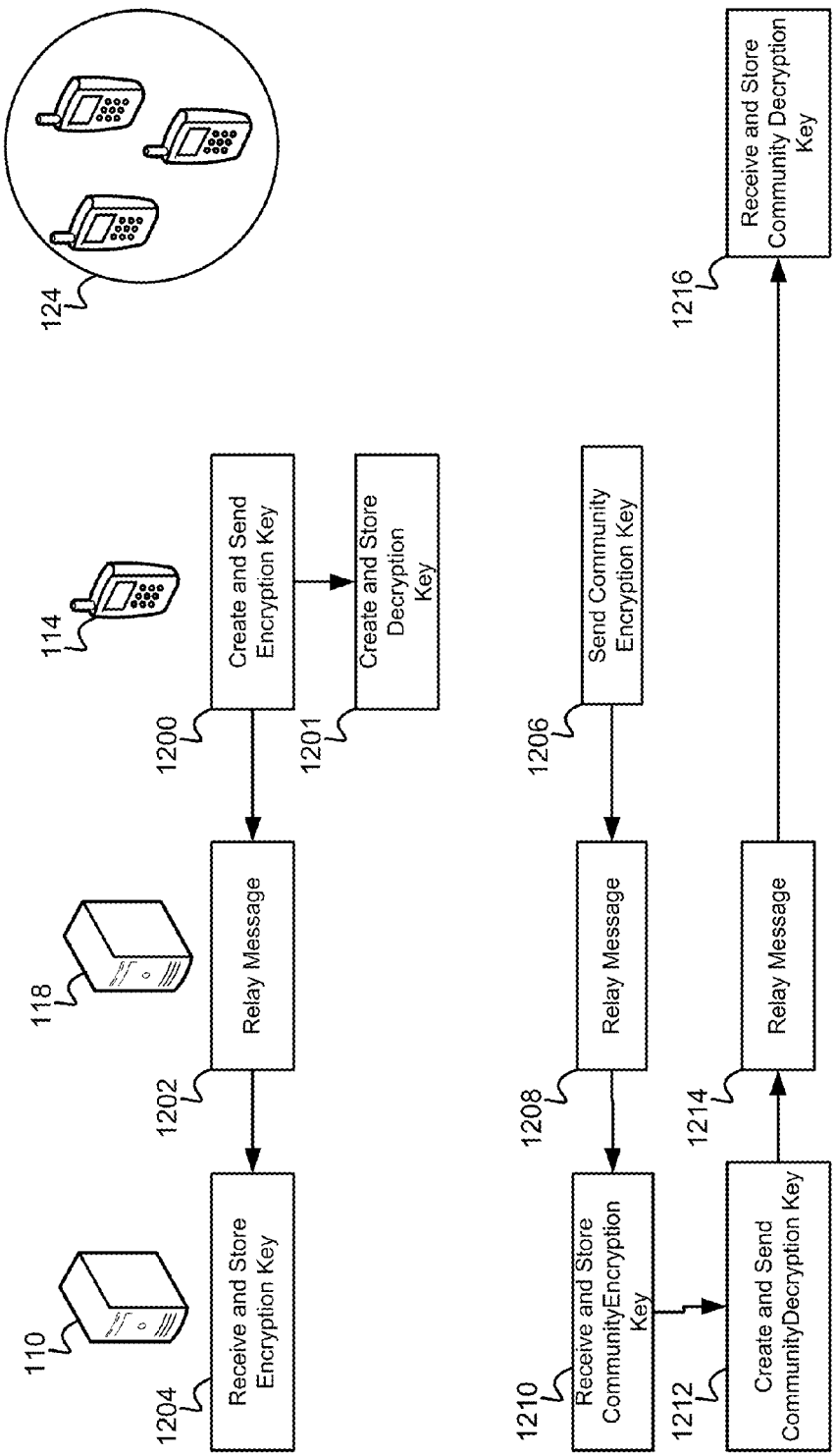
FIG. 12 is a process flow diagram of an exemplary embodiment for enabling mobile devices to transmit encryption keys generated by the mobile device to the interactivity server.

FIG. 12 illustrates an exemplary embodiment method for transmitting an encryption key generated by the mobile device 114 to the interactivity server 110. When the mobile device 114 requests viewer data from a mobile TV broadcast network provider 102, the mobile device 114 may be configured to create send an encryption key to the broadcast network provider 102, step 1200. Sending an encryption key to the broadcast network provider 102 enables the broadcaster to reply to requests with messages broadcast in the overhead content flow encrypted so only the mobile device 114 can receive them. The encryption key may be relayed to the broadcast network provider 102 via the wireless communication data network provider 118, step 1202. The interactivity server 110 may receive and store the encryption key, step 1204. The mobile device 114 may also create and store a corresponding decryption key, step 1201, which the device can use to decrypt messages received in the overhead content flow.

Encryption keys may also be sent to a broadcast network provider 102 to enable broadcast of messages in the overhead content intended for a community of mobile devices (i.e., multiple mobile devices 114) that all possess a corresponding decryption key. To create a community channel 124, a mobile device 114 may generate a community encryption key and send it to the broadcast network provider 102, step 1206. The community encryption key may be relayed to the broadcast network provider 12 via the wireless communication data network provider 118, step 1208. The interactivity server 110 may receive and store the community encryption key, step 1210. The interactivity server 110 may create and send a community decryption key to each mobile device member of the community channel 124, step 1212. The wireless network provider 118 made relay the community decryption key from the broadcast network provider 102 to each mobile device 114 in the community, step 1214. The community mobile devices 114 may receive and store the community decryption key, step 1216, which may be used to decrypt messages in the overhead content flow that are intended for delivery to the community by being encrypted using the community encryption key.

The various embodiment methods and systems may enable a mobile TV viewer to invite others or be invited by other viewers to watch a particular program broadcast. Each viewer who receives an invitation from another mobile TV viewer may have the options to accept or deny the invitation. By accepting an invitation, the invitee viewer's mobile device may be directed to begin receiving the same program as the viewer who initiated the invitation. By denying an invitation, the invitee viewer may continue to watch the program he/she was watching before receiving the invitation.

Figure 13:
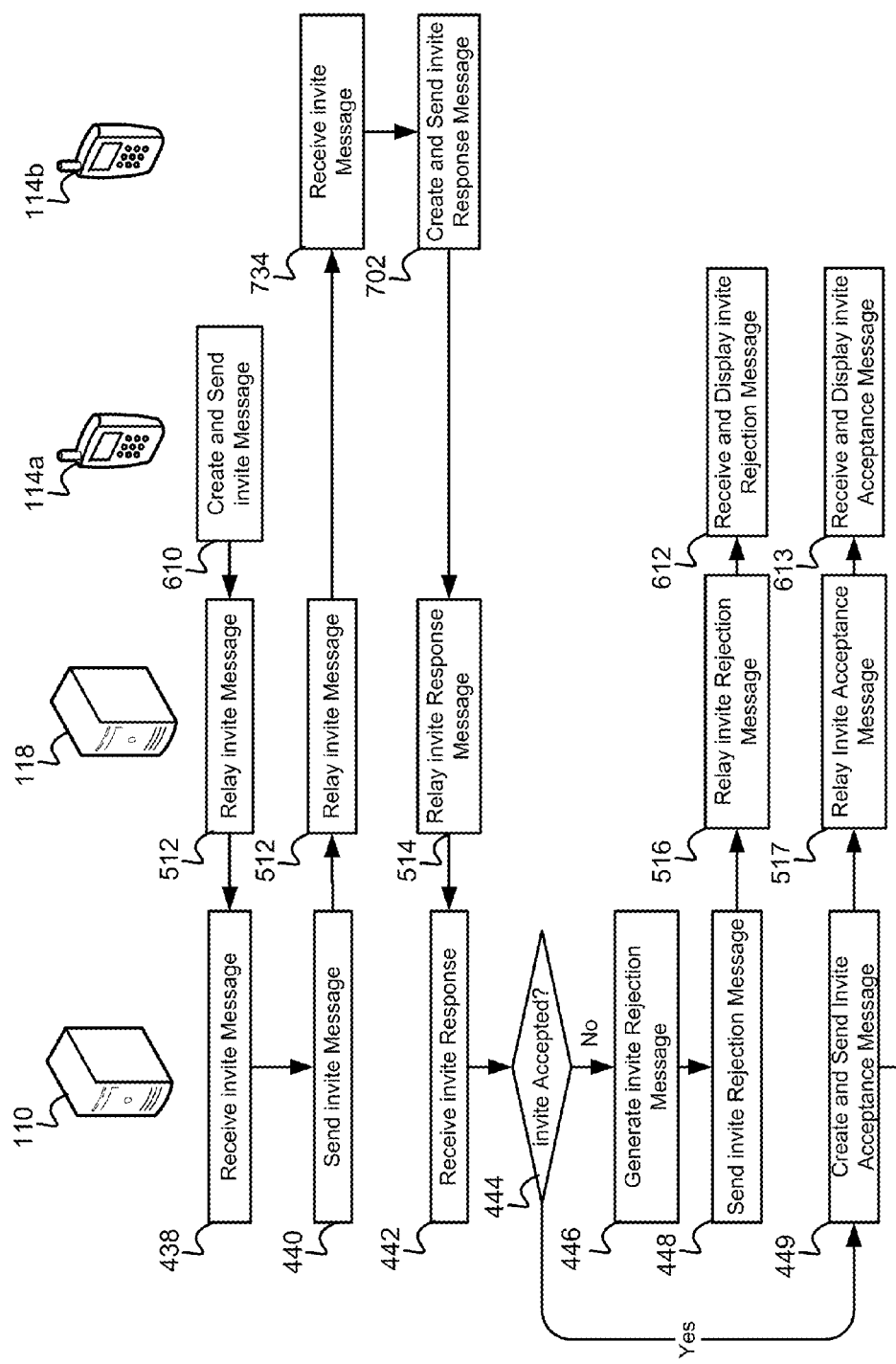
FIGS. 13 and 14 are process flow diagrams of an embodiment method for enabling viewers to invite other viewers to watch a particular program using the unicast network.
Figure 14:
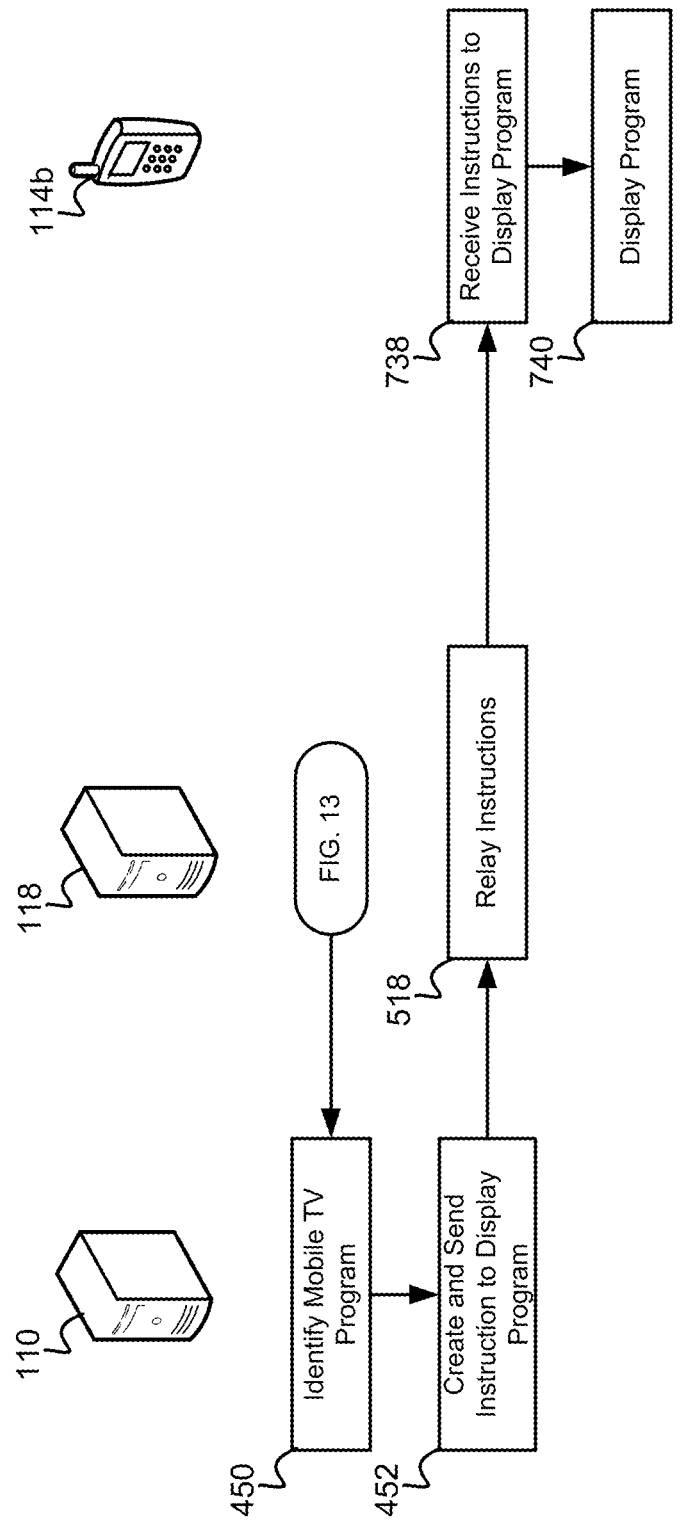

FIGS. 13 and 14 illustrate embodiment methods for enabling viewers to invite other viewers to watch a particular program with messages sent via a unicast network. As illustrated in FIG. 13, a first mobile device 114a user may send an invitation message to invite a second mobile device 114b user to watch the program that the first mobile device viewer is currently watching, step 610. The invitation message may be relayed by the wireless communication data network 118 to the second mobile device 114b, step 512. The interactivity server 110 may receive the invitation message, step 438, and send it to the second mobile device 114b via the unicast network or via the broadcast network, step 440. The invitation message may be relayed by the wireless communication data network 118 to the second mobile device 114b, step 512. The second mobile device 114b may receive the invitation message, step 734, and create and send an invitation response message to the broadcast network provider 102, step 702. The invitation response message may be relayed by the wireless communication data network 118 to the broadcast network provider 102, step 514. The interactivity server 110 may receive the invitation response, step 422, and determine whether the invitation was accepted by the invitee, determination 444. If the invitation was rejected (i.e., determination 444="No"), the interactivity server 110 may generate an invitation rejection message, step 446, and send the invitation rejection message to the first mobile device 114a via the unicast network, step 448. The invitation rejection message may be relayed by their wireless communication data network 118, step 516. The first mobile device 114a may receive and display the invite rejection message, step 612.

If the invitation is accepted by the second mobile device 114b (i.e., determination 444="Yes"), the interactivity server 110 may be configured with software instructions to create and send an invitation acceptance message to the first mobile device 114a via the unicast network, step 449. The wireless communication data network 118 may relay the invitation acceptance message to the first mobile device 114a, step 517. The first mobile device 114a may then receive and display the invitation acceptance message, step 613.

Using the program information received in the invitation message or viewer data received from mobile devices 114, the interactivity server 110 may also determine the mobile TV program that is reportedly being watched on a first mobile device 114a and send that information to a second mobile device 114b so that it can tune into the same program. An example method for accomplishing this is illustrated in FIG. 14. The interactivity server 110 extracts the program information from the invitation message or accesses the viewer data stored in memory for the first mobile device 114a to determine the mobile TV program it is reportedly receiving, step 450. Using this information, the interactivity server 110 can create and send an instruction message to a second mobile device 114b to cause the same program to be displayed, step 452. The instruction methods may be transmitted via a wireless communication data network 118 which relays the message to the second mobile device 114b, step 518. The second mobile advice 114b may receive the instruction message, step 738, and implement the instructions sent by the interactivity server 110 so as to begin receiving and displaying the program that is being watched by the first mobile device 114a users, step 740.

Figure 15:
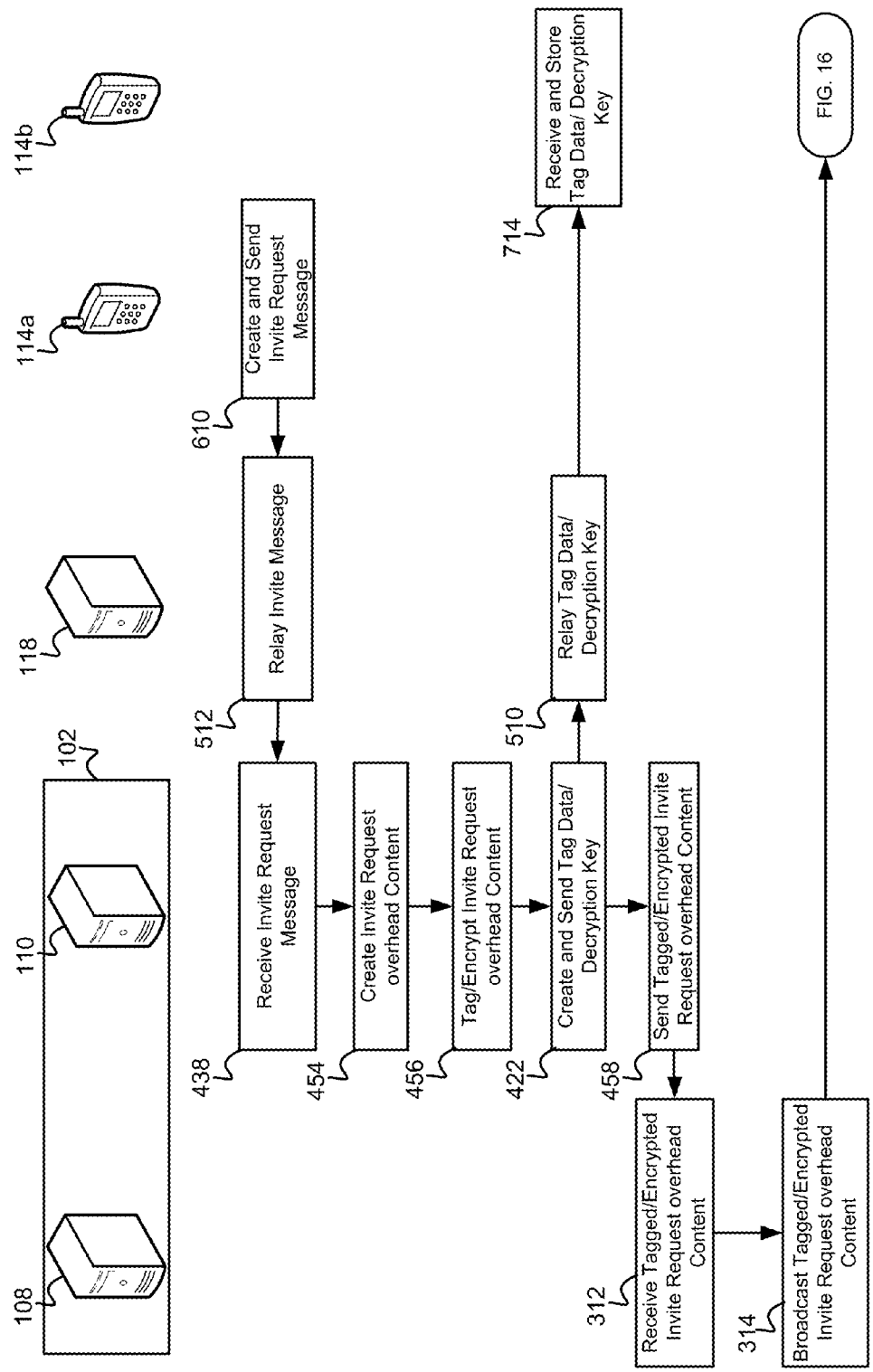
FIGS. 15-19 are process flow diagrams of an embodiment method for enabling viewers to invite other viewers to watch a particular program using the broadcast network.

FIGS. 15-19 illustrate an embodiment method for enabling viewers to invite other viewers to watch a particular program using the mobile broadcast TV network. As illustrated in FIG. 15, a first mobile device 114a may create an invitation request message to invite a second mobile device 114b to watch a program and send the message to the broadcast network and provider 102 via the unicast network, step 610. The wireless communication data network 118 relays the invitation message to the broadcast network provider 102, step 512. The interactivity server 110 receives the invitation request message, step 438, and creates an invitation request message for transmission via the broadcast overhead content, step 454.

As described more fully above, the interactivity server 110 may tag or encrypt the invitation request message for transmission to the intended receiver via the broadcast overhead content, step 456. If the overhead content is tagged, the interactivity server 110 may create and send tag data to the second mobile device 114b via the unicast network, step 422. Alternatively if the overhead content is encrypted, the interactivity server 110 may create and send a decryption key to the second mobile device 114b via the unicast network, step 422. The wireless communication data network 118 may relay the tag data or the decryption key to the second mobile device 114b, step 510. The second mobile device 114b may receive and store the tag data or the decryption key which may be used to identify or decrypt broadcasts messages received from the broadcast network provider 102, step 714. Transmission of tag data or a decryption key is optional because the tag or decryption key information may already be known to the first mobile device 114 from an earlier communication with the interactivity server 110, such as in a previous message received from the interactivity server 110 or as information received and stored in memory as part of a registration process.

The interactivity server 110 may send the tagged/encrypted invitation request message to the broadcaster 108 for inclusion in the broadcast overhead content, step 458. The broadcaster may receive the tagged/encrypted invitation request message, step 312 and broadcast the message in the overhead content for receipt by the second mobile device 114b, step 314.

Figure 16:
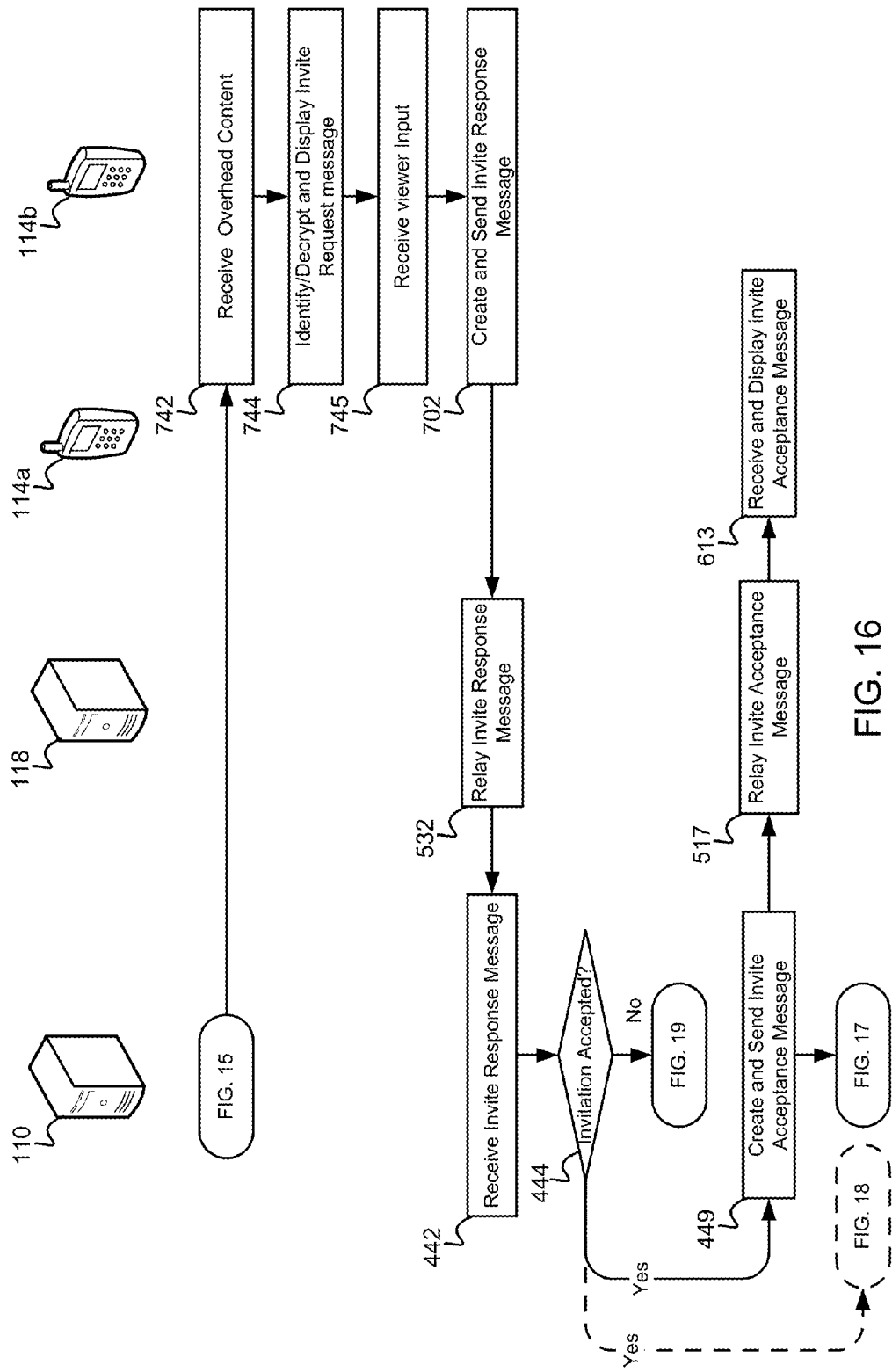

Referring to FIG. 16, the second mobile device 114b may receive the overhead content including the tagged/encrypted invitation request message, step 742. If the broadcast content is tagged, the second mobile device 114b may be configured with software instructions to use the tag data received from the interactivity server 110 to identify the invitation request message in the overhead content, access the invitation information within the message, and display the invitation request, step 744. Alternatively, if the broadcast content is encrypted, the second mobile device 114b may be configured with software instructions to use a decryption key received from the interactivity server 110 to decrypt the invitation request message, access the invitation information within the message, and display the invitation request, step 744. The second mobile device 114 be may then receive the viewer input, which may constitute an answer to the invitation request, step 745, and create and send an appropriate invitation response message to the interactivity server 110 via the unicast network, step 702. The wireless communication data network 118 may relay the invitation response message to the broadcast network provider 102, step 532.

The interactivity server 110 may receive the invite response message, step 442, and determine whether they invitation is accepted, determination 444. If the invitation is accepted by the second mobile device 114b user (i.e., determination 444="Yes"), the interactivity server 110 may create and send an invitation acceptance message to the first mobile device 114a via the unicast network, step 449. The wireless communication data network 118 may relay the invitation acceptance message to the first mobile device 114a, step 517, which receives and displays the invitation acceptance message to the viewer, step 613. Alternatively, the interactivity server 110 may transmit the invitation acceptance message to the first mobile device 114a by broadcasting it in the overhead content using the various embodiment methods as explained below with reference to FIG. 18.

Figure 17:
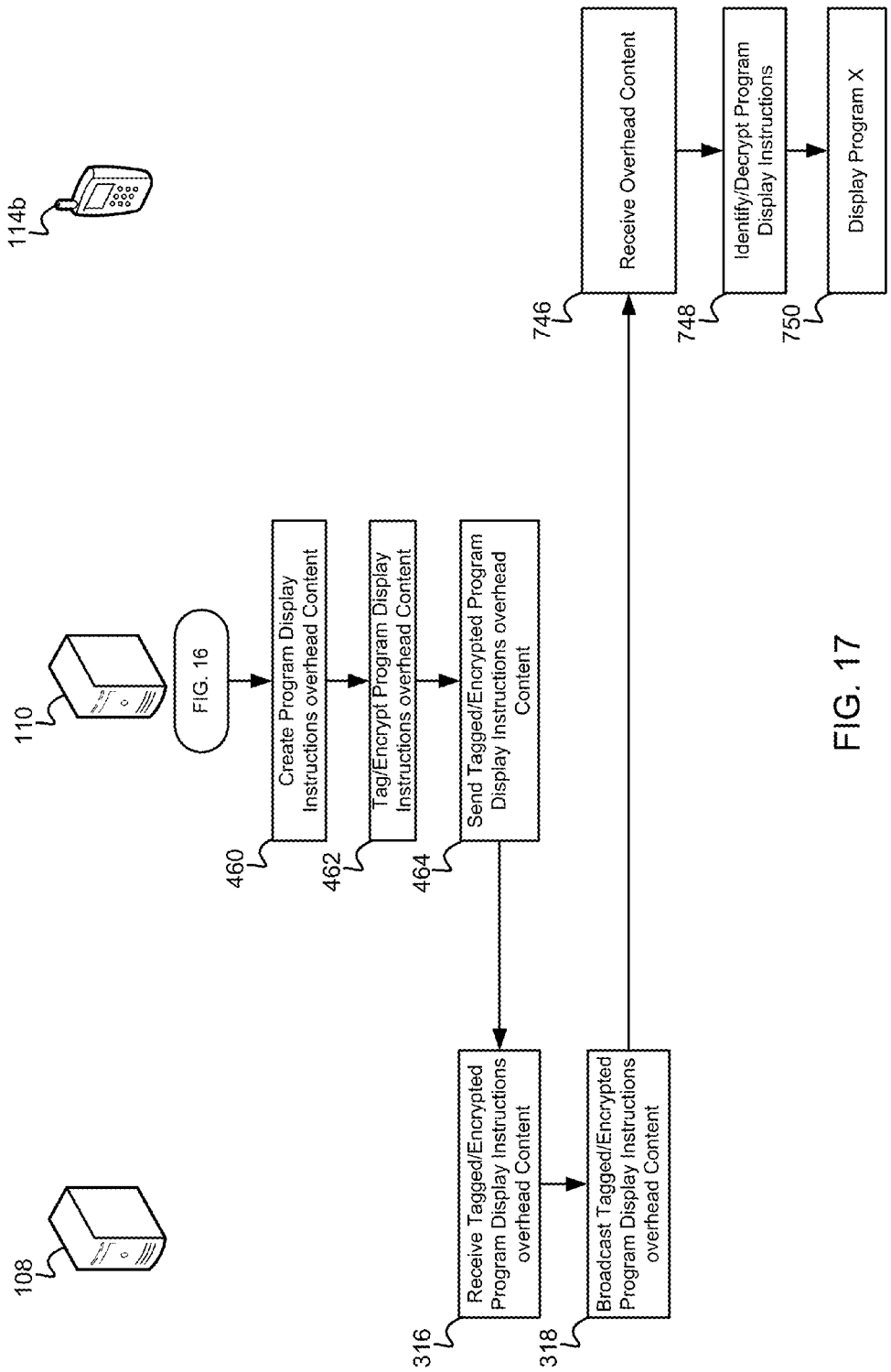

As illustrated in FIG. 17, the interactivity server 110 may also be configured to create a program display instructions message to allow the second mobile device 114b users to watch a program which is currently being displayed by the first mobile device 114a, step 460. The interactivity server 110 may tag or encrypt the program display instructions message, step 462, and send the message to the broadcaster 108, step 464. The broadcaster 108 may receive the message, step 316, and broadcast the tagged or encrypted program display instructions message in the broadcast overhead content, step 318. The second mobile device 114b may receive the overhead content containing the tagged or encrypted program display instructions, step 746. If the program display instructions message is tagged, the second mobile device 114b may use the tag data received from the interactivity server 110 to identify the message within the broadcasted overhead content, step 748. If the program display instructions message is encrypted, the second mobile device 114b may use the decryption key received from the interactivity server 110 to decrypt the message, step 748. The second mobile device 114b may then implement the received instructions so as to display the program that is currently watched by the first mobile device 114a user.

Figure 18:
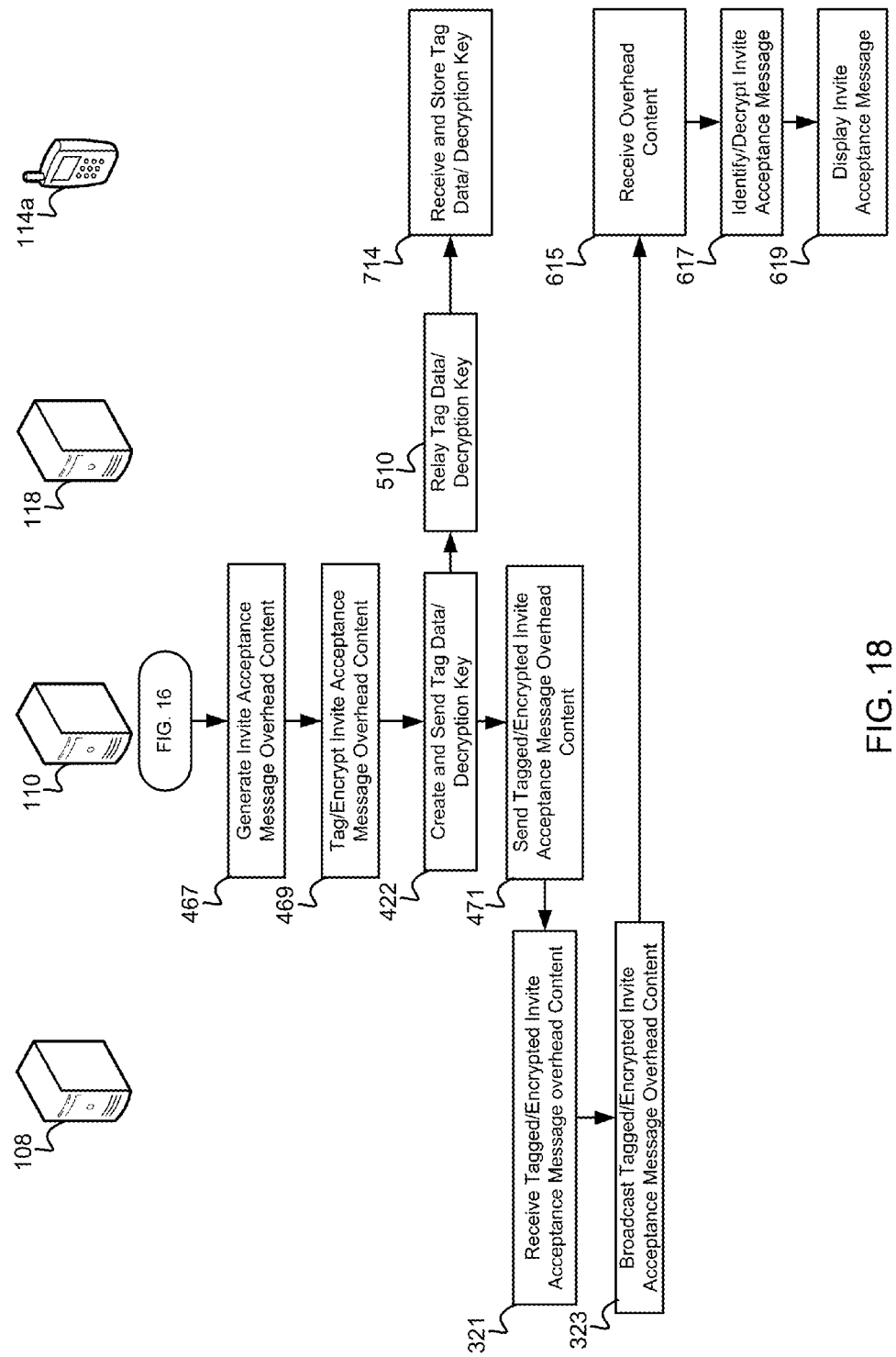

Optionally, as illustrated in FIG. 18, if the second mobile device 114b accepts the invitation from the first mobile device 114a (i.e., determination 444="Yes"), the interactivity server 110 may generate an invitation acceptance message for transmission in the broadcast overhead content, step 467, by either tagging or encrypting the message, step 469. The interactivity server 110 may create and send tag data or a decryption key to the first mobile device 114a via the unicast network, step 422. The wireless communication data network 118 may relay the tag data or decryption key to the first mobile device 114a. The first mobile device 114a may receive and store the tag data or decryption key for use in extracting the invitation acceptance message from within the broadcast overhead content, step 714. The interactivity server 110 may send the tagged or encrypted invitation acceptance message to the broadcaster 108, step 471, which may receive it, step 321, and broadcast the tagged or encrypted invitation acceptance message in the overhead content, step 323. The first mobile device 114a may receive the overhead content containing the tagged or encrypted invitation acceptance message, step 615. If the invitation acceptance message is tagged, the first mobile device 114a may use the tag data received from the interactivity server 110 to identify the message within the broadcast overhead content, step 617. If the invitation acceptance message is encrypted, the first mobile device 114a may use the decryption key received from the interactivity server 110 to decrypt the message received from the overhead content, step 617. The invitation acceptance message may then be displayed, step 619.

Figure 19:
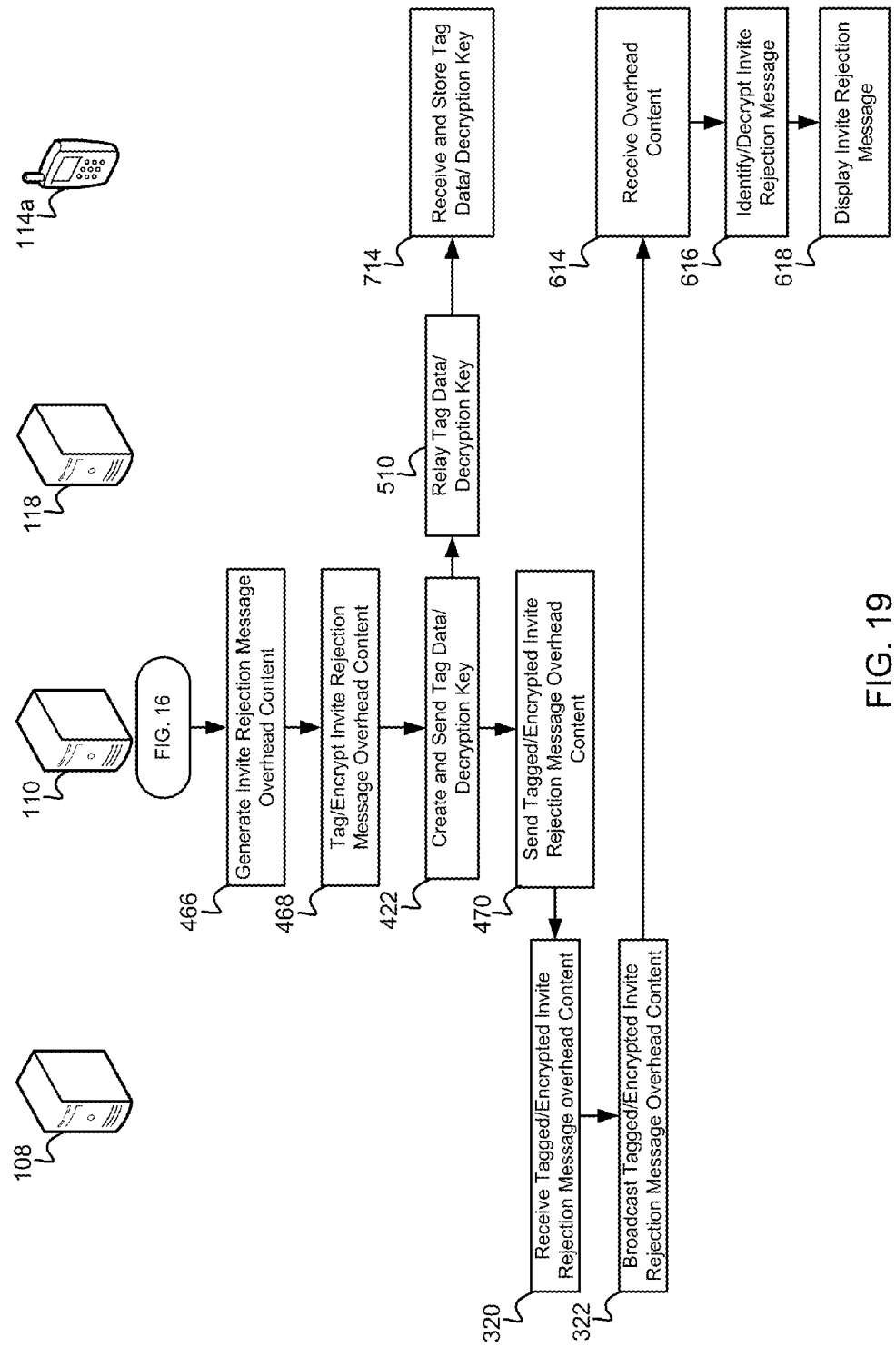

As illustrated in FIG. 19, if the second mobile device 114*b* rejects the invitation from the first mobile device 114*a* (i.e., determination 444="No"), the interactivity server 110 may generate an invitation rejection message, step 466, and either tag or encrypt it for transmission to the intended recipient in the broadcast overhead content, step 468. To enable such communication, the interactivity server 110 may create and send tag data or a decryption key to the first mobile device 114*a* via the unicast network, steps 422, 510, 714. The interactivity server 110 may send the tagged or encrypted invitation rejection message to the broadcaster 108, step 470. The broadcaster 108 may receive the invitation rejection message, step 320, and broadcast the tagged or encrypted invitation rejection message in the overhead content, step 322. The first mobile device 114*a* may receive the overhead content, step 614. If the invitation rejection message is tagged, the first mobile device 114*a* may use the tag data received from the interactivity server 110 to identify the message within the overhead content, step 616. If the invitation rejection message is encrypted, the first mobile device 114*a* may use the decryption key received from the interactivity server 110 to decrypt the received message, step 616. The invitation rejection message may then be displayed, step 618.

Figure 20:
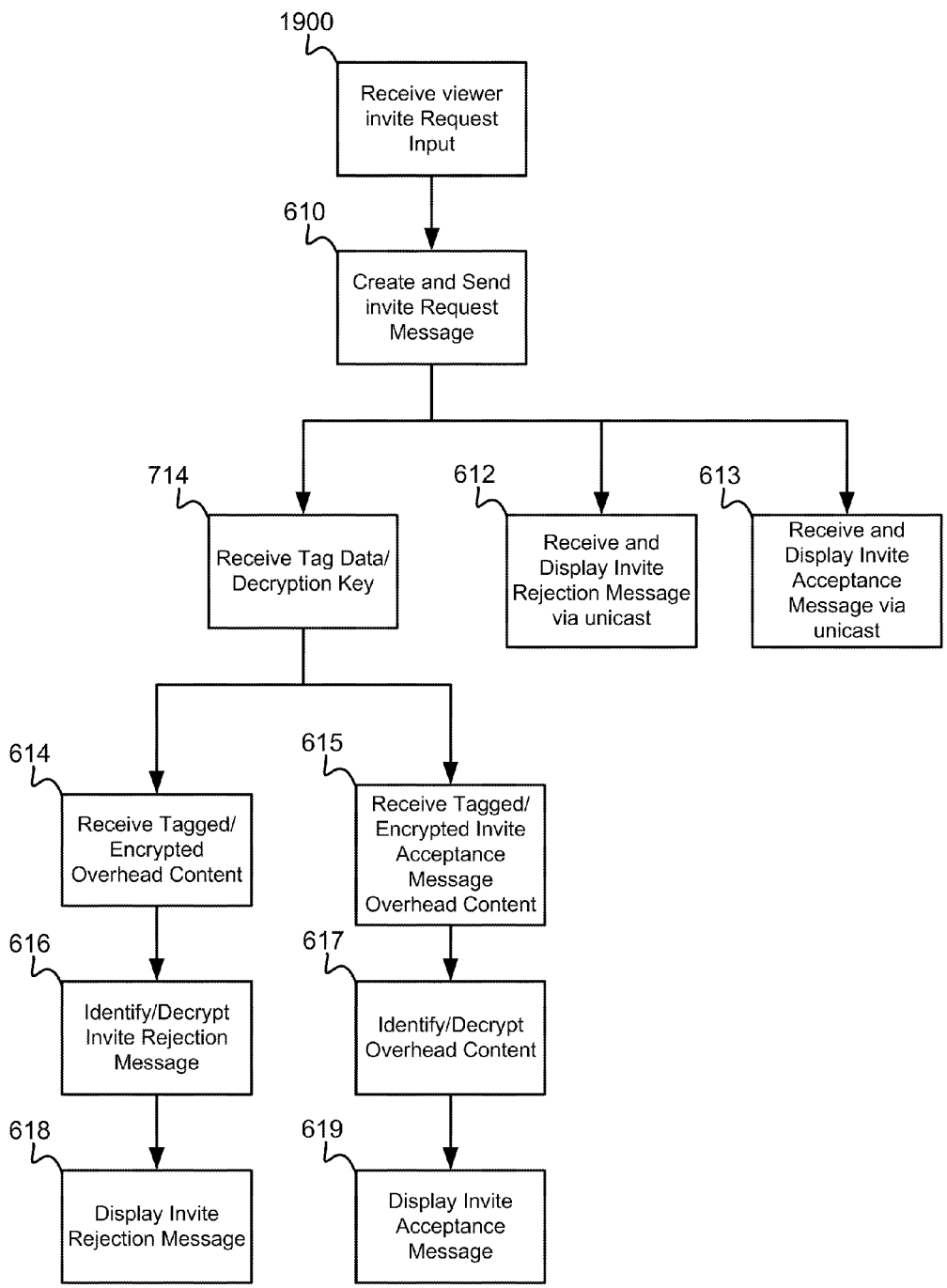
FIG. 20 is a process flow diagram of an embodiment method for sending an invitation to a mobile TV viewer and receiving the viewer's response.

FIG. 20 illustrates an embodiment method for sending an invitation request message to a mobile TV viewer and receiving the viewer's response. In this embodiment, a first mobile TV broadcast viewer may use a first mobile device 114 to invite a second viewer to watch the program at the first reviewer is currently watching. The first mobile device 114 may receive the viewer's invitation request input, step 1900, and based on that input create and send an invitation request message to the broadcast network provider using a unicast network, step 610. The first mobile device 114 may then receive a response to its invitation request via unicast or broadcast networks. For example, first mobile device 114 may receive an invite acceptance message via the unicast network, step 613, or receive an invitation rejection message via the unicast network, step 612.

If the response to the invitation request is received via the broadcast network, the first mobile device 114 may first receive tag data or a decryption key via the broadcast network, step 714. As noted above, receipt of tag data or a decryption key is optional because the tag or decryption key information may already be known to the first mobile device 114 from an earlier communication with the interactivity server 110, such as in a previous message received from the interactivity server 110 or as information received and stored in memory as part of a registration process. If the invitation is rejected, the first mobile device 114 may receive a tagged or encrypted invite rejection message in the broadcast overhead content, step 614. If the broadcasted overhead content is tagged, the first mobile device 114 may use the tag data stored in memory to identify the invitation rejection message within the overhead content, step 616, and display the invitation rejection message, step 618. If the rejection message is encrypted, the first mobile device 114 may use the decryption key received from the broadcast network provider 102 to decrypt the message received from the overhead content, step 616, and display the invitation rejection message, step 618. Similarly, if the invitation is accepted the first mobile device 114 may receive a tagged or encrypted invitation acceptance message in the overhead content, step 615, that may be identify using tag data or decrypt using a decryption key is, step 617. The mobile device 114 may then display the acceptance message to the viewer, step 619.

Figure 21:
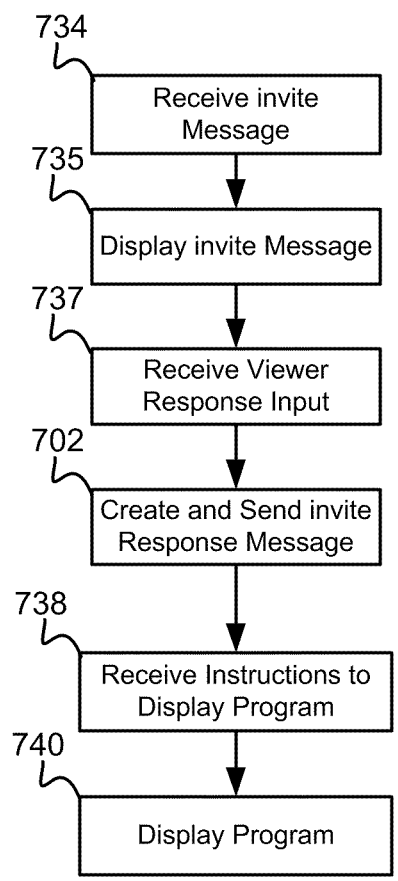
FIG. 21 is a process flow diagram of an embodiment method for receiving an invitation message from another mobile TV viewer and sending a response to the invite request using the unicast network.

FIG. 21 illustrates an embodiment method for receiving an invitation message from another mobile TV viewer and sending a response to the invitation using the unicast network. A second mobile device 114*b* may receive an invitation message from a first mobile device 114*a* via the unicast network, step 734. The second mobile device 114*b* may display the invitation message using graphical user interface, step 735, and receive a viewer response input, step 737. The second mobile device 114*b* may create an invitation response message based on the viewer input and send it to the broadcast network provider 102 via the unicast network, step 702. If the viewer accepts the invitation, the second mobile device 114*b* may receive instructions to display the program which is currently being viewed by the first mobile device viewer, step 738. The second mobile device 114*b* may execute the received instructions causing it to display the program, step 740. If the viewer rejects the invitation sent from the first mobile device 114*a*, no further communications may be received by the second mobile device 114*b*.

Figure 22:
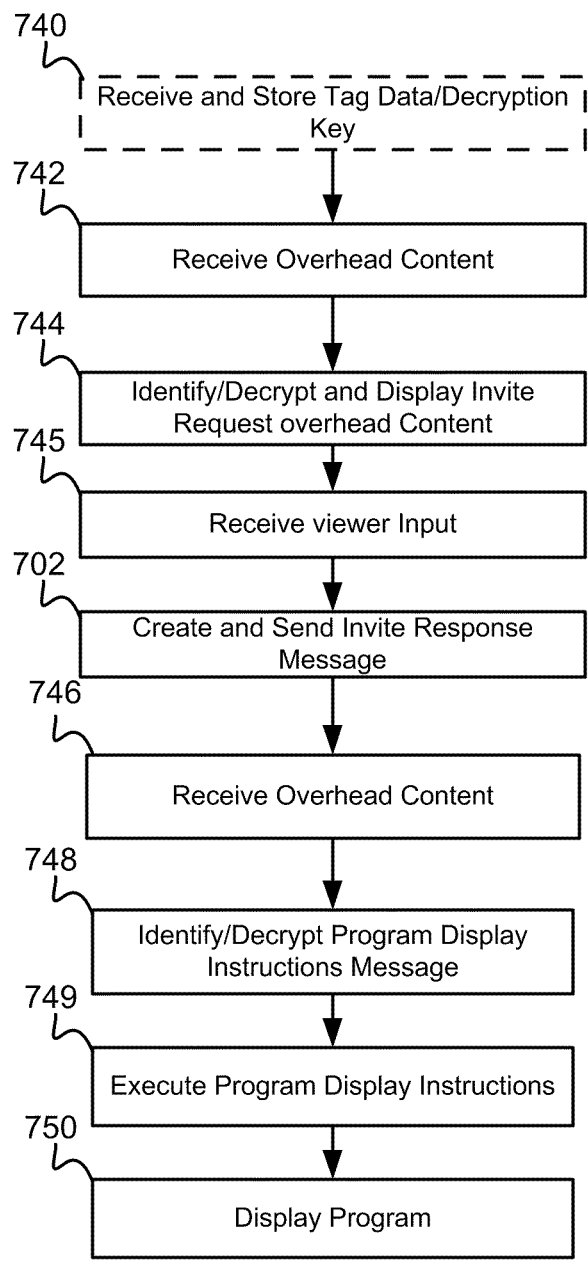
FIG. 22 is a process flow diagram of an embodiment method for receiving an invitation message from another mobile TV viewer and responding to the request using the broadcast network.

Instead of sending and receiving invitations via a unicast network, such messages may be transmitted between viewers via the mobile TV broadcast network. FIG. 22 illustrates an embodiment method for receiving an invitation message from another mobile TV viewer and responding to the request using the broadcast network. A second mobile device 114*b* may receive and store tag data or decryption keys from the broadcast network provider 102, step 740. As noted above, receiving tag data or a decryption key is optional because the tag order key may already be in the possession of the mobile device 114*b*, such as when the information has previously been provided by the interactivity server 110 or the information was stored in memory during a registration process. The second mobile device 114*b* may receive broadcasted overhead content including a tagged or encrypted invitation request message from the broadcast provider 102 via the broadcast network, step 742. If the invitation request message is tagged, the second mobile device 114*b* may use tag data in memory to identify the invitation request message within the broadcasted overhead content, step 744. If the broadcast overhead content is encrypted, the second mobile device 114*b* may use the decryption key in memory to decrypt and display the invitation request message received from the broadcasted overhead content, step 744. The second mobile device 114*b* may receive a viewer input in response to a display of the invitation request, step 745, and use that if you are input to create and send an invitation response message to the broadcast network provider via the unicast network, step 702. If the viewer accepts the invitation request, the second mobile device 114*b* may soon thereafter receive a tagged or encrypted program display instructions message via the broadcast overhead content, step 746. If the program display instructions message is tagged, the second mobile device 114*b* may use the tag data stored in memory to identify the display instructions message within the broadcast overhead content, step 748. If the program display instructions message is encrypted, the second mobile device 114*b* may use the decryption key stored in memory to decrypt the message retrieved from the broadcast overhead content, step 748. The second mobile device 114*b* may execute the program display instructions received in the message, step 749, causing the device to display on the second mobile device 114*b* the program that is currently being watched by the first mobile device 114*a* user, step 750.

Figure 23:
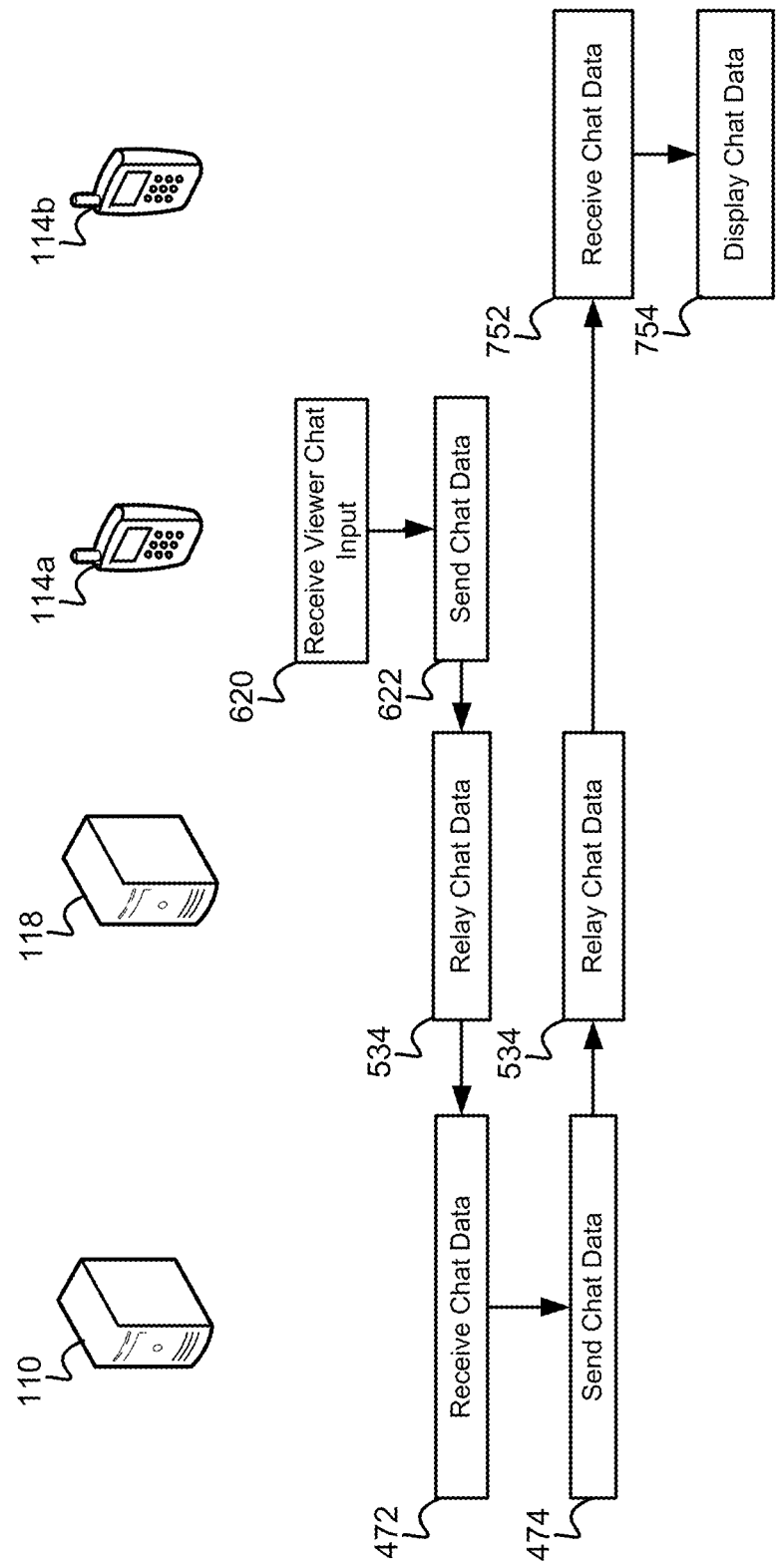
FIG. 23 is a process flow diagram of an embodiment method for chatting with other mobile TV viewers using the unicast network.

FIG. 23 illustrates an embodiment method for chatting with other mobile TV viewers using the unicast network via the mobile TV broadcast network interactivity server 110. A the user may use a graphical user interface of the first mobile device 114a to input a text or multimedia comment message related to a mobile TV program being viewed that the user wishes to relay to one or more other viewers, such as a user of a second mobile device 114b. For example, a user comment message may include a simple text message, an image, an image plus text, or even a screen shot or frame of the video being viewed. Further, the user comment message may also or alternatively be sent to users who are not presently viewing a particular content. The first mobile device 114a may receive the viewer's comment message, step 620, and format the chat data into a message that it sends to the broadcast network provider 102 via the unicast network, step 622. The wireless communication data network 118 may relay the comment message to the broadcast network provider 102, step 534, where the interactivity server 110 receives the comment message, step 472, and generates and sends the comment message to the second mobile device 114b via the unicast network, step 474, 534. The second mobile device 114b may receive the comment message, step 752, and display the comment message content to the second viewer, step 754.

Figure 24:
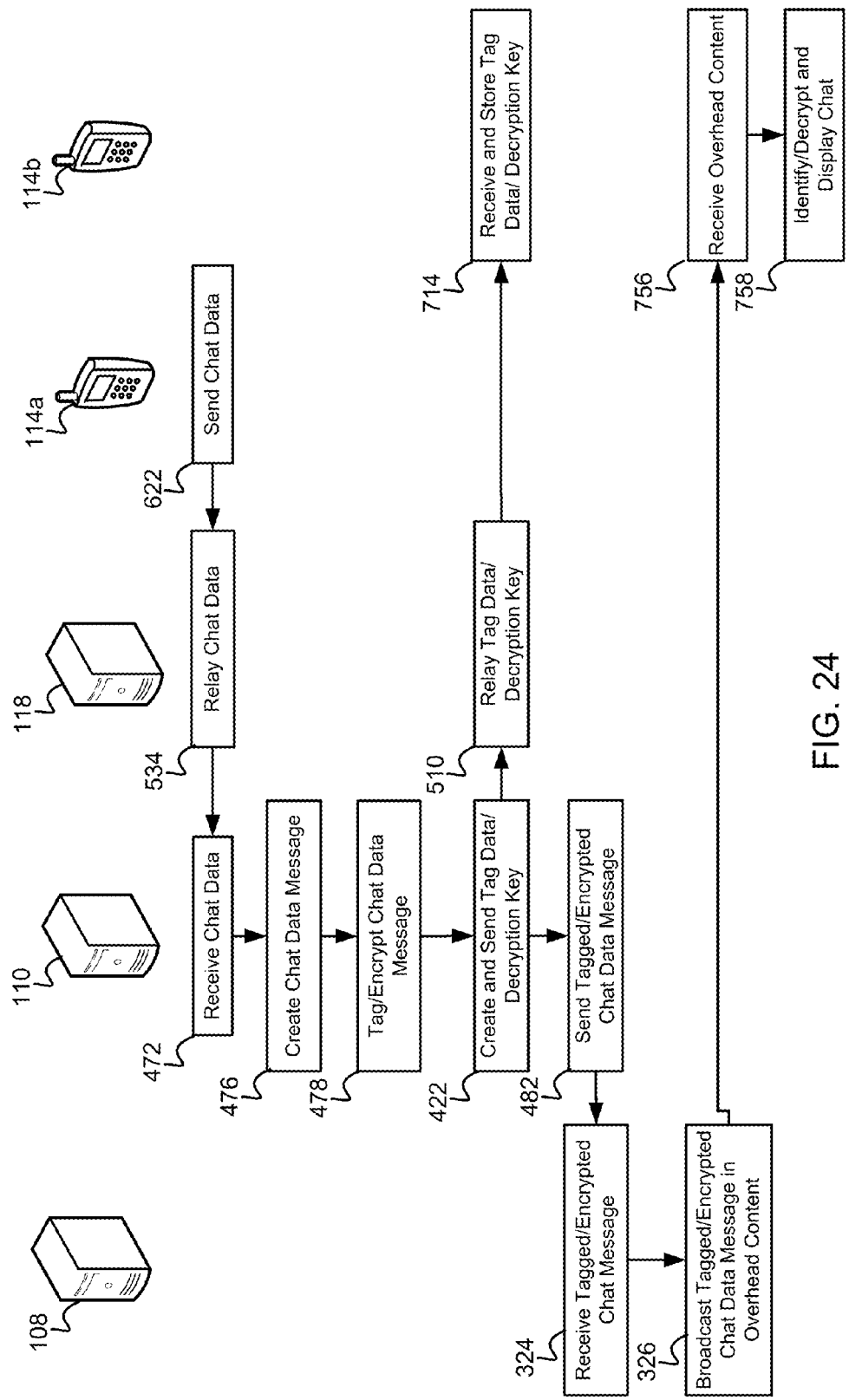
FIG. 24 is a process flow diagram of an embodiment method for chatting with other mobile TV viewers using the broadcast network.

FIG. 24 illustrates an embodiment method for communicating chat data among mobile TV viewers using the broadcast network. A first mobile device 114a may send chat data in a message to the broadcast network provider 102 via the unicast network, step 622, 534. The interactivity server 110 may receive the chat data, step 472, and create a chat data message for broadcast in the overhead content, step 476. As with other types of messages, the interactivity server 110 may tag or encrypt the chat message to enable delivery to intended recipients via the broadcast overhead content flow, step 478. Optionally, the interactivity server 110 may create and send tag data or a decryption key to the second mobile device 114b via the unicast network, step 422, 510. The second mobile device 114b may receive and store the tag data or decryption key that may be use later to identify or decrypt broadcasts data received from the broadcast network provider 102, step 714. As noted above, the transmission and reception of tag data or a decryption key are optional because the tag or key may already be known to and stored in memory of the second mobile device 114b. The interactivity server 110 may send the tagged or encrypted chat message to the broadcaster, step 482, which receives it, step 324, and broadcasts the tagged or encrypted chat message within the overhead content flow, step 326. The second mobile device 114b may then receive the overhead content, step 756. If the chat data message is tagged, the second mobile device 114b may use the tag data memory to identify the chat data message within the overhead content flow and display the chat text to second viewer, step 758. If the chat data message is encrypted, the second mobile device 114 may use the decryption key in memory to decrypt the data message received from the overhead content flow and display the chat to the second viewer, step 758.

Figure 25:
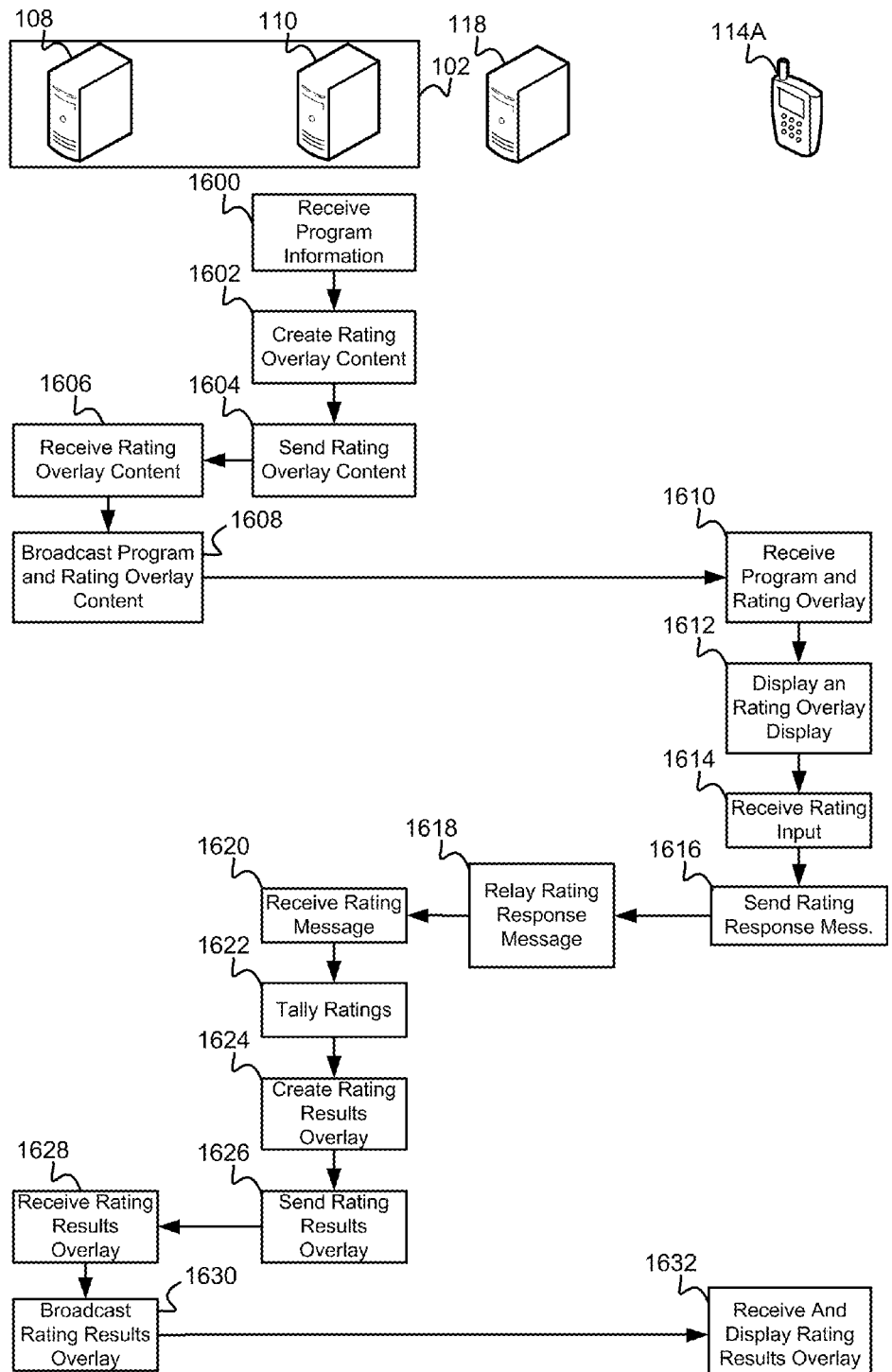
FIG. 25 is a process flow diagram of an embodiment method for receiving, calculating and broadcasting program ratings to mobile TV viewers.

A further embodiment may be employed to enable mobile TV users to submit ratings of broadcast programs. Such ratings provided by viewers may be tallied by the mobile TV broadcaster to determine an overall viewer rating for programs. The overall ratings may be broadcasted in the overhead content flow to some or all viewers. For example, program ratings could be viewer ratings may be presented as a graphical icon next to the name of the program in the program guide displayed on mobile devices. FIG. 25 illustrates an embodiment method for receiving, calculating and broadcasting program ratings to mobile TV viewers. The interactivity server 110 may be configured with software to receive information about broadcast programs from the broadcaster 108, step 1600, and create a rating overlay content that may be broadcast within the overhead content, step 1602. The rating overlay content may be sent to the broadcaster, step 1604. The broadcaster 108 may receive, step 1606, and broadcast the rating overlay content as part of the overhead content flow, step 1608. The rating overlay content may include data that can be used by a client application in mobile devices 114 to display a user interface for receiving viewer ratings of programs such as an overlay display that appears while a program is being displayed or a user input line or radio boxes appearing beside program names in the program guide. The rating overlay content may include more than just the program or content title by including information about the artists or actors, year of production or composition, writer or composer, parental rating, critic evaluations, or any other information that may help viewers rate the program.

The rating overlay content may be generated in a format that a client application on mobile devices 114 can interpret and use to generate a rating overlay display and populate a rating user interface. In one embodiment, the rating overlay content may be raw information that the client application can organize into a display. In another embodiment, the rating overlay content may be in the form of a hypertext language script, such as XML or HTML, which a client application implements in order to generate a rating overlay display. The mobile device 114 may receive the overlay content, step 1610, and display a rating overlay display, step 1612.

The mobile device 114 may also be configured with software to receive input from a user, step 1614, create a rating response message (step not shown) and send the rating response message, step 1616, to the broadcast network provider 102 using the unicast network. The wireless network provider 118 may receive and forward the rating input response message, step 1618, to the broadcast network provider 102. At the broadcast network provider 102, the interactivity server 110 may receive the rating response message, step 1620, tally the ratings from many viewers, step 1622, and create a viewer rating results overlay, step 1626. The rating results overlay may include the final rating numbers based on all the ratings for a program that were received from different mobile TV viewers who rated that specific program. The broadcaster 108 may receive the rating results overlay, 1628, and broadcast the results overlay, step 1630. Mobile devices 114 may be configured to receive the broadcasted rating overlay and display the program rating as an overlay to a program or the viewer guide, or as an additional item within the viewer guide, step 1632.

Figure 26:
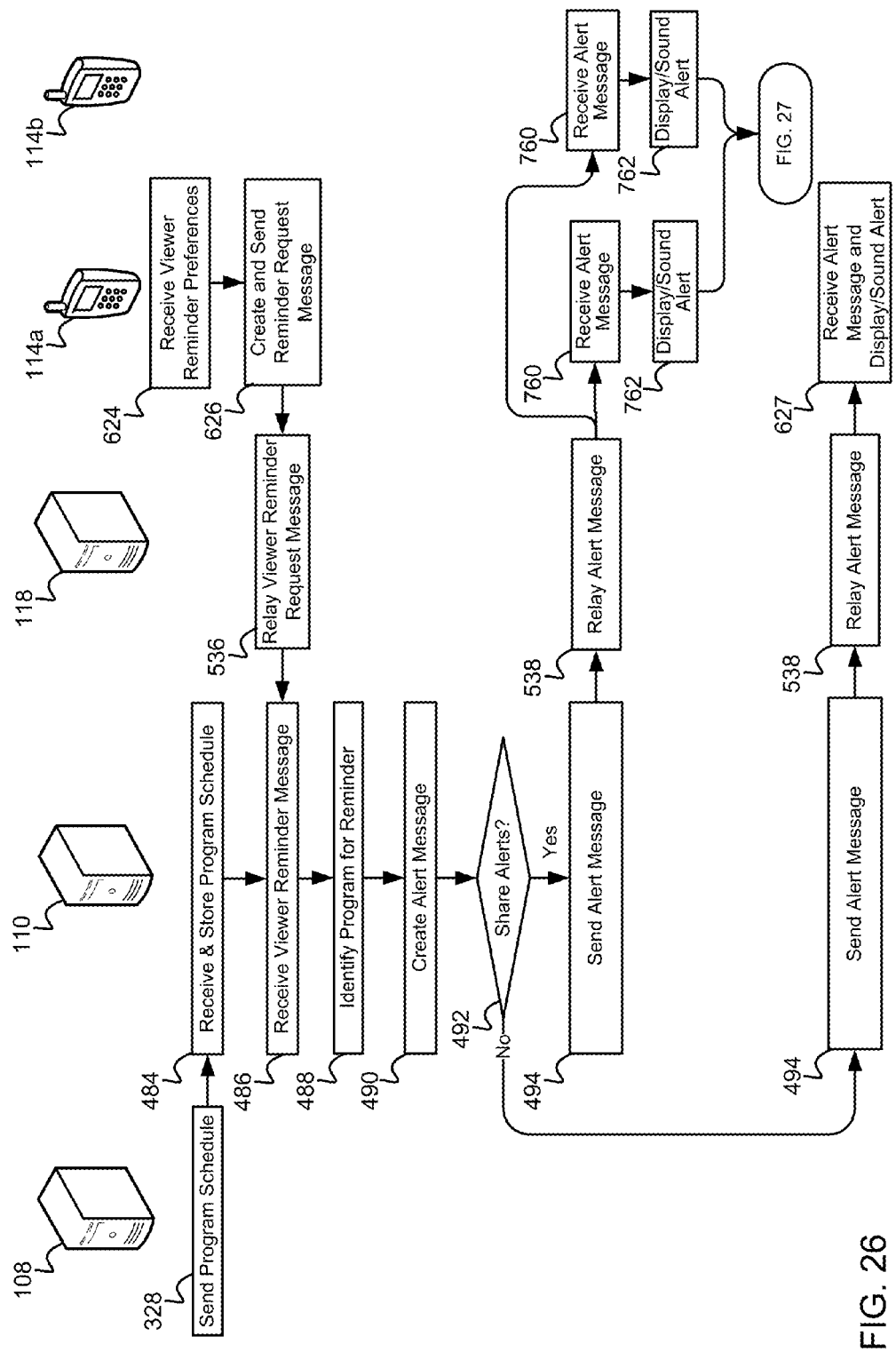
FIGS. 26 and 27 are process flow diagrams of an embodiment method for enabling mobile TV viewers to use the unicast network to receive reminders about programs and share those reminders with other viewers.
Figure 27:
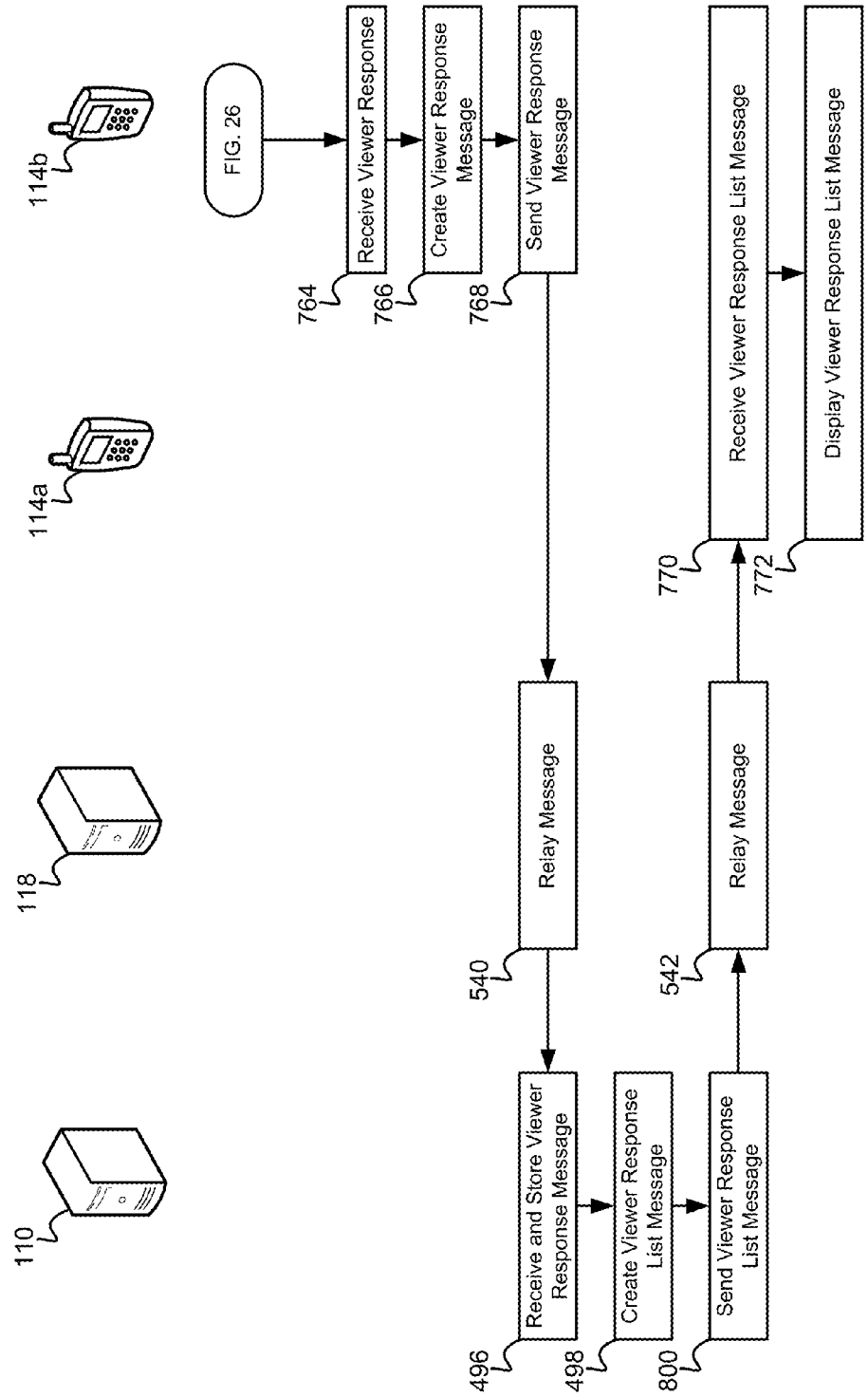
Figure 28:
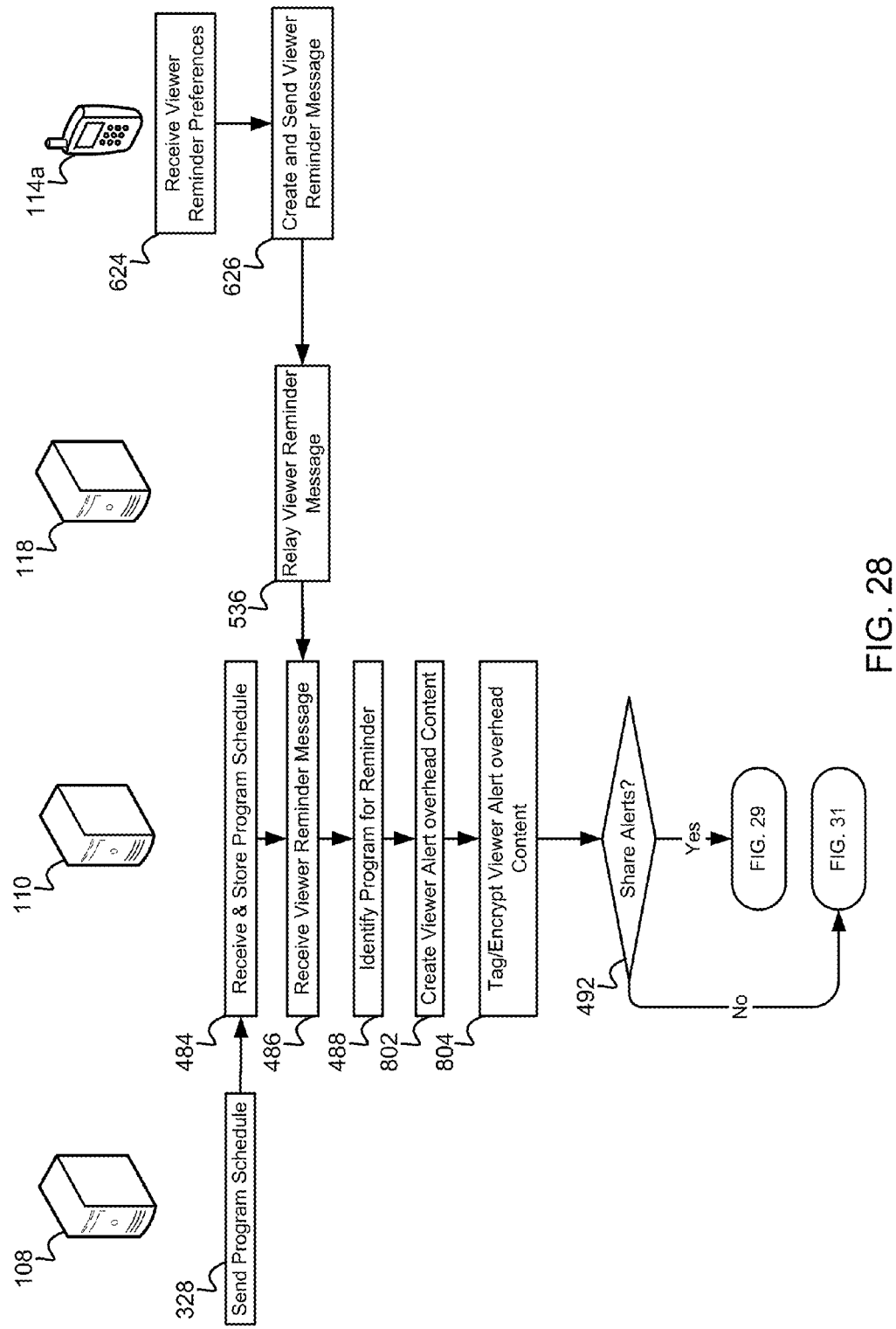
FIGS. 28-31 are process flow diagrams of an embodiment for enabling viewers to set program reminders and share those reminders with other viewers using the broadcast network.

FIGS. 26 and 27 illustrate another embodiment method that enables mobile TV viewers to use the unicast network to receive reminders about broadcast programs and share those reminders with other viewers. The broadcaster 108 send program schedules to the interactivity server 110, step 328. The interactivity server 110 may receive and store the program schedule which may be used to set alerts for viewers, step 484. A first mobile device 114a may be configured with software instructions to enable a viewer to request that reminders be set for selected mobile TV programs. Accordingly, the first mobile device 114a may receive the viewer's reminder preference inputs, step 624, and create and send a reminder request message to the broadcast network provider 102 via the unicast network, step 626. The viewer reminder requests may include, for example, the programs for which the viewer desires to receive reminders, the time (e.g., an amount of time in advance of a program start time) a reminder should be sent to the user, authorization or lack thereof to share the viewer's reminders with other mobile TV viewers, and a list of other mobile TV viewers who may receive the reminder. The viewer reminder request message may be relayed by the wireless communication data network 118 to the broadcast network provider 102, step 536. The interactivity server 110 may receive the viewer reminder request message, step 486. In interactivity server 110 may determine the program for which a reminder is requested based on the viewer's reminder request message and the program schedule received from the broadcaster 108, step 488. At the appropriate time (i.e., at the time requested by the viewer in advance of a program start) the interactivity server 110 may then create an alert message, step 490, and, based on the viewer request preferences, determine whether the alert message may be shared with other viewers, determination 492.

If the viewer reminder preferences do not allow sharing the alert with other viewers (i.e., determination 492="Yes"), the interactivity server 110 may send the alert message only to the viewer who requested the reminder via the unicast network, step 494. The wireless communication data network 118 may relay the alert message to the first mobile device 114a users, step 538. The first mobile device 114a users may receive the alert message and display or sound the alert using resident software programs installed on the mobile device 114a.

If the viewer reminder preferences allow sharing alerts with other viewers (i.e., determination 492="Yes"), the interactivity server 110 may send the alert message to all the viewers identified in the reminder preferences using the unicast network, step 494. The wireless communication data network 118 may relay the alert message to the appropriate mobile TV viewers, step 538. The targeted mobile devices 114a, 114b may receive the alert message, step 760, and display the alert using resident software programs on the mobile device and graphical user interface and/or sound an alert to remind the viewer that a program is due to begin, step 762.

As illustrated in FIG. 27, a second mobile device 114b may receive the viewer's response to the alert message, step 764, create a viewer response message, step 766, and send the viewer response message to the broadcast network provider 102 via the unicast network, step 768. The viewer response message may be relayed by the wireless communication data network 118, step 540. The interactivity server 110 may receive and store the viewer response message, step 496, and be received by the interactivity server 110, step 496. The interactivity server 110 may receive such response messages from many viewers and create a viewer response list message based on all the responses received, step 498, and send the viewer response list message to all the mobile devices 114 which are allowed to share alert messages via the unicast network, steps 800, 542. The viewer response list message may include information about whether each viewer may watch the program for which an alert message was transmitted. All mobile devices permitted to share reminders may receive the viewer response list message from the broadcast network provider 102, step 770, and display the content of the message, step 772.

Another embodiment method illustrated in FIGS. 28-31 enables viewers to set and receive program reminders, may enable viewers to set program reminders and share those reminders with other viewers with the reminder and alert messages being delivered via the broadcast network. The broadcaster 108 may send a program schedule to the interactivity server 110, step 328. The interactivity server 110 may receive and store the program schedule which may be used to identify the programs for which reminders may be requested by viewers, step 484. A mobile TV viewer who wishes to set a reminder may input the reminder preferences into his/her first mobile device 114a. The first mobile device 114a may receive the viewer reminder request preferences, step 624, and create and send a viewer reminder request message to the broadcast network provider 102 via the unicast network, step 626. The wireless communication data network 118 may relay the viewer reminder request message to the broadcast network provider 102, step 536. The interactivity server 110 may receive the viewer reminder request message, step 486, and, based on the viewer requests and the program schedule, determine the programs for which reminders are requested, step 488. At the appropriate time the interactivity server 110 may create a viewer alert message, step 802, and tag or encrypt the viewer alert message so that it may be delivered via broadcasted overhead content, step 804. The interactivity server 110 may also determine, based on viewer preferences received in the reminder request message, whether the viewer alert message may be shared with other mobile TV viewers, determination 492.

Figure 29:
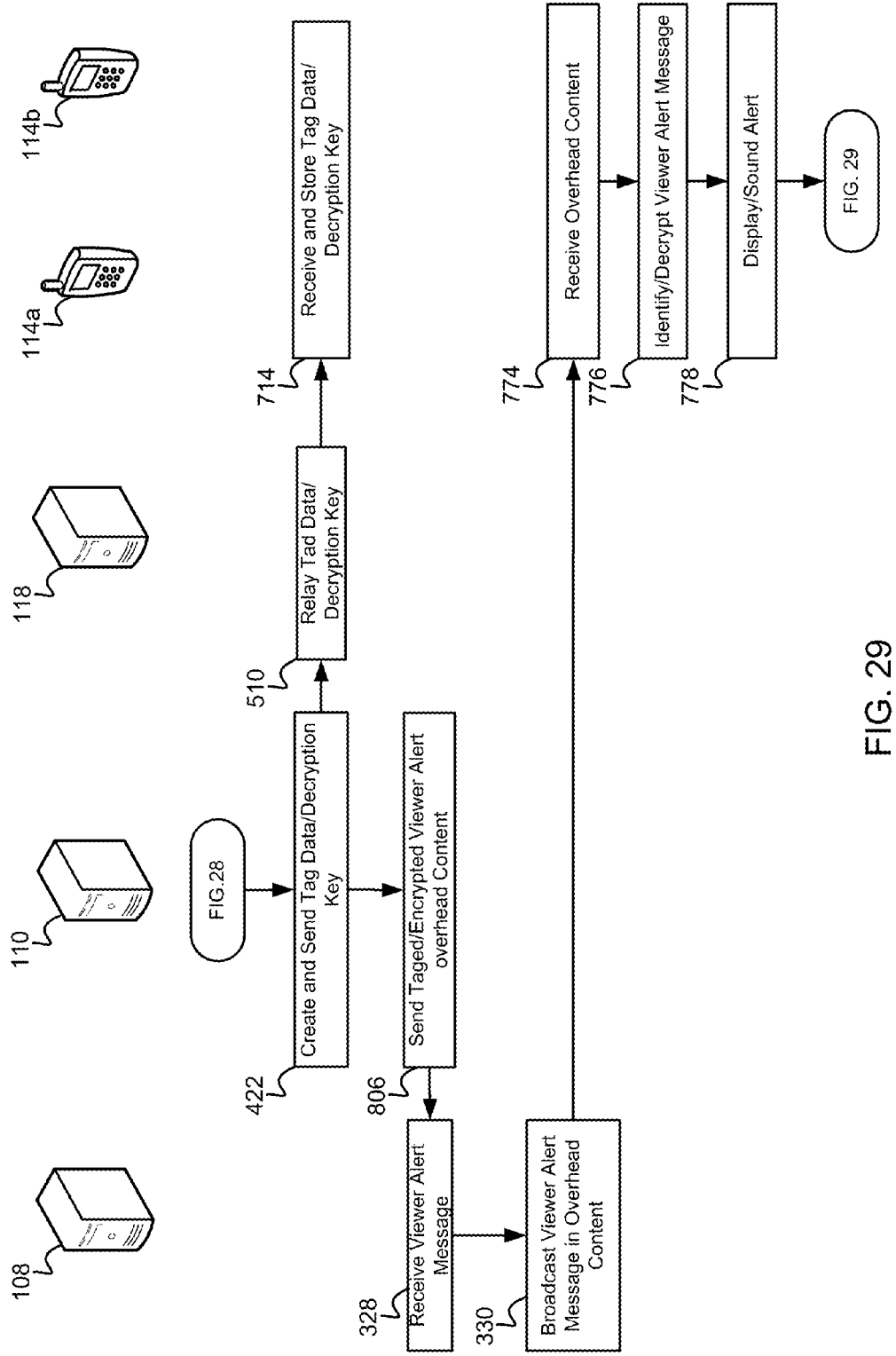

As shown in FIG. 29, if the viewer alert message may be shared with other viewers (i.e., determination 492="Yes"), the interactivity server 110, may create and send (via the unicast network) tag data or a decryption key messages to all the mobile devices 114 which are allowed to share the viewer alert message, step 422. The wireless data network 118 may relay the tag data or decryption key messages to mobile devices 114, step 510. The mobile devices 114 may receive and store the tag data or decryption key that may be used to identify or decrypt the viewer alert overhead content broadcasted via the broadcast network, step 714. As noted above, transmission of tags or decryption keys is not necessary if mobile devices 114 already have such information stored I memory. The interactivity server 110 may send the tagged or encrypted viewer alert message to the broadcaster 108, step 806, which receives the message, step 322, and broadcast it within the overhead content flow, step 324. All the mobile and devices 114 allowed to share reminder information receive overhead content, step 774. If the viewer alert message is tagged, the mobile devices 114 may use the tag data in memory to identify the broadcasted viewer alert messages within the overhead content, step 776. If the viewer alert overhead content is encrypted, the mobile devices 114 may use the decryption key in memory to decrypt the viewer alert message received from the overhead content, step 776. The mobile devices 114 may then display or sound the alert, step 778.

Figure 30:
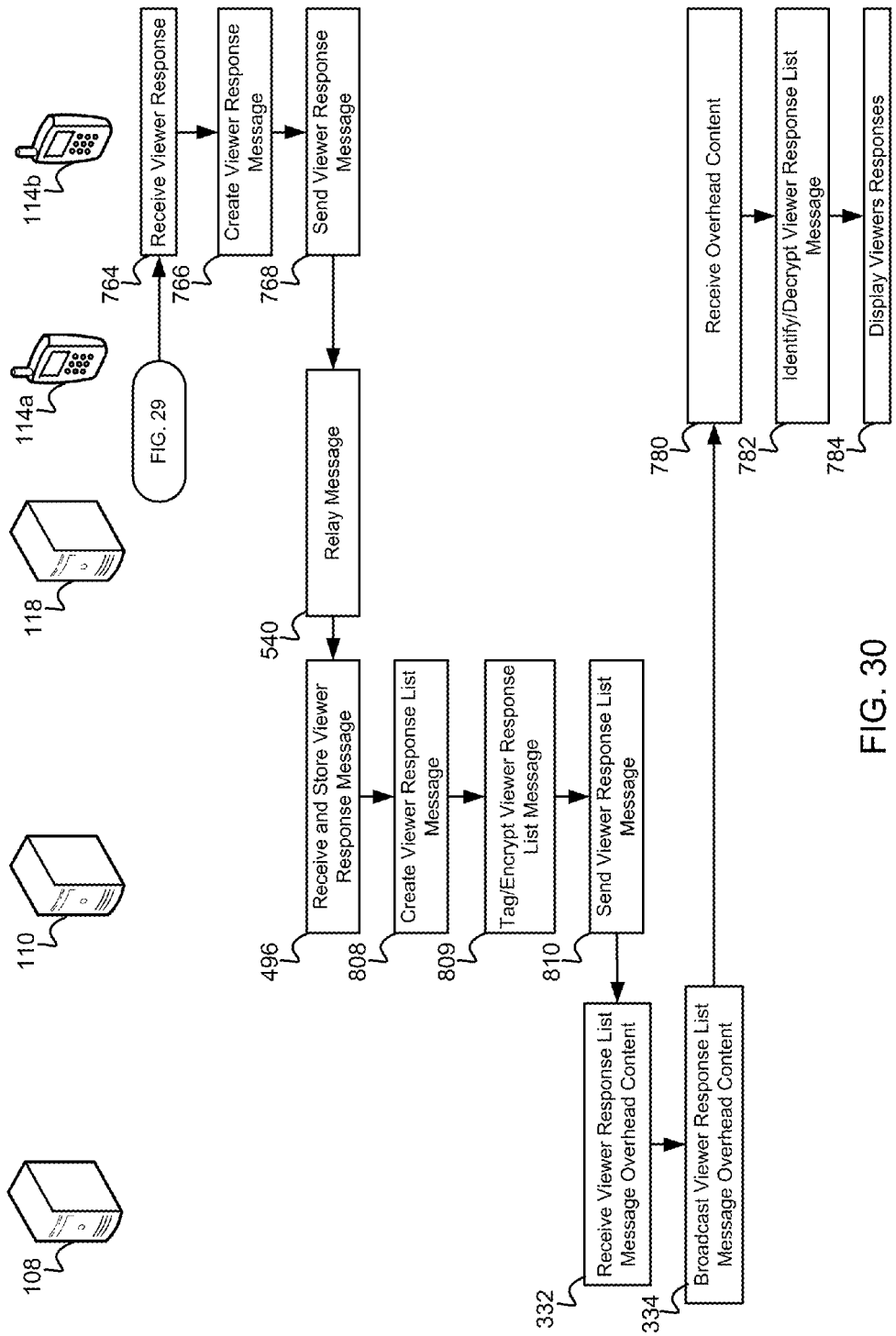

As shown in FIG. 30, a second mobile device 114b may receive the viewer's response to the viewer alert message, step 764, and create, step 766, and send a viewer response message to the broadcast network provider 102 via the unicast network, step 768. The wireless communication data network 118 may relay the response message to the broadcast network provider 102, step 540, where the interactivity server 110 may receive and store the message, step 496. The interactivity server 110 may receive and store viewer responses from many mobile devices 114, and based on the viewer's responses create a viewer response list message to be broadcasted in the overhead content to all mobile devices 114 authorized to receive reminder messages, step 808. The interactivity server 110 may tag or encrypt the viewer response list message for delivery via the overhead content flow, step 809, and send it to the broadcaster 108, step 810. The broadcaster 108 may receive the tagged/encrypted viewer response list message, step 332, and broadcast the message in the overhead content, step 334. The mobile devices 114 may receive the overhead content from the broadcast network provider 102, step 780. If the viewer response list message is tagged, the mobile devices 114 may use the tag data in memory to identify the viewer response list message within the broadcasted overhead content, step 782. If the received overhead content is encrypted, the mobile devices 114 may use the decryption key in memory to decrypt the viewer response list message received from the broadcasted overhead content, step 782. The mobile devices may then display the viewer response list, step 784.

Figure 31:
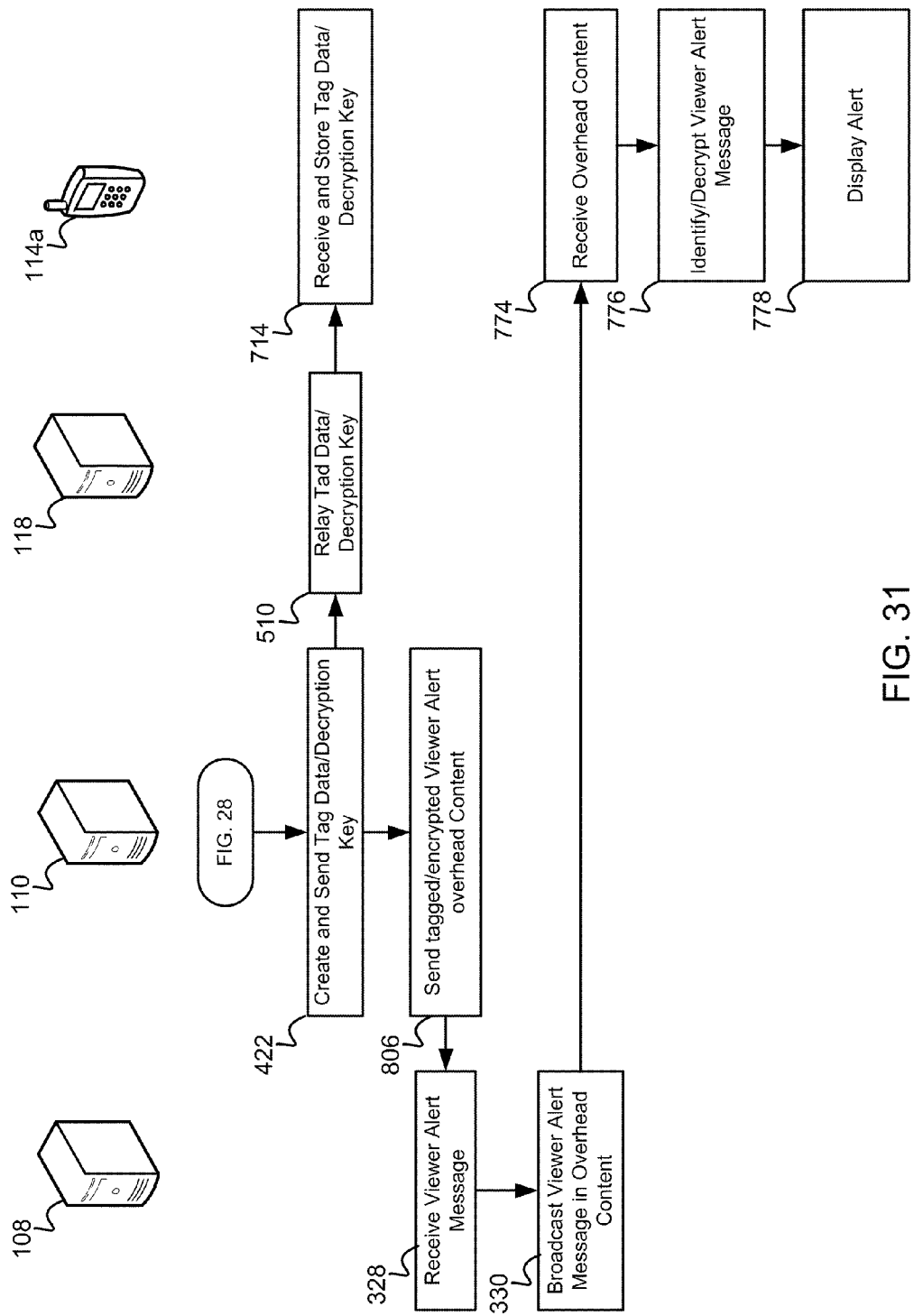

As illustrated in FIG. 31, if the viewer alert overhead content may be not shared with other viewers (i.e., determination 492="No"), the interactivity server 110 will send the alert message to only the requesting mobile device 114a. Since the operations are essentially the same as described above with reference to FIG. 29, the descriptions for like numbered steps apply equally to the steps illustrated in FIG. 31.

The various embodiment methods and systems may used to enable creation of channels or programs which may be hosted by individuals, such as a celebrity for example. On such hosted channels or programs, a celebrity may be enabled to comment and opine on programs and chat with viewers. For example, Michael Jordan may be engaged to comment on a basketball game on mobile TV broadcast network. This may allow more successful advertisement of programs and may attract more viewers.

Figure 32:
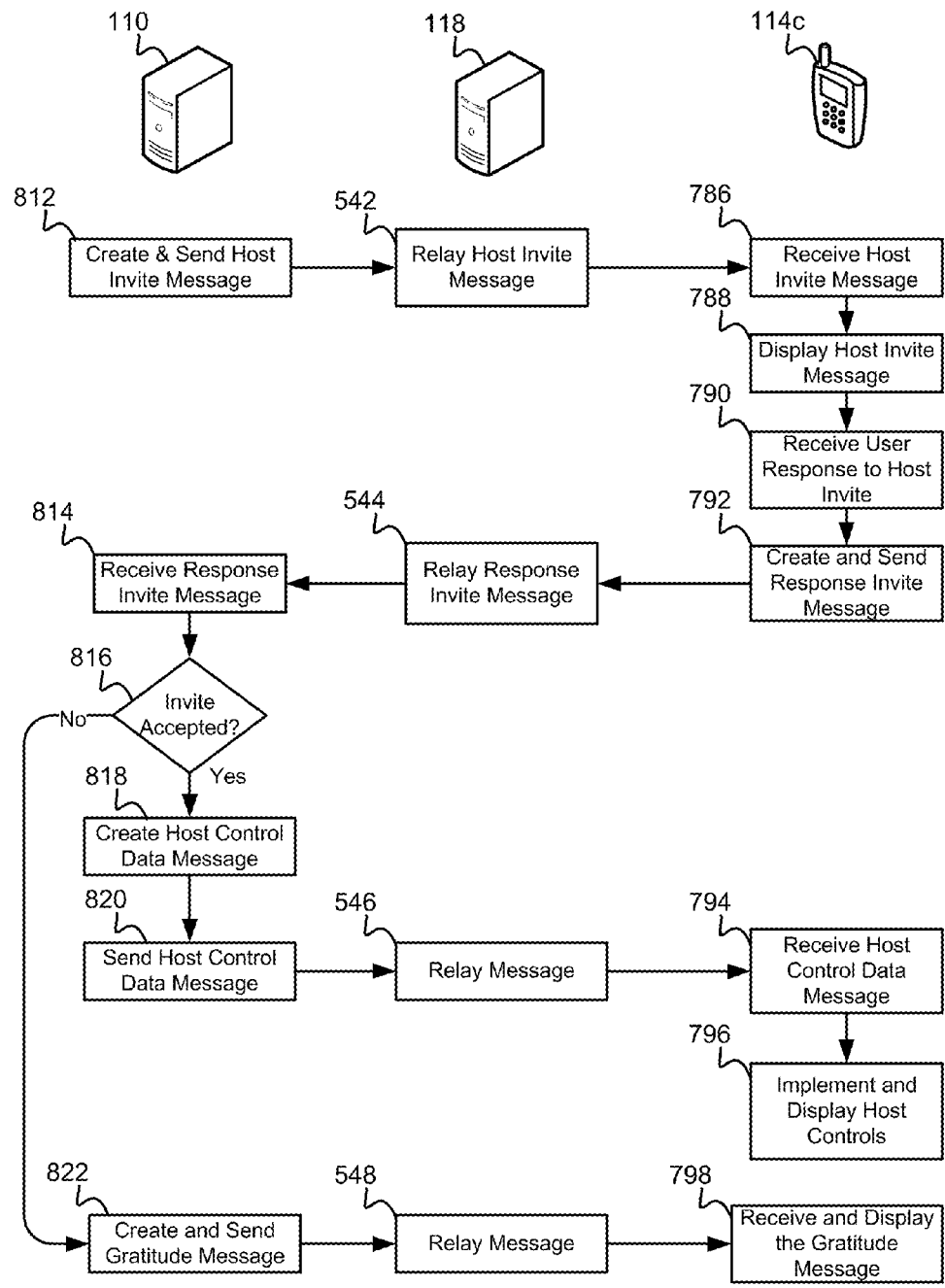
FIGS. 32-35 are process flow diagrams of an embodiment method for enabling a celebrity to communicate with viewers of a program.

FIGS. 32-35 illustrate embodiment methods for enabling a celebrity to communicate with viewers of a program. As illustrated in FIG. 32, a celebrity may be invited to host a program broadcast during which the celebrity may be enabled to control program broadcasts, chat and communicate with viewers. Once the broadcast network provider 102 has identified a celebrity suitable for hosting a program broadcast, the interactivity server 110 may create and send a host invitation message to the celebrity mobile device 114c, step 812. The wireless communication data network 118 may relay the host invitation message to the celebrity mobile device 114c, step 542. The celebrity mobile device 114c may receive, step 786, and display the host invitation message, step 788. The celebrity mobile device 114c may receive the celebrity response to the host invitation and create and send an invitation response message to the broadcast network provider 102, step 792. The wireless communication data network 118 may relay the invitation response message to the broadcast network provider 102, step 544. The interactivity server 110 may receive the invitation response message, step 814, and determine whether the invited celebrity has accepted the invitation, determination 816.

If the celebrity has accepted the invitation to host the program broadcast (i.e., determination 816="Yes"), the interactivity server 110 may create a host control data message, step 818, and send it to the celebrity mobile device 114c via the unicast network, step 820. The wireless communication data network 118 may relay the host control data message to the celebrity mobile device 114c, step 546. The celebrity mobile device 114c may receive the host control data message, step 794, and generate a host control user interface through which the celebrity host can control the program broadcast and communicate with viewers of the program, step 796. The host control user interface may include virtual remote control buttons to allow the celebrity to control the broadcast of the program, for example, stop or pause the broadcast program, and graphical user interface indicators which may allow celebrities to chat with other viewers. Instead of providing a user interface on a celebrity host mobile device, the celebrity may perform the hosting functions within a mobile broadcast network provider studio configured with interactive tools to facilitate the host's activities. In a further embodiment, a host interface website may be created which enables the celebrity to log in and host the interactive show from any location with access to the Internet.

If the celebrity has rejected the invitation to host the program broadcast (i.e., determination 816="No"), the interactivity server 110 may create and send a gratitude message to the celebrity mobile device 114c via the unicast network, step 822. The wireless communication data network 118 may relay the gratitude message to the celebrity mobile device 114c, step 548. The celebrity mobile device 114c may receive and display the gratitude message, step 798.

Figure 33:
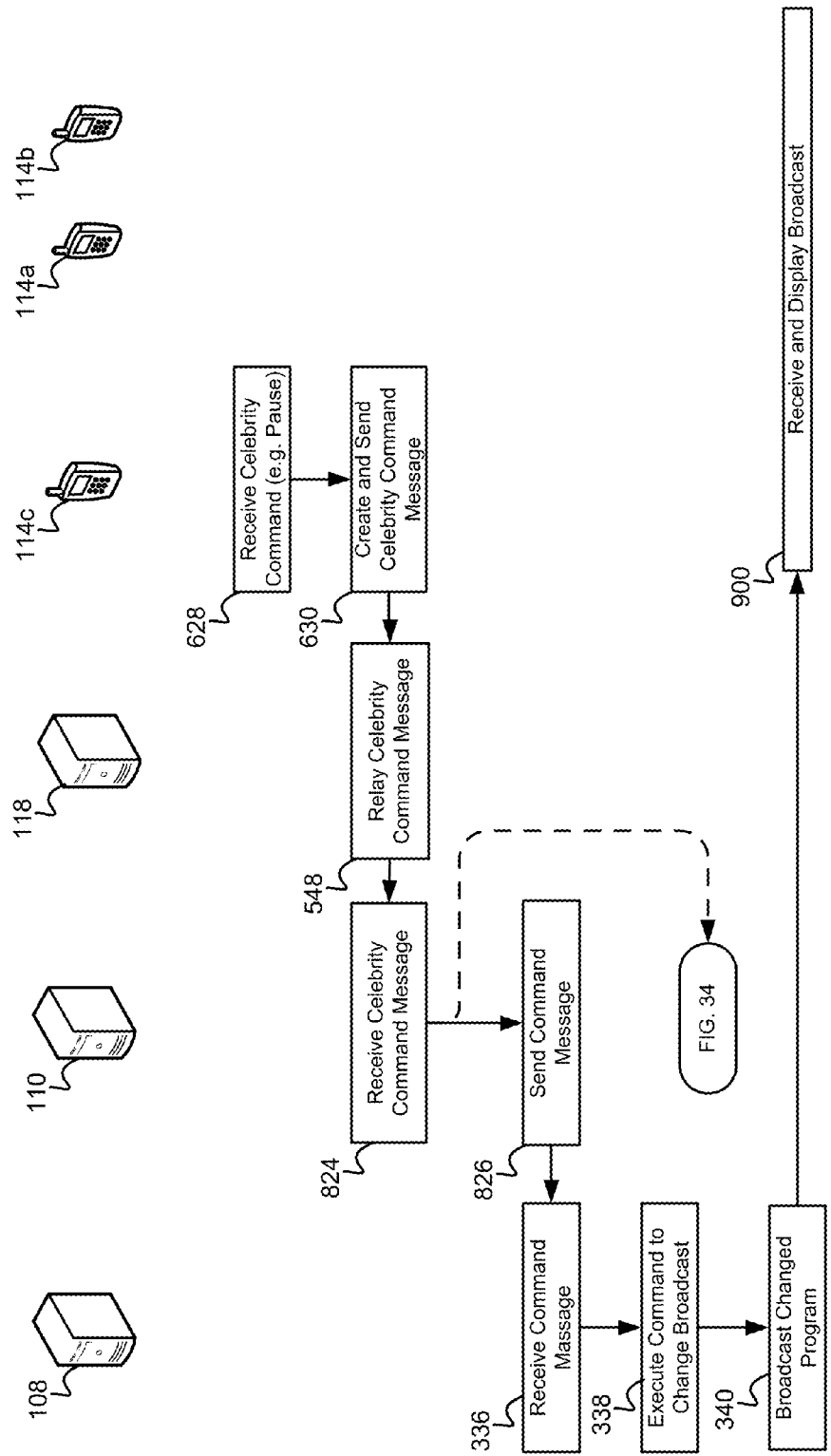

FIG. 33 illustrates an embodiment method for enabling celebrity hosts to control the broadcast of a program during the time the celebrity acts as a host. A celebrity mobile device 114c may receive a comment or command input from the celebrity host, step 628. Command inputs may include instructions to pause, stop, fast forward or rewind a program broadcast. Based upon the received input the celebrity mobile device 114c may create and send a celebrity command message to the broadcast network provider 102 via the unicast network, step 630. The wireless communication data network 118 may relay the celebrity command message to the broadcast network provider 102, step 548. The interactivity server 110 may receive the command message, step 824, and send the command message to the broadcaster, step 826. The broadcaster 108 may receive the command message, step 336, and execute the command to change the broadcast in the corresponding manner, step 338. To enable the host to pause programming, the broadcaster 108 may be configured to store broadcast programming in a data store, such as a video database within the transcoder so that when programming is paused by the host, the content can be cached in the data store. When programming is played by the host, the cached content is streamed from the data store to the broadcaster 108. The broadcaster 108 may broadcast the changed program, step 340, which is received by all mobile devices 114 tuned into the program, step 900.

Figure 34:
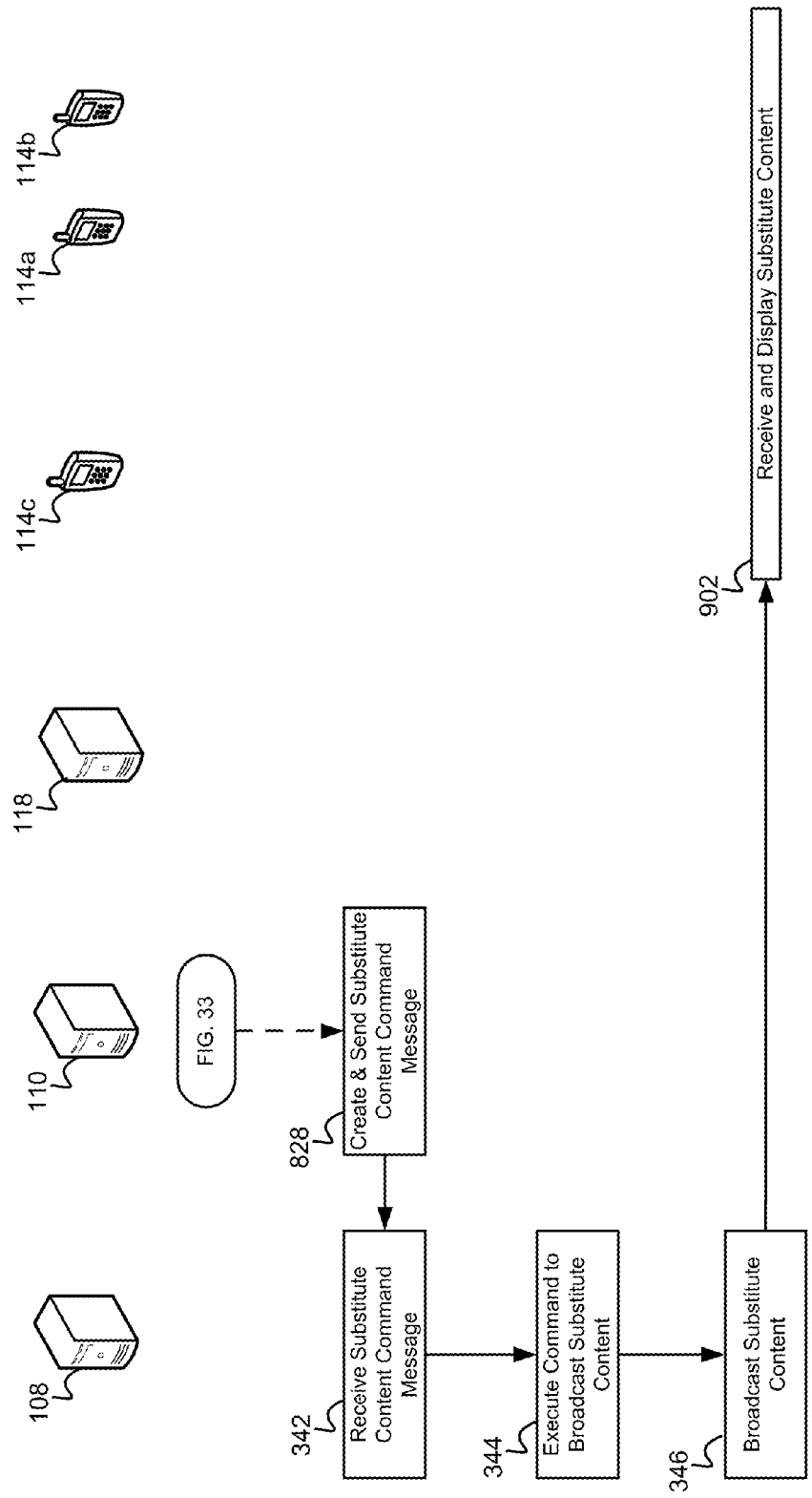

Optionally, as illustrated in FIG. 34, in response to a celebrity command message the interactivity server 110 may create and send a substitute content command to the broadcaster 108, step 828. A substitute content command may instruct the broadcaster to, for example, pause the broadcast of the program and replace the still picture of the paused program with substitute content such as a picture of the celebrity. The broadcaster 108 may receive the substitute content command message, step 342, execute the command, step 344, and broadcast the substitute content, step 346, which is then received by the mobile devices 114, step 902.

Figure 35:
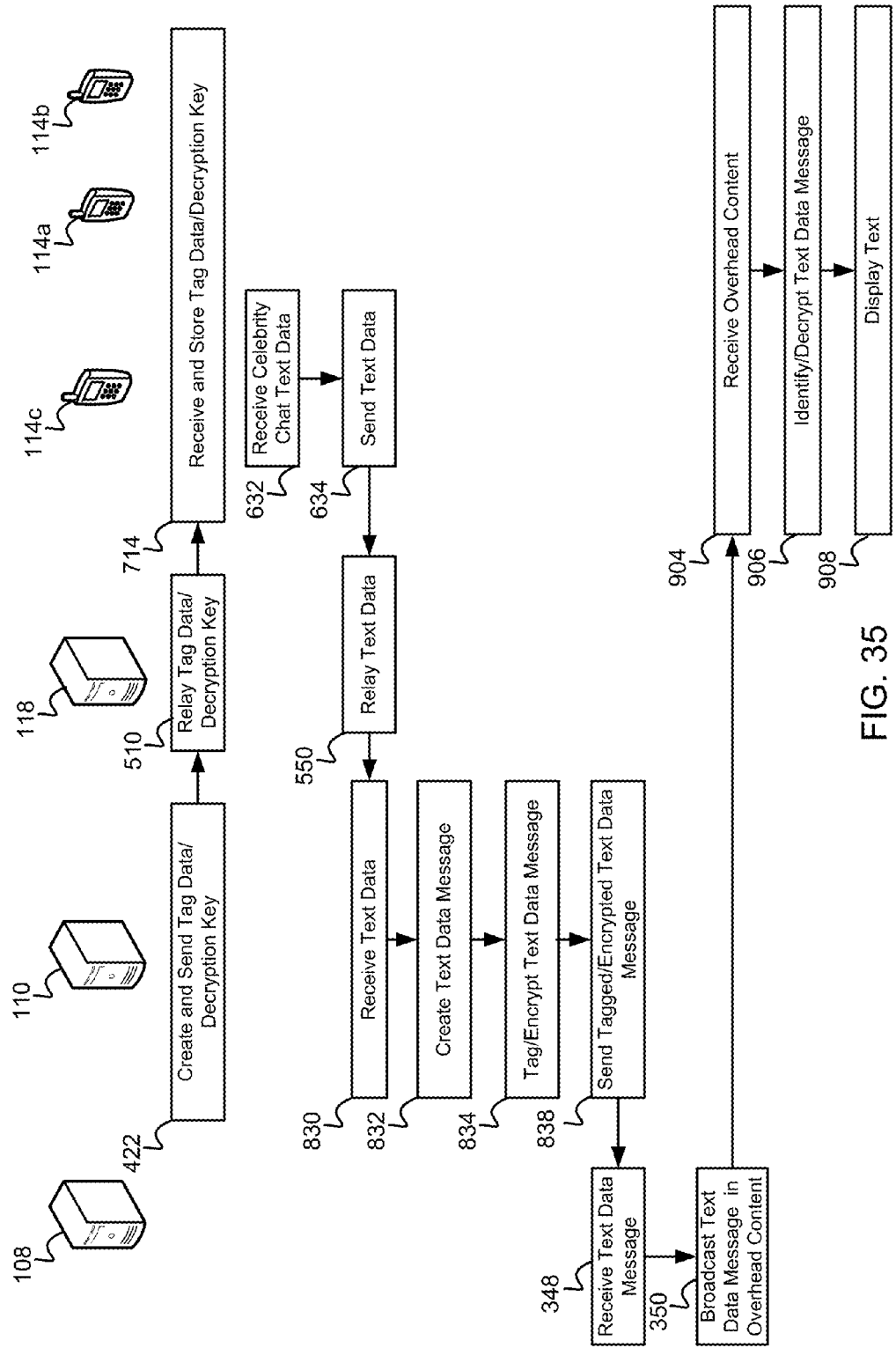

FIG. 35 illustrates an embodiment method for enabling celebrity hosts to communicate with program viewers using the broadcast network. Prior to the start of the hosted program the interactivity server 110 may create and send (via the unicast network) tag data or a decryption key to the mobile devices 114 that have registered to receive the celebrity comments, steps 422, 510. The mobile and devices 114 may receive and store the tag data or decryption key that may be used later to identify or decrypt host comment messages sent in the overhead flow, step 714. As noted above, delivery of tag or key information may not be required if the mobile devices already possess the information in memory. Also, tag and key data may not be required if the host comments are to be received by all mobile devices since there will be no need to control the reception or delivery of such overhead content messages.

A celebrity mobile device 114c may receive celebrity chat text inputs, step 632, and send the text data to the broadcast network provider 102 via the unicast network, step 634. The wireless communication data network 118 may relay the text data to the broadcast network provider 102, step 550. The interactivity server 110 may receive the text data, step 830, and create a text data message, step 832, that may be tagged or encrypted for transmission via the broadcast overhead content in the situation where the host's comments are to be narrow-casted (i.e., received by a designated subset of mobile devices 114), step 834. The interactivity server 110 may send the tagged or encrypted text data message to the broadcaster 108, step 838. The broadcaster 108 may receive the text data message, step 348, and broadcast it in the overhead content flow, step 350. The mobile devices 114 receive overhead content, step 904. If the text data message is tagged, the mobile devices may use a tag in memory to identify the text data message within the overhead content, step 906. If the text data message is encrypted, the mobile devices may use a decryption key in memory to decrypt the text data message received from the overhead content, step 906. If the text data message is not tagged or encrypted, mobile devices 114 may receive it in the ordinary manner that overhead content is received and processed. The mobile devices 114 may then display the text, step 908.

The various embodiment methods and systems may also enable mobile TV viewers to create ad-hoc channels. Ad-hoc channels may be used by viewers as personalized channels which may list the viewers' favorite programs and allow viewers to share their favorite programs with other viewers. For example, a viewer may create a William Shatner channel in which all the programs which include William Shatner may be listed. Other viewers may join ad-hoc channels created by others to share programs. For example, other viewers may join the William Shatner channel to access a list of programs in which William Shatner appears. A mobile device 114 tuned to the William Shatner channel will then receive and display each of the programs listed in the list as they are broadcast by the mobile TV broadcast service provider. Ad-hoc channels enable viewers with similar taste in programming to share and enjoy their favorite shows with each other.

Figure 36:
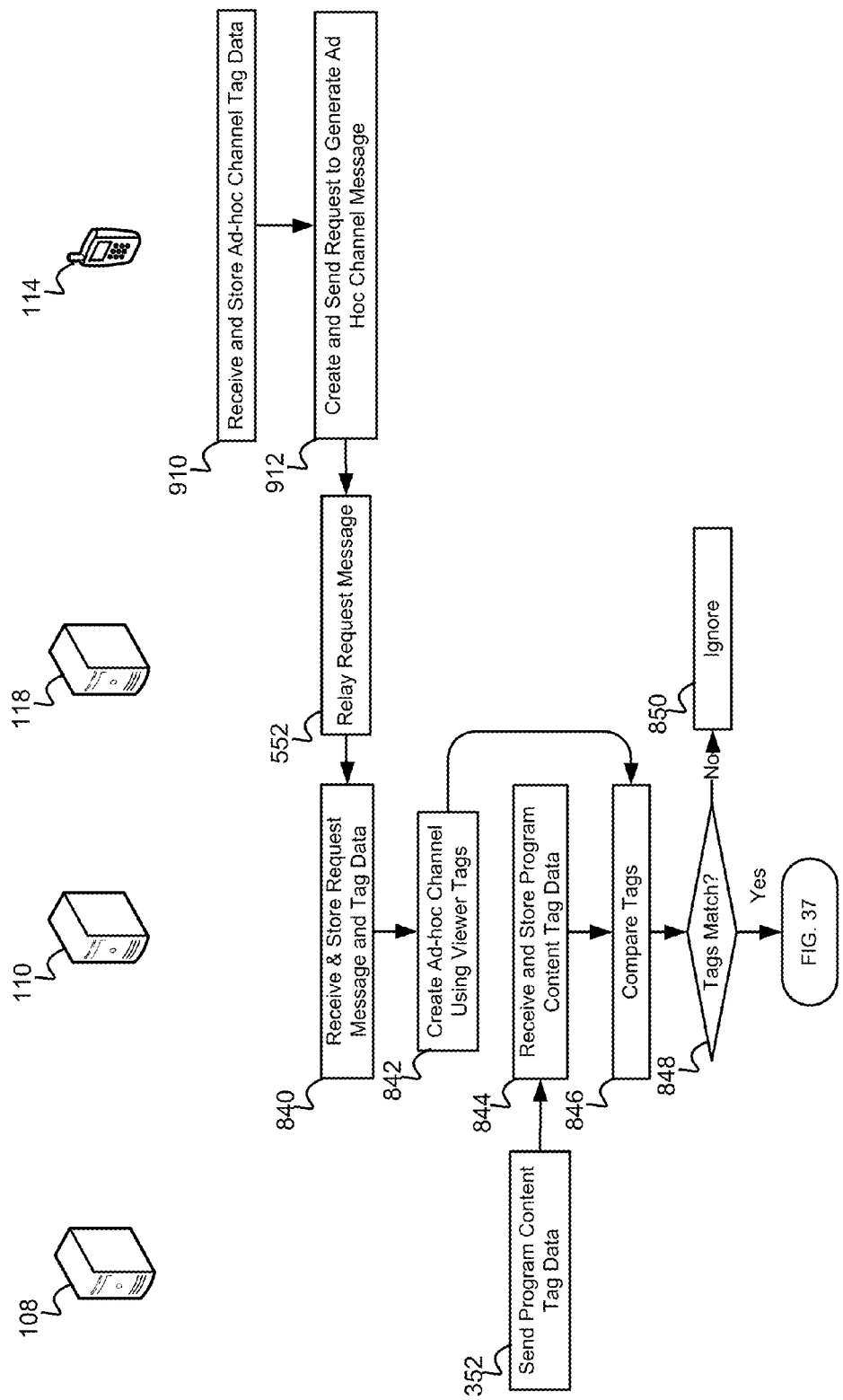
FIGS. 36-39 are process flow diagram of an embodiment method for enabling viewers to create ad hoc channels with target programming and share those channels with other viewers.

An example embodiment enabling viewers to create ad hoc channels with target programming and shared those channels with other viewers is illustrated in FIGS. 36-39. As illustrated in FIG. 36, a mobile device 114 may be configured with software instructions to enable a viewer to create an ad hoc channel. The mobile device 114 may receive and store ad hoc channel tag data, step 910. Ad hoc channel tag data may include information about the content of the programs which the viewer would like to list in the ad hoc channel. For example, if the viewer is a fan of William Shatner and desires to create an ad hoc channel which may list all the programs broadcasted by the broadcast network provider 102 that includes or relates to William Shatner, the viewer may input "William Shatner" as the ad hoc channel tag data. The mobile device 114 may create and send a request to generate an ad hoc channel message to the broadcast network provider 102 via the unicast network, steps 912, 552. The interactivity server 110 may receive and store the request message and the accompanying tag data, step 840. Using the ad hoc channel tag data received from the viewer, the interactivity server 110 may create an ad hoc channel, step 842.

In an embodiment, the broadcast network provider 102 may include program content tag data for every program that may be broadcasted. The broadcaster 108 may send program content tag data, step 352, to the interactivity server 110. The interactivity server 110 may be configured with software instructions to periodically receive information about broadcast programs and their associated tag data from the broadcaster 108, step 844, and compare the tag data received from the broadcaster to the tag data received from the viewer, step 846, to determined whether the broadcast program content tag data matches the tag data provided by the viewer, determination 848. If the program content tag data provided by the broadcaster 108 does not match the tag data provided by the viewer (i.e., determination 848="No"), the interactivity server 110 may ignore the program, step 850.

Figure 37:
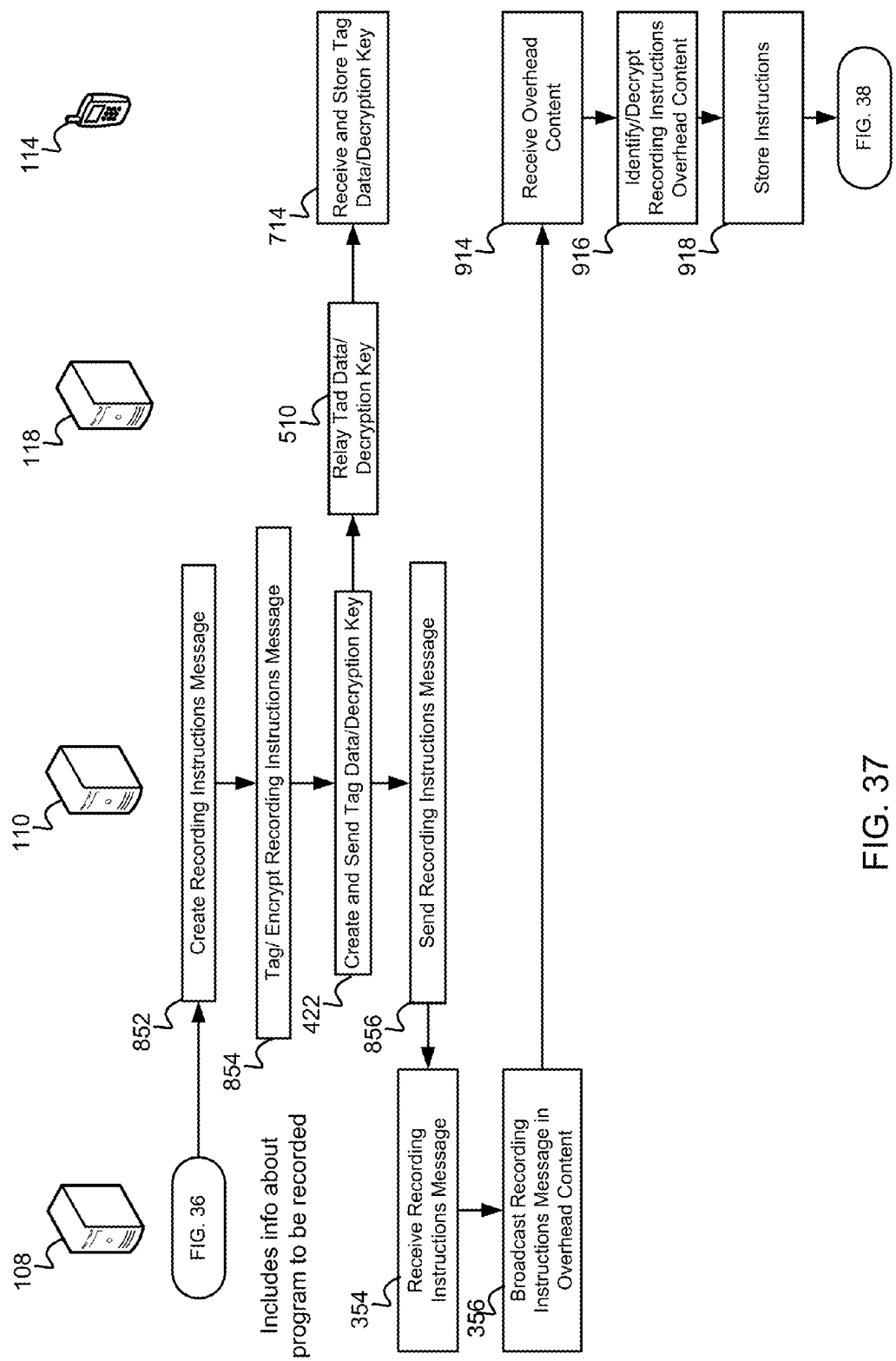

If the program content tag data provided by the broadcaster 108 matches the tag data provided by the viewer (i.e., determination 848="Yes"), as illustrated in FIG. 37, the interactivity server 110 may create recording instructions overhead content, step 852. The recording instructions overhead content may include information about the program tag data which matched the tag data provided by the viewer for the ad hoc channel. The information may include a program ID, program start time and program end time. The recording instructions overhead content may also include instructions which may be used by a resident software program on the mobile device 114 to identify a program broadcast and record the program on the mobile device so that the viewer may watch it at his/her leisure. The interactivity server 110 may tag or encrypt the recording instructions message so it can be narrow-casted via the broadcast overhead content, step 854, and create and send tag data or decryption key to the mobile device 114 via the unicast network, step 422, 510. The mobile device 114 may receive and store the tag data or decryption key, step 714. The interactivity server 110 may send the tagged or encrypted recording instructions message to the broadcaster 108, step 856. The broadcaster 108 may receive the tagged or encrypted recording instructions message, step 354 and broadcast it in the overhead content, step 356.

The mobile device 114 may receive the overhead content, step 914. If the recording instructions message is tagged, the mobile device 114 may use the tag data in memory to identify the recording instructions message within the overhead content, step 916. If the recording instructions message is encrypted, the mobile device 114 may use a decryption key in memory to decrypt the recording instructions message received from the overhead content, step 916. The mobile device 114 may be configured with software instructions to execute the instructions received in the recording instructions message to receive and record program broadcasts related to the viewer's ad hoc channel.

Figure 38:
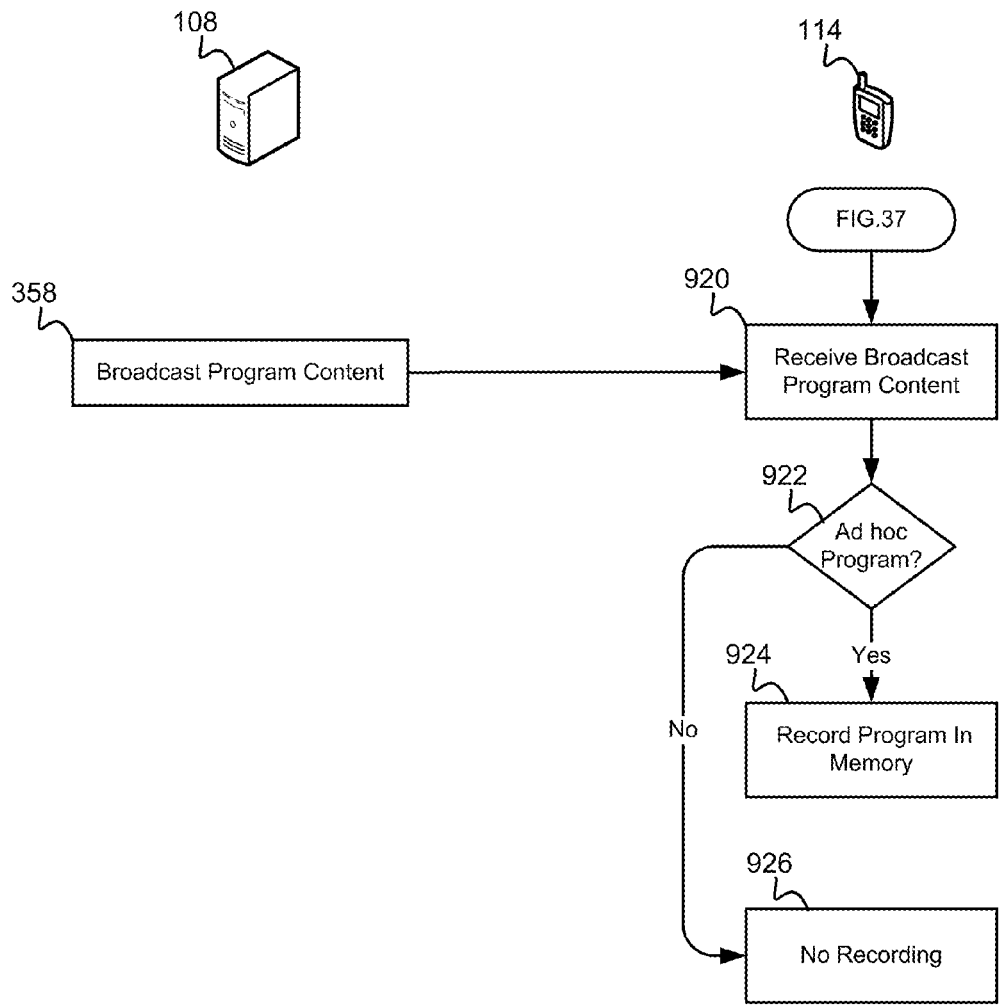

As illustrated in FIG. 38, when the broadcaster 108 broadcasts programs, step 358, mobile devices 114 receive the broadcast program content, step 920, and may determined whether the program is an ad hoc channel related program based in the instructions received from the broadcast network provider 102, determination 922. Alternatively, the mobile device 114 may compare program listings in the program guide to determine whether a scheduled program is on the list of programs associated with the ad hoc channel. If the broadcasted program is an ad hoc channel related program (i.e., determination 922="Yes"), the mobile device 114 may record the program in memory, step 924, so that the viewer may access it at any time. If the broadcast program is not an ad hoc channel related program (i.e., determination 922="No"), the mobile device 114 may not record the program in the memory, step 926. It should be noted that some broadcast content may be transmitted by clipcasting which does not require scheduled recording. Clipcasting involves broadcasting a file for storage instead of a file for immediate ("real-time") display using the file delivery capabilities of many broadcast networks. Clipcasted content is transmitted multiple times to ensure successful delivery via a unidirectional communication link, and is advertised to be delivered by a particular time (i.e., when the redundant broadcasts terminate). Content received by clipcasting file delivery mechanisms may be transmitted during off-hours, such as in the middle of the night, and received and stored on mobile devices. When the stored content is accessed by a user it is presented on the mobile device as if it were being broadcasted. Thus, mobile devices may receive and store the ad hoc channel content as clipcasts in step 924.

Figure 39:
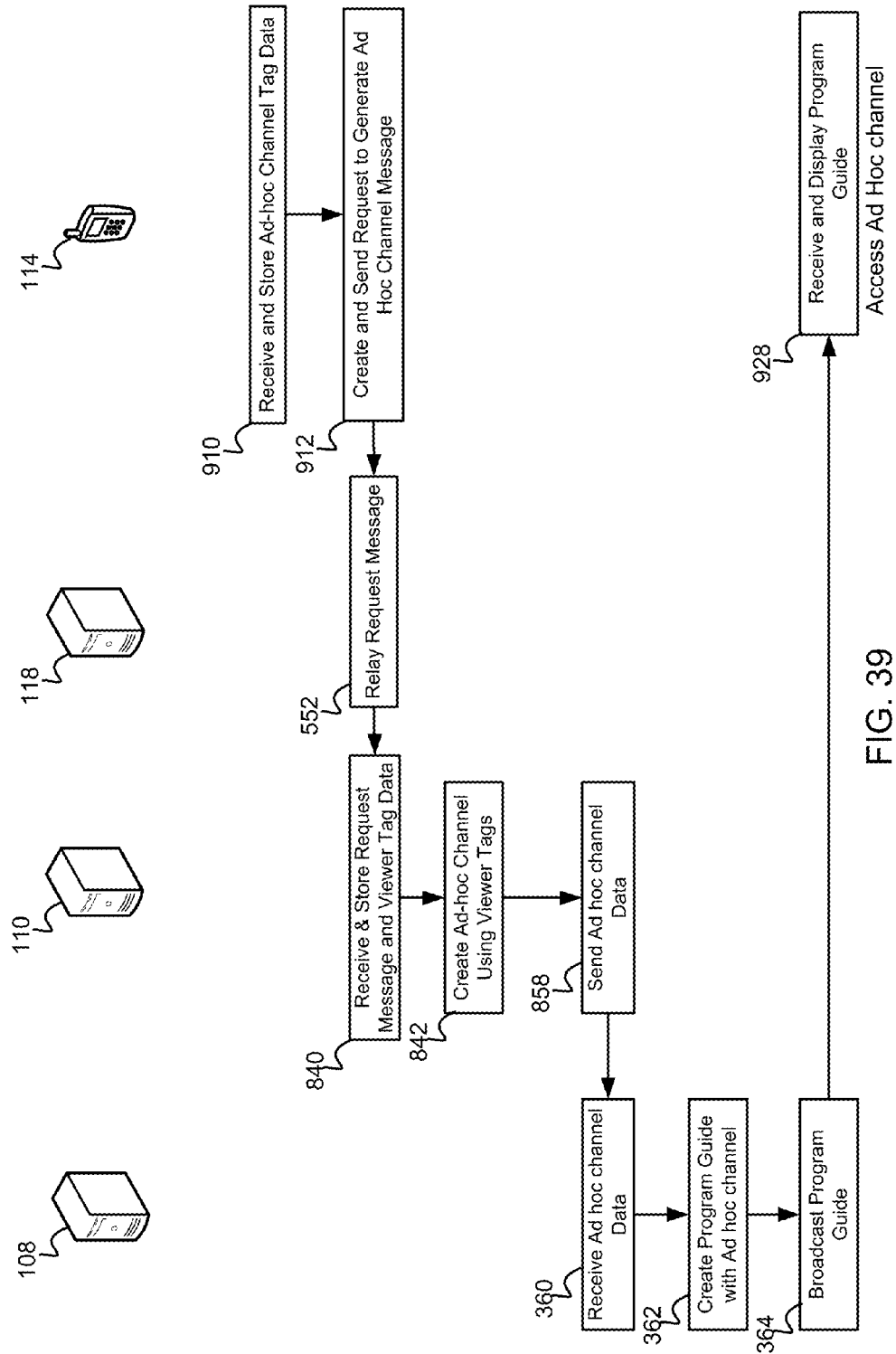

An embodiment enabling viewers to receive information about ad hoc channels through the broadcast network via the program guide is illustrated in FIG. 39. As with the foregoing embodiment, the mobile device 114 may store ad hoc channel tag data, step 910, and send a request to generate an ad hoc channel message to the broadcast network provider 102, step 912, via a wireless communication data network 118, step 552. The interactivity server 110 may receive and store the request message and the accompanying tag data, step 840. Using the ad hoc channel tag data received from the viewer, the interactivity server 110 may create ad hoc channel data, step 842, and send the ad hoc channel data to the broadcaster 108, step 858. The broadcaster 108 may receive the ad hoc channel data, step 360, generate a program guide addendum that includes the ad hoc channel data, step 362, and broadcast the program guide in the overhead content, step 364. The mobile devices 114 may receive and display the program guide including the ad hoc channels, step 928. The mobile TV viewers may then use the program guide to identify ad hoc channels for viewing.

Figure 40:
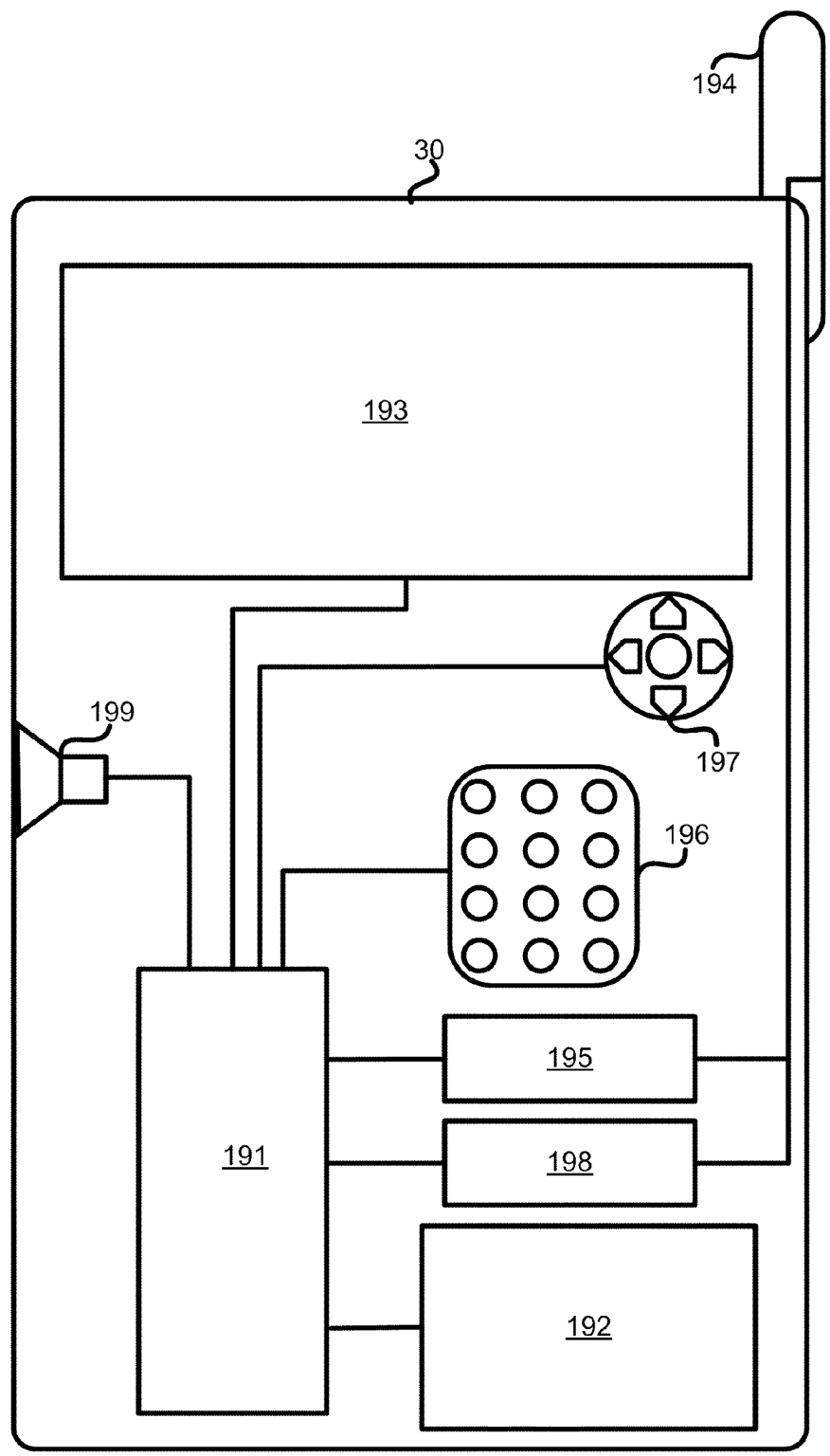
FIG. 40 is a component block diagram of a mobile device suitable for use in the various embodiments.

Typical mobile devices 118 suitable for use with the various embodiments will have in common the components illustrated in FIG. 40. For example, an exemplary mobile device 118 may include a processor 191 coupled to internal memory 192, a display 193, and to a speaker 199. Additionally, the mobile device 118 may have an antenna 194 for sending and receiving electromagnetic radiation that is connected to a wireless data link and/or cellular telephone transceiver 195 coupled to the processor 191 and a mobile TV broadcast receiver 198 coupled to the processor 191. Mobile devices typically also include one or more user input elements for receiving user inputs and providing the inputs to the processor 191, such as a touch-screen display 193, a key pad 196 or miniature keyboard, and/or menu selection buttons or rocker switches 197.

The processor 191 may be any programmable microprocessor, microcomputer or multiple processor chip or chips that can be configured with software instructions (applications) to perform a variety of functions, including the functions of the various embodiments described herein. In some mobile devices, multiple processors 191 may be provided, such as one processor dedicated to wireless communication functions and one processor dedicated to running other applications. Typically, software applications may be stored in the internal memory 192 before they are accessed and loaded into the processor 191. In some mobile devices, the processor 191 may include internal memory sufficient to store the application software instructions. In many mobile devices 114, the internal memory 192 may be a volatile or nonvolatile memory, such as flash memory, or a mixture of both. For the purposes of this description, a general reference to memory refers to all memory accessible by the processor 191, including internal memory 192, removable memory plugged into the mobile device, and memory within the processor 191 itself.

Figure 41:
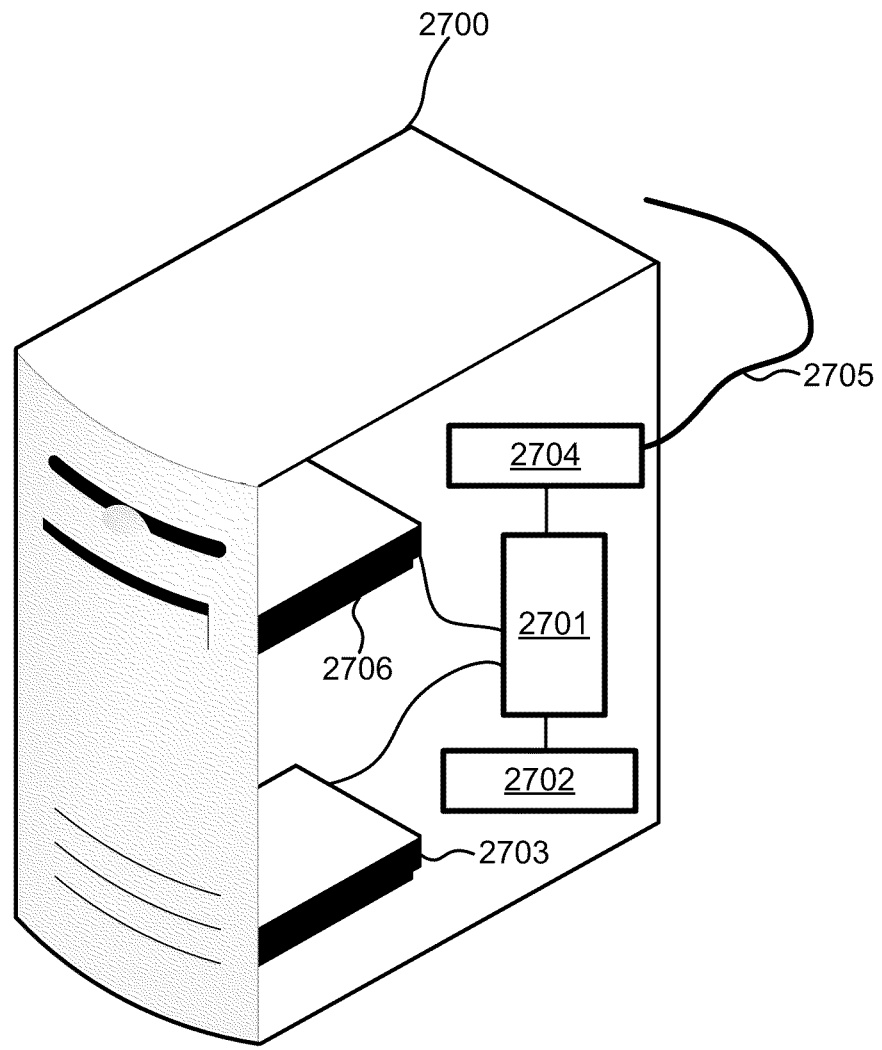
FIG. 41 is a component block diagram of a server device suitable for use in the various embodiments.

A number of the embodiments described above may also be implemented with any of a variety of remote server devices, such as the server 2700 illustrated in FIG. 41. Such a server 2700 typically includes a processor 2701 coupled to volatile memory 2702 and a large capacity nonvolatile memory, such as a disk drive 2703. The server 2700 may also include a floppy disc drive and/or a compact disc (CD) drive 2706 coupled to the processor 2701. The server 2700 may also include network access ports 2704 coupled to the processor 2701 for establishing data connections with network circuits 2705, such as the Internet.

The foregoing method descriptions and the process flow diagrams are provided merely as illustrative examples and are not intended to require or imply that the steps of the various embodiments must be performed in the order presented. As will be appreciated by one of skill in the art the order of steps in the foregoing embodiments may be performed in any order. Words such as "thereafter," "then," "next," etc. are not intended to limit the order of the steps; these words are simply used to guide the reader through the description of the methods. Further, any reference to claim elements in the singular, for example, using the articles "a," "an" or "the" is not to be construed as limiting the element to the singular.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The hardware used to implement the various illustrative logics, logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Alternatively, some steps or methods may be performed by circuitry that is specific to a given function.

In one or more exemplary aspects, the functions described may be implemented in hardware, software, firmware, or any combination thereof. If implemented in software, the functions may be stored on or transmitted over as one or more instructions or code on a computer-readable medium. The steps of a method or algorithm disclosed herein may be embodied in a processor-executable software module executed which may reside on a computer-readable medium. Computer-readable media includes both computer storage media and communication media including any medium that facilitates transfer of a computer program from one place to another. A storage media may be any available media that may be accessed by a computer. By way of example, and not limitation, such computer-readable media may comprise RAM, ROM, EEPROM, CD-ROM or other optical disk storage, magnetic disk storage or other magnetic storage devices, or any other medium that may be used to carry or store desired program code in the form of instructions or data structures and that may be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital video disc (DVD), floppy disk, and blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and/or instructions on a machine readable medium and/or computer-readable medium, which may be incorporated into a computer program product.

The preceding description of the disclosed embodiments is provided to enable any person skilled in the art to make or use the present invention. Various modifications to these embodiments will be readily apparent to those skilled in the art, and the generic principles defined herein may be applied to other embodiments without departing from the scope of the invention. Thus, the present invention is not intended to be limited to the embodiments shown herein but is to be accorded the widest scope consistent with the following claims and the principles and novel features disclosed herein.

What is claimed is:

1. A method for enabling viewer interactivity in a mobile TV broadcast system, comprising:
   receiving viewer data from a first mobile device;
   storing the received viewer data;
   receiving a request for viewer data from a second mobile device;
   transmitting a message associated with the request for viewer data to the first mobile device; and
   transmitting the received viewer data to the second mobile device by broadcasting the received viewer data in an overhead content transmission.

2. The method of claim 1, wherein transmitting the received viewer data to the second mobile device comprises:
   generating a viewer data message; and
   encrypting the viewer data message,
   wherein broadcasting the received viewer data comprises broadcasting the encrypted viewer data message.

3. The method of claim 2, further comprising receiving an encryption key from the second mobile device,
   wherein encrypting the viewer data message comprises encrypting the viewer data message using the encryption key received from the second mobile device.

4. The method of claim 2, further comprising transmitting a decryption key to the second mobile device via a unicast network.

5. The method of claim 1, wherein transmitting the received viewer data to the second mobile device comprises:
   generating a viewer data message; and
   tagging the viewer data message,
   wherein broadcasting the viewer data comprises broadcasting the tagged viewer data message.

6. The method of claim 1, further comprising:
   determining whether the second mobile device is qualified to receive viewer data received from the first mobile device,
   wherein transmitting viewer data to the second mobile device is accomplished only when the second mobile device is qualified to receive viewer data received from the first mobile device.

7. An interactivity server, comprising:
   a processor;
   a memory coupled to the processor; and
   a network access port coupled to the processor and configured to access a broadcast network and a unicast network,
   wherein the processor is configured with processor-executable instructions to perform steps comprising:
     receiving viewer data from a first mobile device;
     storing the received viewer data;
     receiving a request for viewer data from a second mobile device;
     transmitting a message associated with the request for viewer data to the first mobile device; and
     transmitting the received viewer data to the second mobile device by broadcasting the received viewer data in an overhead content transmission.

8. The interactivity server of claim 7, wherein the processor is configured with processor-executable instructions such that transmitting viewer data to the second mobile device comprises:
   generating a viewer data message; and
   encrypting the viewer data message,
   wherein broadcasting the received viewer data comprises broadcasting the encrypted viewer data message.

9. The interactivity server of claim 7, wherein the processor is configured with processor-executable instructions such that transmitting viewer data to the second mobile device comprises:
   generating a viewer data message; and
   tagging the viewer data message,
   wherein broadcasting the received viewer data comprises broadcasting the tagged viewer data message.

10. The interactivity server of claim 9, wherein the processor is configured with processor-executable instructions to perform further steps comprising receiving an encryption key from the second mobile device,
    wherein encrypting the viewer data message comprises encrypting the viewer data message using the encryption key received from the second mobile device.

11. The interactivity server of claim 9, wherein the processor is configured with processor-executable instructions to perform further steps comprising transmitting a decryption key to the second mobile device via the unicast network.

12. The interactivity server of claim 7, wherein the processor is configured with processor-executable instructions to perform further steps comprising:
    determining whether the second mobile device is qualified to receive the viewer data received from the first mobile device,
    wherein the processor is configured with processor-executable instructions such that transmitting viewer data to the second mobile device is accomplished only when the second mobile device is qualified to receive viewer data received from the first mobile device.

13. An interactivity server, comprising:
    means for receiving viewer data from a first mobile device;
    means for storing the received viewer data;
    means for receiving a request for viewer data from a second mobile device;
    means for transmitting a message associated with the request for viewer data to the first mobile device; and means for transmitting the received viewer data to the second mobile device by broadcasting the received viewer data in an overhead content transmission.

14. The interactivity server of claim 13, wherein means for transmitting the received viewer data to the second mobile device comprises:
   means for generating a viewer data message; and
   means for encrypting the viewer data message,
   wherein the means for broadcasting the received viewer data comprises means for broadcasting the encrypted viewer data message.

15. The interactivity server of claim 13, wherein means for transmitting the received viewer data to the second mobile device comprises:
   means for generating a viewer data message; and
   means for tagging the viewer data message,
   wherein means for broadcasting the received viewer data comprises means for broadcasting the tagged viewer data message.

16. The interactivity server of claim 15, further comprising means for receiving an encryption key from the second mobile device,
   wherein means for encrypting the viewer data message comprises means for encrypting the viewer data message using the encryption key received from the second mobile device.

17. The interactivity server of claim 15, further comprising means for transmitting a decryption key to the second mobile device a the unicast network.

18. The interactivity server of claim 13, further comprising:
   means for determining whether the second mobile device is qualified to receive the viewer data received from the first mobile device,
   wherein means for transmitting viewer data to the second mobile device comprises means for transmitting the viewer data when the second mobile device is qualified to receive viewer data received from the first mobile device.

19. A computer program product, comprising:
   a non-transitory computer readable storage medium comprising:
      at least one instruction for receiving viewer data from a first mobile device;
      at least one instruction for storing the received viewer data;
      at least one instruction for receiving a request for viewer data from a second mobile device;
      at least one instruction for transmitting a message associated with the request for viewer data to the first mobile device; and
      at least one instruction for transmitting the received viewer data to the second mobile device by broadcasting the received viewer data in an overhead content transmission.

20. The computer program product of claim 19, wherein the at least one instruction for transmitting the received viewer data to the second mobile device comprises:
   at least one instruction for generating a viewer data message; and
   at least one instruction for encrypting the viewer data message;
   wherein the at least one instruction for transmitting the received viewer data further comprises at least one instruction for broadcasting the encrypted viewer data message.

21. The computer program product of claim 19, wherein the at least one instruction for transmitting the received viewer data to the second mobile device comprises:
   at least one instruction for generating a viewer data message;
   at least one instruction for tagging the viewer data message;
   wherein the at least one instruction for transmitting the received viewer data further comprises at least one instruction for broadcasting the tagged viewer data message.

22. The computer program product of claim 21, wherein the non-transitory computer readable storage medium further comprises at least one instruction for receiving an encryption key from the second mobile device,
   wherein the at least one instruction for encrypting the viewer data message comprises at least one instruction for encrypting the viewer data message using the encryption key received from the second mobile device.

23. The computer program product of claim 21, wherein the non-transitory computer readable storage medium further comprises at least one instruction for transmitting a decryption key to the second mobile device via a unicast network.

24. The computer program product of claim 19, wherein the non-transitory computer readable storage medium further comprises:
   at least one instruction for determining whether the second mobile device is qualified to receive the viewer data received from the first mobile device,
   wherein the at least one instruction for transmitting viewer data to the second mobile device is accomplished only when the second mobile device is qualified to receive viewer data received from the first mobile device.

25. A method for enabling viewer interactivity in a mobile TV broadcast system, comprising:
   receiving an invitation message from a first mobile device via a unicast network;
   transmitting the invitation message to a second mobile device via the unicast network;
   receiving an invitation response message from the second mobile device via the unicast network; and
   transmitting the invitation response message to the first mobile device by broadcasting the invitation response message in an overhead content transmission.

26. The method of claim 25, further comprising:
   determining a mobile TV program being displayed by the first mobile device;
   creating an instruction message containing instructions configured to cause the second mobile device to display the mobile TV program determined to be displayed by the first mobile device; and
   transmitting the instruction message to the second mobile device.

27. The method of claim 26, wherein transmitting the instruction message to the second mobile device comprises:
   encrypting the instruction message, and
   broadcasting the encrypted instruction message in an overhead content transmission.

28. The method of claim 26, wherein transmitting the instruction message to the second mobile device comprises:
   tagging the instruction message; and
   broadcasting the tagged instruction message in an overhead content transmission.

29. An interactivity server, comprising:
   a processor;
   a memory coupled to the processor; and a network access port coupled to the processor and configured to access a broadcast network and a unicast network, wherein the processor is configured with processor-executable instructions to perform steps comprising:
receiving an invitation message from a first mobile device via a unicast network;
transmitting the invitation message to a second mobile device via the unicast network;
receiving an invitation response message from the second mobile device via the unicast network; and
transmitting the invitation response message to the first mobile device by broadcasting the invitation response message in an overhead content transmission.

30. The interactivity server of claim 29, wherein the processor is configured with processor-executable instructions to perform further steps comprising:
determining a mobile TV program being displayed by the first mobile device;
creating an instruction message containing instructions configured to cause the second mobile device to display the mobile TV program determined to be displayed by the first mobile device; and
transmitting the instruction message to the second mobile device.

31. The interactivity server of claim 30, wherein the processor is configured with processor-executable instructions such that transmitting the instruction message to the second mobile device comprises:
encrypting the instruction message; and
broadcasting the encrypted instruction message in an overhead content transmission.

32. The interactivity server of claim 30, wherein the processor is configured with processor-executable instructions such that transmitting the instruction message to the second mobile device comprises:
tagging the instruction message; and
broadcasting the tagged instruction message in an overhead content transmission.

33. An interactivity server, comprising:
means for receiving an invitation message from a first mobile device via a unicast network;
means for transmitting the invitation message to a second mobile device via the unicast network;
means for receiving an invitation response message from the second mobile device via the unicast network; and
means for transmitting the invitation response message to the first mobile device by broadcasting the invitation response message in an overhead content transmission.

34. The interactivity server of claim 33, further comprising:
means for determining a mobile TV program being displayed by the first mobile device;
means for creating an instruction message containing instructions configured to cause the second mobile device to display the mobile TV program determined to be displayed by the first mobile device; and
means for transmitting the instruction message to the second mobile device.

35. The interactivity server of claim 34, wherein means for transmitting the instruction message to the second mobile device comprises:
means for encrypting the instruction message; and
means for broadcasting the encrypted instruction message in an overhead content transmission.

36. The interactivity server of claim 34, wherein means for transmitting the instruction message to the second mobile device comprises:
means for tagging the instruction message; and
means for broadcasting the tagged instruction message in an overhead content transmission.

37. A computer program product, comprising:
a non-transitory computer readable storage medium comprising:
at least one instruction for receiving an invitation message from a first mobile device via a unicast network;
at least one instruction for transmitting the invitation message to a second mobile device via the unicast network;
at least one instruction for receiving an invitation response message from the second mobile device via the unicast network; and
at least one instruction for transmitting the invitation response message to the first mobile device by broadcasting the invitation response message in an overhead content transmission.

38. The computer program product of claim 37, wherein the non-transitory computer readable storage medium further comprises:
at least one instruction for determining a mobile TV program being displayed by the first mobile device;
at least one instruction for creating an instruction message containing instructions configured to cause the second mobile device to display the mobile TV program determined to be displayed by the first mobile device; and
at least one instruction for transmitting the instruction message to the second mobile device.

39. The computer program product of claim 38, wherein the at least one instruction for transmitting the instruction message to the second mobile device comprises:
at least one instruction for encrypting the instruction message; and
at least one instruction for broadcasting the encrypted instruction message in an overhead content transmission.

40. The computer program product of claim 38, wherein the at least one instruction for transmitting the instruction message to the second mobile device comprises:
at least one instruction for tagging the instruction message; and
at least one instruction for broadcasting the tagged instruction message in an overhead content transmission.

41. A method for enabling viewer interactivity in a mobile TV broadcast system, comprising:
receiving chat data from a first mobile device via a unicast network; and
transmitting the chat data to a second mobile device by broadcasting the chat data within an overhead content flow via a broadcast network.

42. The method of claim 41, wherein transmitting the chat data to the second mobile device comprises:
creating a chat data message; and
encrypting the chat data message,
wherein broadcasting the chat data comprises broadcasting the encrypted chat data message.

43. The method of claim 41, wherein transmitting the chat data to the second mobile device comprises:
creating a chat data message; and
tagging the chat data message,
wherein broadcasting the chat data comprises broadcasting the tagged chat data message.

44. An interactivity server configured to enable viewer interactivity in a mobile TV broadcast network, comprising:
- a processor;
- a memory coupled to the processor; and
- a network access port coupled to the processor and configured to the broadcast network and a unicast network,
- wherein the processor is configured with processor-executable instructions to perform steps comprising:
  - receiving chat data from a first mobile device via the unicast network;
  - creating a chat data message; and
  - transmitting the chat data to a second mobile device by broadcasting the chat data message within an overhead content flow via the broadcast network.

45. The interactivity server of claim 44, wherein the processor is configured with processor-executable instructions to perform steps further comprising:
- encrypting the chat data message, wherein the processor is configured with processor-executable instructions such that broadcasting the chat data message comprises broadcasting the encrypted chat data message.

46. The interactivity server of claim 44, wherein the processor is configured with processor-executable instructions to perform steps further comprising:
- tagging the chat data message,
- wherein the processor is configured with processor-executable instructions such that broadcasting the chat data message comprises broadcasting the tagged chat data message.

47. An interactivity server configured to enable viewer interactivity in a mobile TV broadcast network, comprising:
- means for receiving chat data from a first mobile device via a unicast network;
- means for creating a chat data message; and
- means for transmitting the chat data to a second mobile device by broadcasting the chat data message within an overhead content flow via a broadcast network.

48. The interactivity server of claim 47, further comprising means for encrypting the chat data message, wherein means for broadcasting the chat data message comprises means for broadcasting the encrypted chat data message.

49. The interactivity server of claim 47, further comprising means for tagging the chat data message, wherein means for broadcasting the chat data message comprises means for broadcasting the tagged chat data message.

50. A computer program product, comprising:
- a non-transitory computer readable storage medium comprising:
  - at least one instruction for receiving chat data from a first mobile device via a unicast network;
  - at least one instruction for creating a chat data message; and
  - at least one instruction for transmitting the chat data to a second mobile device by broadcasting the chat data message within an overhead content flow via a broadcast network.

51. The computer program product of claim 50, wherein the non-transitory computer readable storage medium further comprises at least one instruction for encrypting the chat data message, wherein the at least one instruction for broadcasting the chat data message comprises at least one instruction for broadcasting the encrypted chat data message.

52. The computer program product of claim 50, wherein the non-transitory computer readable storage medium further comprises at least one instruction for tagging the chat data message, wherein the at least one instruction for broadcasting the chat data message comprises at least one instruction for broadcasting the tagged chat data message.

* * * * *